(12) United States Patent
Green et al.

(10) Patent No.: US 12,298,039 B2
(45) Date of Patent: ***May 13, 2025

(54) FAILSAFE GAS LEAK DETECTION AND MITIGATION SYSTEM AND METHOD

(71) Applicant: Gina Deborah Morse, Decatur, TX (US)

(72) Inventors: Kenneth Ray Green, Crossroads, TX (US); Douglas Hiram Morse, Decatur, TX (US)

(*) Notice: Subject to any disclaimer, the term of this patent is extended or adjusted under 35 U.S.C. 154(b) by 454 days.

This patent is subject to a terminal disclaimer.

(21) Appl. No.: 17/734,382

(22) Filed: May 2, 2022

(65) Prior Publication Data

US 2022/0252304 A1    Aug. 11, 2022

Related U.S. Application Data

(63) Continuation-in-part of application No. 16/855,238, filed on Apr. 22, 2020, now Pat. No. 11,326,798, (Continued)

(51) Int. Cl.
| | |
|---|---|
| *F24F 11/36* | (2018.01) |
| *F24F 11/526* | (2018.01) |
| *F24F 11/84* | (2018.01) |
| *F24H 3/02* | (2022.01) |
| *F24H 15/12* | (2022.01) |

(Continued)

(52) U.S. Cl.
CPC .............. *F24H 15/12* (2022.01); *F24F 11/36* (2018.01); *F24F 11/526* (2018.01); *F24F 11/84* (2018.01); *F24H 3/025* (2013.01); *F24H 15/269* (2022.01); *F24H 15/345* (2022.01); *F24H 15/395* (2022.01); *F24H 15/464* (2022.01);

(Continued)

(58) Field of Classification Search
CPC ... F24F 11/36; F24F 2110/35; F25B 2500/22; F25B 2500/221; F25B 2500/222
See application file for complete search history.

(56) References Cited

U.S. PATENT DOCUMENTS

| 9,638,436 B2 * | 5/2017 | Arensmeier ........... G05B 15/02 |
| 10,060,642 B2 * | 8/2018 | Sikora ..................... F24F 11/38 |

(Continued)

*Primary Examiner* — Jerry-Daryl Fletcher
*Assistant Examiner* — Daniel C Comings
(74) *Attorney, Agent, or Firm* — Kevin Mark Klughart

(57) ABSTRACT

A failsafe hydrocarbon-based gas (HBG) leak detection (HLD) and mitigation (HLM) system/method for use in heating, ventilation, and air conditioning (HVAC) systems that incorporates a hydrocarbon gas sensor (HGS), sensor signal conditioner (SSC), alarm status indicator (ASI), and digital control processor (DCP) is disclosed. The HGS detects ambient hydrocarbon gas (AHG) and presents a hydrocarbon sensor voltage (HSV) to the SSC. The DCP and SSC form a closed control loop (CCL) in which the SSC electrical characteristics are adjusted by the DCP such that the HSV is continuously and dynamically recalibrated to account for background HBG levels, changes in ambient air conditions, HGS manufacturing tolerances, and other field-specific operational conditions that impact the HGS detection capabilities. The DCP is configured to log alarms to the ASI if a HGS HBG leak is detected and optionally shutdown gas flow to one or more HBG target (HBT) system components.

35 Claims, 64 Drawing Sheets

Related U.S. Application Data which is a continuation-in-part of application No. 15/902,452, filed on Feb. 22, 2018, now abandoned, and a continuation-in-part of application No. 16/580,717, filed on Sep. 24, 2019, now abandoned, and a continuation-in-part of application No. 16/747,422, filed on Jan. 20, 2020, now Pat. No. 11,428,448.

(60) Provisional application No. 62/938,132, filed on Nov. 20, 2019, provisional application No. 62/886,020, filed on Aug. 13, 2019, provisional application No. 62/854,676, filed on May 30, 2019, provisional application No. 62/750,383, filed on Oct. 25, 2018, provisional application No. 62/462,570, filed on Feb. 23, 2017.

(51) Int. Cl.
*F24H 15/269* (2022.01)
*F24H 15/345* (2022.01)
*F24H 15/395* (2022.01)
*F24H 15/464* (2022.01)
*G05B 23/02* (2006.01)
*F24F 11/58* (2018.01)
*F24F 110/65* (2018.01)

(52) U.S. Cl.
CPC ............ *G05B 23/027* (2013.01); *F24F 11/58* (2018.01); *F24F 2110/65* (2018.01); *F25B 2500/22* (2013.01)

(56) References Cited

U.S. PATENT DOCUMENTS

| | | | |
|---|---|---|---|
| 11,326,798 B2* | 5/2022 | Green | G05B 23/027 |
| 2005/0056031 A1* | 3/2005 | Jeong | F25B 49/005 |
| | | | 62/149 |
| 2014/0123685 A1* | 5/2014 | Kim | F25B 41/24 |
| | | | 62/56 |

* cited by examiner

| Model | | | WSP5110 |
|---|---|---|---|
| Sensor Type | | | Semiconductor flat surfaced sensor |
| Standard Encapsulation | | | Metal Cap |
| Detection Gas | | | Refrigerant, benzene, alcohol &etc. |
| Detection range | | | 10~1000ppm |
| Standard circuit | Loop voltage | $V_C$ | ≤24V DC |
| | Heating voltage | $V_H$ | 5.0V±0.1V AC or DC |
| | Load resistance | $R_L$ | Adjustable |
| sensor features in standard test condition | Heating resistance | $R_H$ | 90Ω±10Ω(Room Temperature) |
| | Heating consumption | $P_H$ | ≤300mW |
| | Surface resistance | $R_S$ | 30KΩ~200KΩ(in 100ppm Refrigerant) |
| | Sensitivity | S | Rs(in air)/Rs(in 100ppm Refrigerant)≥3 |
| | Concentration slope | α | ≤0.65($R_{200ppm}/R_{50ppm}$ refrigerant) |
| Standard condition of test | Temperature, humidity | | 20℃±2℃；65%±5%RH |
| | Standard test circuit | | Vc:5.0V±0.1V; $V_H$:5.0V±0.1V |
| | Warm-up time | | Not less than 120 hours |

FAILSAFE GAS LEAK DETECTION AND MITIGATION SYSTEM AND METHOD

CROSS REFERENCE TO RELATED APPLICATIONS

Continuation-In-Part Patent Application (CIP)

This is a continuation-in-part (CIP) patent application of and incorporates by reference United States Utility patent application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326,798 on 2022 May 10.

United States Utility patent application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326,798 on 2022 May 10, is a continuation-in-part (CIP) patent application of and incorporates by reference United States Utility patent application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with Ser. No. 15/902,452, EFS ID 31861708, confirmation number 1253.

United States Utility patent application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326,798 on 2022 May 10, is a continuation-in-part (CIP) patent application of and incorporates by reference United States Utility patent application for DISTRIBUTED RESIDENTIAL CLIMATE-CONTROL SYSTEMS AND METHODS WITH DISTRIBUTED PROTECTION AGAINST REFRIGERANT LOSS by inventors Kenneth R. Green, et al., filed electronically with the USPTO on 24 Sep. 2019, with Ser. No. 16/580,717, EFS ID 37259582a, confirmation number 6370.

United States Utility patent application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326,798 on 2022 May 10, is a continuation-in-part (CIP) patent application of and incorporates by reference United States Utility patent application for REFRIGERANT METERING SYSTEM AND METHOD by inventor Kenneth R. Green, filed electronically with the USPTO on 20 Jan. 2020, with Ser. No. 16/747,422, EFSID 38342840, confirmation number 1232.

PCT Patent Applications

This patent application claims benefit under 35 U.S.C. § 120 and incorporates by reference PCT Patent Application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with serial number PCT/US2018/019161.

Utility Patent Applications

This patent application claims benefit under 35 U.S.C. § 120 and incorporates by reference United States Utility patent application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326,798 on 2022 May 10.

United States Utility patent application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326,798 on 2022 May 10, claims benefit under 35 U.S.C. § 120 and incorporates by reference United States Utility patent application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with Ser. No. 15/902,452, EFS ID 31861708, confirmation number 1253.

United States Utility patent application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326,798 on 2022 May 10, claims benefit under 35 U.S.C. § 120 and incorporates by reference United States Utility patent application for DISTRIBUTED RESIDENTIAL CLIMATE-CONTROL SYSTEMS AND METHODS WITH DISTRIBUTED PROTECTION AGAINST REFRIGERANT LOSS by inventors Kenneth R. Green, et al., filed electronically with the USPTO on 24 Sep. 2019, with Ser. No. 16/580,717, EFS ID 37259582, confirmation number 6370, United States Utility patent application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. 11,326,798 on 2022 May 10, claims benefit under 35 U.S.C. § 120 and incorporates by reference United States Utility patent application for REFRIGERANT METERING SYSTEM AND METHOD by inventor Kenneth R. Green, filed electronically with the USPTO on 20 Jan. 2020, with Ser. No. 16/747,422, EFSID 38342840, confirmation number 1232.

Provisional Patent Applications

United States Utility patent application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat.

No. 11,326,798 on 2022 May 10, claims benefit under 35 U.S.C. § 119 and incorporates by reference United States Provisional Patent application for LEAK CONTAINMENT SYSTEMS by inventors Kenneth R. Green, et al., filed electronically with the USPTO on 20 Nov. 2019, with Ser. No. 62/938,132, EFS ID 37810820, confirmation number 6339.

United States Utility patent application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. 11,326,798 on 2022 May 10, claims benefit under 35 U.S.C. § 119 and incorporates by reference United States Provisional Patent application for LEAK DETECTION TROUBLESHOOTER by inventors Kenneth R. Green, et al., filed electronically with the USPTO on 13 Aug. 2019, with Ser. No. 62/886,020, EFS ID 36861132, confirmation number 1376.

United States Utility patent application for REFRIGERANT LEAK DETECTION AND MITIGATION SYSTEM AND METHOD by inventors Kenneth Ray Green and Douglas Hiram Morse, filed electronically with the USPTO on 22 Apr. 2020, with Ser. No. 16/855,238, EFS ID 39231336, confirmation number 3025, issued as U.S. Pat. No. 11,326,798 on 2022 May 10, claims benefit under 35 U.S.C. § 119 and incorporates by reference United States Provisional Patent application for AC BOX ENGINEERING, DESIGNS, AND DEVICES by inventors Kenneth R. Green, et al., filed electronically with the USPTO on 30 May 2019, with Ser. No. 62/854,676, EFS ID 36158820, confirmation number 6929.

United States Utility patent application for DISTRIBUTED RESIDENTIAL CLIMATE-CONTROL SYSTEMS AND METHODS WITH DISTRIBUTED PROTECTION AGAINST REFRIGERANT LOSS by inventors Kenneth R. Green, et al., filed electronically with the USPTO on 24 Sep. 2019, with Ser. No. 16/580,717, EFS ID 37259582, confirmation number 6370, claims benefit under 35 U.S.C. § 119 and incorporates by reference United States Provisional Patent application for DISTRIBUTED RESIDENTIAL CLIMATE-CONTROL SYSTEMS AND METHODS WITH REFRIGERANT MANAGEMENT by inventors Kenneth R. Green, et al., filed electronically with the USPTO on 25 Oct. 2018, with Ser. No. 62/750,383, EFS ID 34113773, confirmation number 1062.

United States Utility patent application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with Ser. No. 15/902,452, EFS ID 31861708, confirmation number 1253, claims benefit under 35 U.S.C. § 119 and incorporates by reference United States Provisional Patent application for REFRIGERANT LEAK CONTAINMENT SYSTEM by inventor Kenneth R. Green, filed electronically with the USPTO on 23 Feb. 2017, with Ser. No. 62/462,570, confirmation number 1047.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates to heating, ventilation, and air conditioning (HVAC) systems, and specifically the detection and mitigation of hydrocarbon-based gas (HBG) leaks (HGL) within these HVAC systems. Without limitation, the present invention may have application in situations where a HGL must be detected (hydrocarbon-based gas (HBG) leak detection (HLD)) or mitigated (hydrocarbon-based gas (HBG) leak mitigation (HLM)) in a Variable Refrigerant Flow (VRF) climate control heating, ventilation, and air conditioning (HVAC) system or other system in which HBG is utilized.

In these situations the HVAC system may service multiple air handler units and as such a HGL in any one of HVAC systems can result in a significant disruption of HVAC service to the facility. The present invention in these circumstances is designed to detect the cause of the HGL and provide an indication of the failing path within the HVAC system and optionally mitigate the HGL by isolating HBG flow within the system in a failsafe manner. The system/method may be applied to other situations in which a HGL must be detected/mitigated such as natural gas and/or propane gas pipe distribution.

BACKGROUND AND PRIOR ART

Conventional HVAC systems may include support for hydrocarbon-based gas (HBG) heating. These hydrocarbon-based fuels may include (among others) natural gas (methane), propane, and other hydrocarbon-based fuels.

Piping of these HBG fuels often results in hydrocarbon gas leaks (HGL) within pipe joints, mechanical valves, and/or electromechanical valves that control HBG flow within the HVAC system. Typical causes of HGL include HBG pipeline leaks, faulty HBG line installation, random excavations near underground HBG lines, faulty HBG appliances, and static discharge around HBG lines, among other causes.

HBG leaks are often difficult to detect, and thus small leaks within the HVAC system may result in pooling of HBG within the HVAC system and present a danger of fire or explosion if inadvertently ignited with a spark or other ignition source.

Furthermore, within housing units that operate HBG-based water heaters, there is also the possibility of HBG leaks causing fires or explosions due to undetected leaks in the HBG piping system.

As an example, across the United States there are about 286 serious natural gas explosions per year—the type that cause over $50,000 worth of damage, severe injury, or loss of life. Between 1998 and 2017, 15 people per year on average died in incidents related to HBG distribution in the U.S. This does not include the entire range of HBG possible fuel sources.

There is currently no standardized support within HVAC systems for the detection and/or mitigation of HBG leaks. One aspect of this failure is the lack of a reliable system and/or method of detecting HBG leaks in an environment where a variety of other gasses may be present that would typically cause false-positive readings with conventional HBG sensors.

BRIEF SUMMARY OF THE INVENTION

The present invention pertains to a system and method wherein a HVAC system having a failing gas fitting/appliance (or other system component leaking a hydrocarbon gas) may be quickly detected, isolated, and brought back to service. To accomplish this goal the present invention implements a system and method of hydrocarbon gas detection that is tolerant of background hydrocarbon emissions as well as dynamically adaptable to the changing characteristics of wide variety of hydrocarbon gas sensors (HGS). By dynamically calibrating the operation of the HGS and adjusting for background detected hydrocarbon levels using a closed control loop (CCL) operating between a digital control processor (DCP) and a sensor signal conditioner (SSC), the overall system/method can be used to both detect true hydrocarbon gas leaks (HGL) and in some embodiments close solenoid valves and/or electrical contactors to inhibit HVAC operation and isolate failing components to mitigate hydrocarbon gas loss in the HVAC system.

While the disclosed system has particular application in situations where HVAC systems are implemented, it may also have application in other situations where HBG leak detection and mitigation is desired, such as in the prevention of gas/fuel leaks associated with water heaters, boilers, and the like.

BRIEF DESCRIPTION OF THE DRAWINGS

For a fuller understanding of the advantages provided by the invention, reference should be made to the following detailed description together with the accompanying drawings wherein:

FIG. 27 illustrates a chart depicting an exemplary model WSP-5110 HGS electrical characteristic;

DESCRIPTION OF THE PRESENTLY PREFERRED EXEMPLARY EMBODIMENTS

Figure 1:
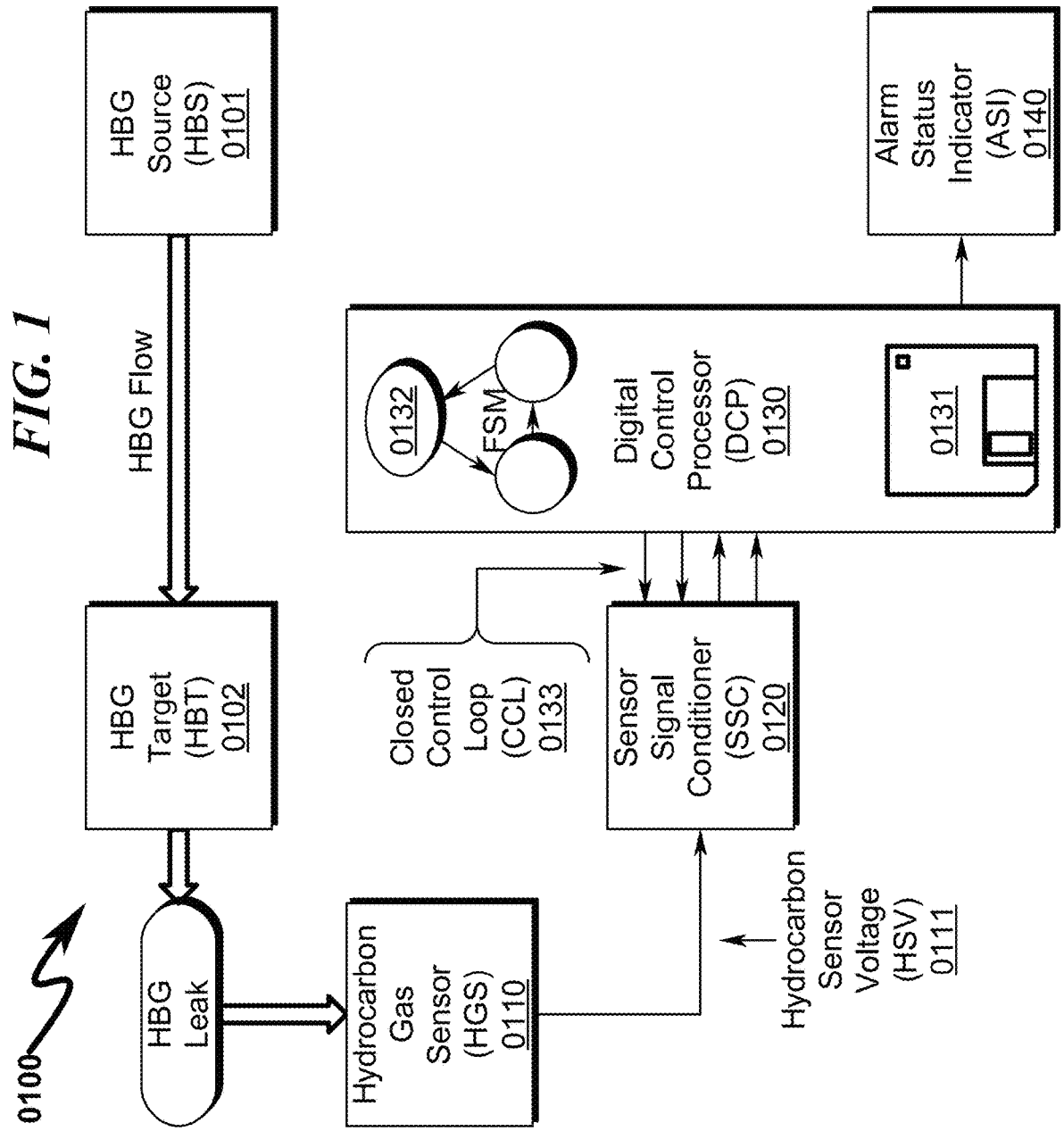
FIG. 1 illustrates a system block diagram depicting a preferred exemplary embodiment of a present invention hydrocarbon-based gas (HBG) leak detection system (HLD)

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a FAILSAFE GAS LEAK DETECTION AND MITIGATION SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Hydrocarbon-Based Gas (HBG) Not Limitive

The term hydrocarbon-based gas (HBG) should be given a broad interpretation within this document. While in traditional HVAC systems this typically refers to natural gas and/or propane gas, the present invention is not limited to these particular chemical combinations, and in some circumstances may include other hydrocarbon-based gasses, hydrocarbon-based gas emissions from solids such as explosive compounds and the like, and/or hydrocarbon-based refrigerants such as Hydrofluoroolefin (HFO) and Hydrocarbon (HC) refrigerants. Hydrofluoroolefin (HFO) and Hydrocarbon (HC) refrigerants are referred to as fourth-generation refrigerants for the 21st century following chlorofluorocarbons (CFCs), hydrochlorofluorocarbons (HCFCs), and hydrofluorocarbons (HFCs). Thus, the HBG detection capabilities described herein may be useful in application contexts inside and/or outside of the HVAC industry, such as the detection of explosive devices and other combustible materials that emit hydrocarbon-based gasses.

HBG Sensor (HBS) Not Limitive

The present invention anticipates a wide range of HBG sensor applications in which a wide variety of HBG sensors (HBS) may be utilized to detect a wide range of HBG leaks. While not limitive, the HBS may be in many application contexts selected from a group consisting of: MQ-2 (smoke, isobutane); MQ-3 (ethanol, alcohol); MQ-4 (methane); MQ-5 (methane, natural gas); MQ-6 (LPG gas); MQ-7 (carbon monoxide); MQ-8 (hydrogen); MQ-9 (combustible gas); MQ-135 (ammonia, sulfide, benzene vapor, air quality); MC107B; MC105; MC106B; MC101; ME2-CO; MG811; MP503; MC101; MC113 MC113C; 113C; CJMCU-110026; TGS2600; TGS2602; TGS2603; CJMCU-811 CCS811; HDC1080; MICS-6814; SGP30; MICS-5524; and WSP-5110.

Note that the term HBS should be given a broad interpretation, as some of the sensors anticipated for use in the present invention may detect the products (or potential products) of oxidation and/or combustion and thus the spectrum of detectable gasses anticipated by the present invention is broader than that of just combustible gasses. For example, carbon monoxide detectors, explosive detectors, air quality detectors, and the like are all anticipated by the present invention. Alarms associated with each type of sensor may vary in their threshold detection levels, and it is anticipated that more than one type of HBS may be implemented in a given application context of the present invention.

Closed Control Loop (CCL) Methods Are Iterative

The present invention in several preferred embodiments utilizes iterative loops within a closed control loop (CCL) to determine if a gas detection state has been triggered. For example, in some preferred embodiments a "GAS DETECTION STATE" is recited of the closed control loop in which a voltage of the HBG gas sensor is compared to upper and lower threshold voltages and a step counter is incremented if the voltage "exceeds" the upper threshold and decremented if the voltage "falls below" the lower threshold. Similarly, an "ALARM STATE" triggered may be triggered if the step counter "exceeds a selected threshold detection count."

These descriptions are intended to teach the GAS DETECTION STATE being iterative so that the step count may reach the selected threshold, and while the description may not recite more than one instance of the GAS DETECTION STATE or any other steps or processes by which the step counter may be incremented more than once, it should be assumed that multiple HBG sensor voltages will be compared to the upper threshold multiple times in an iterative fashion. Once a number of iterative evaluations have been completed with a step counter exceeding a predetermined threshold, an alarm will be triggered as having determined a GAS DETECTION STATE.

HVAC Heating/Cooling Operation Not Limitive

The present invention will be described in terms of a conventional HVAC heating/cooling system. In some application contexts, the system is operated solely as a cooling system. Thus, the present invention is not limited to heating, cooling, or heating/cooling systems, but combinations of these configurations are also anticipated. The present invention may be utilize with heat pumps, heat recovery, refrigeration, and other systems that employ LEV/EEV/TEV/AEV controls and/or REC components. The discussion herein does not limit the type of environment in which the present invention may be applied.

Furthermore, the terms "input port" and "output port" will be referenced to conventional refrigeration systems herein, but it should be understood that these designations will be reversed for heat recovery systems that are also anticipated by the present invention. One skilled in the art will have no trouble in reversing these designations where appropriate in this disclosure to allow the claimed invention to encompass both refrigeration and heat recovery systems.

LCS/LDT Not Limitive

The present invention will be described in terms of a leak containment system (LCS) (otherwise referred to as a hydrocarbon-based gas (HBG) leak containment (HLC) or hydrocarbon-based gas (HBG) leak mitigation (HLM)) in which a leak detection tool (or alternatively as a leak detection troubleshooter) (LDT) or a HBG leak detector (HLD)) is used to dynamically monitor ambient HBG levels, determine if a HBG leak has occurred, pinpoint the location of the leak, and mitigate any adverse effects of the leak by containing the leak to a portion of the HVAC system in which the HBG flows.

Thus, the system and method described herein may be used for leak detection and/or leak mitigation and troubleshooting and in some circumstances may be implemented as a leak detection only system/method and in others as a leak detection and mitigation system/method.

Solenoid Cutoff Valves Not Limitive

Many preferred embodiments of the present invention may incorporate electrically actuated solenoid drive HBG cutoff valves to isolate one or more components of the HVAC system when a HBG leak is detected. While many valve types may be used in this application context, several preferred invention embodiments make use of solenoid cutoff valve model SD-15/52015, available from Parker Hannifin Corporation, Sporlan Division, 206 Lange Drive, Washington, MO 63090 USA, phone 636-239-1111, fax 636-239-9130, www.sporlan.com.

These valves in some circumstances may be substituted with manually activated HBG cutoff valves (HCV) that are actuated by an operator in response to alarms provided by the HBG leak detector (HLD) described herein.

Drawings Not to Scale

The drawings presented herein have been scaled in some respects to depict entire system components and their connections in a single page. As a result, the components shown may have relative sizes that differ from that depicted in the exemplary drawings. One skilled in the art will recognize that piping sizes, thread selections, and other component values will be application specific and have no bearing on the scope of the claimed invention.

Schematics Exemplary

The present invention may be taught to one of ordinary skill in the art via the use of exemplary schematics as depicted herein. One skilled in the art will recognize that these schematics represent only one possible variation of the invention as taught and that their specific connectivity, components, and values are only one possible configuration of the invention. As such, the presented schematics and their associated component values and illustrated voltage levels do not limit the scope of the claimed invention. Additionally, it should be noted that conventional power supply decoupling capacitors are omitted in the presented schematics as they are generally application specific in value and placement.

Digital Control Processor (DCP) Not Limitive

The implementation of the digital control processor (DCP) described herein may take many forms, including but not limited to discrete digital logic, microcontrollers, finite state machines, and/or mixed analog-digital circuitry. While in many preferred exemplary embodiments the DCP is implemented using an 8051-class (8021, 8041, 89C micro-controller), the present invention is not limited to this particular hardware implementation.

States/Modes Not Limitive

The present invention will be herein described in terms of CCL STATES in many embodiments. These states may equivalently be described in terms of CCL MODES of operation.

Time Delays Not Limitive

The present invention may make use of a variety of DCP selected time delays during the operation of the system. The time delays presented herein are only exemplary of those found in some preferred embodiments and are not limitive of the claimed invention. A "selected time delay" will refer to any time delay found appropriate in a particular application context of the present invention.

Wireless Communication Interface (WCI) Not Limitive

Some preferred invention embodiments may incorporate a wireless communication interface (WCI) allowing control and/or interrogation of the DCP from a mobile user device (MUD) or some other type of networked computer control. The WCI may take many forms, but many preferred invention embodiments utilize a BLUETOOTH® compatible interface to the DCP to accomplish this function.

Wireless Communication Protocol Not Limitive

Some preferred invention embodiments utilize a wireless communication interface (WCI) to allow external communication and/or control of the DCP. In this manner the operational STATE of the CCL can be interrogated, ASI alarms enabled/inhibited, HVAC controls manually operated, and stored information regarding the details of the particular HVAC system stored/retrieved. In many preferred exemplary embodiments the WCI is implemented using a BLUETOOTH® radio frequency transceiver, and in some circumstances a Shenzhen Xintai Micro Technology Co., Ltd. Model JDY-30/JDY-31 BLUETOOTH® SPP Serial Port Transparent Transmission Module or DSD TECH model HM-10/HM-11 (www.dsdtech-global.com) that implement a BLUETOOTH® wireless transceiver using a digital serial port of the DCP. Additionally, MICROCHIP® brand models RN4870/RN4871/RN4870U/RN4871U Bluetooth® Low Energy Modules may alternatively be utilized in many preferred system embodiments. One skilled in the art will recognize that this is just one of many possible WCI implementations.

Mobile User Device (MUD) Not Limitive

Some preferred invention embodiments may incorporate a mobile user device (MUD) allowing control and/or interrogation of the DCP via a WCI or other computer network. The MUD may take many forms, but many preferred invention embodiments utilize a tablet, smartphone, or other handheld device to wirelessly communicate with the DCP using a WCI. In some circumstances this MUD may utilize telephone or Internet communications to affect this DCP command/interrogation capability.

Alarm Status Indicator (ASI) Not Limitive

Many preferred invention embodiments may incorporate an alarm status indicator (ASI) comprising one or more light emitting diode (LED) displays (including LED displays utilizing a digital or segmented format) and/or audible alarm indicators. These devices may take many forms, including but not limited to single LED indicators, LED multi-segment displays, and piezo-electric audible indicators. In each of these cases the activation duty cycle and frequency of operation of these displays may be altered to provide indications of alarm status values or to provide information as to the STATE in which the system is operating. The present invention makes no limitation on how these displays operate or in what combination they are combined to provide the ASI functionality.

HBG Relay Controls (HRC) Not Limitive

The present invention includes a description of HBG relay controls (HRC) and details a variety of situations in which multiple HRC may be used to individually enable/disable various portions of a HVAC system and/or HBG flow. It should be understood that the term HRC should encompass one or more relay controls, as some application contexts may only utilize a single master HBG source (HBS) cutoff relay to disable HBG flow in the overall application context.

Power Supply Not Limitive

The present invention as described in the exemplary embodiments herein makes use of AC power derived from the HVAC system (AC power, typically for use with HLM implementations) or in other circumstances may use battery power (battery power, typically for use with HLD implementations). However, some implementations may utilize ETHERNET or some other wired network that supports power-over-Ethernet) (POE). In these circumstances the wireless communication interface (WCI) will encompass a wired communication network (WCN) that provides power to the system. The WCI as described herein encompasses the possibility of the use of a WCN incorporating power-over-Ethernet (POE) as a power source for the system.

In these circumstances the HLD/HLM may be connected directly to maintenance technician or facility manager computers to allow these remote computers to perform HVAC system analysis, generate reports on HVAC systems, hydrocarbon-based gas (HBG) leak detection, and perform other functions on the HLD/HLM units.

HBG Leak Detection (HLD) Overview (0100)-(0600)

Basic HBG Leak Detection (HLD) (0100)

The present invention HBG leak detection (HLD) system in its simplest form is generally depicted in FIG. 1 (0100) wherein a hydrocarbon gas sensor (HGS) (0110) detects hydrocarbon-based gas (HBG) in ambient air that flows from a HBG source (0101) to supply a HVAC system HBG target (HBT) (0102) and produces a HBG sensor voltage (HSV) (0111) that is manipulated by a sensor signal conditioner (SSC) (0120) electrically configured by a digital control processor (DCP) (0130). The DCP (0130) may execute machine instructions read from a tangible computer readable medium (0131) and/or executes a finite state machine (FSM) (0132) to form a closed control loop (CCL) (0133) in which the analog electrical characteristics of the SSC (0120) are continually adjusted to account for dynamic recalibration of the HGS (0110).

Since the HGS (0110) may have a wide range of manufacturing variations resulting in a wide range of electrical characteristics, the DCP (0130) adjusts the SSC (0120) to account for these variations as well as ambient HBG level variations in order to achieve a reliable indication of an actual HBG leak in the HBS (0101) to HBT (0102) path. Once a reliable indication of a HBG leak has been detected, the DCP (0130) provides an indication of this via the use of one or more alarm status indicators (ASI) (0140) that may encompass audible and/or visual leak detection alarms.

The closed control loop (CCL) (0133) interaction between the analog electrical characteristics of the SSC (0120) and the DCP (0130) is critical to the proper operation of the overall HBG leak detection (HLD) system in that the HGS (0110) as implemented by most manufacturers is sensitive to refrigerant, benzene, alcohol, and a variety of other hydrocarbon-based gasses (HBG). Thus, the HGS (0110) would typically detect a wide range of cleaning compounds that are commonly utilized in institutional settings such as commercial buildings and other structures that incorporate distributed HVAC systems. Without some form of dynamic recalibration, these other hydrocarbons would falsely indicate a HBG leak and render the HLD useless as a true indicator of a HBS (0101) or HBT (0102) HBG leak.

Air Intake Fan (AIF) (0200)

Figure 2:
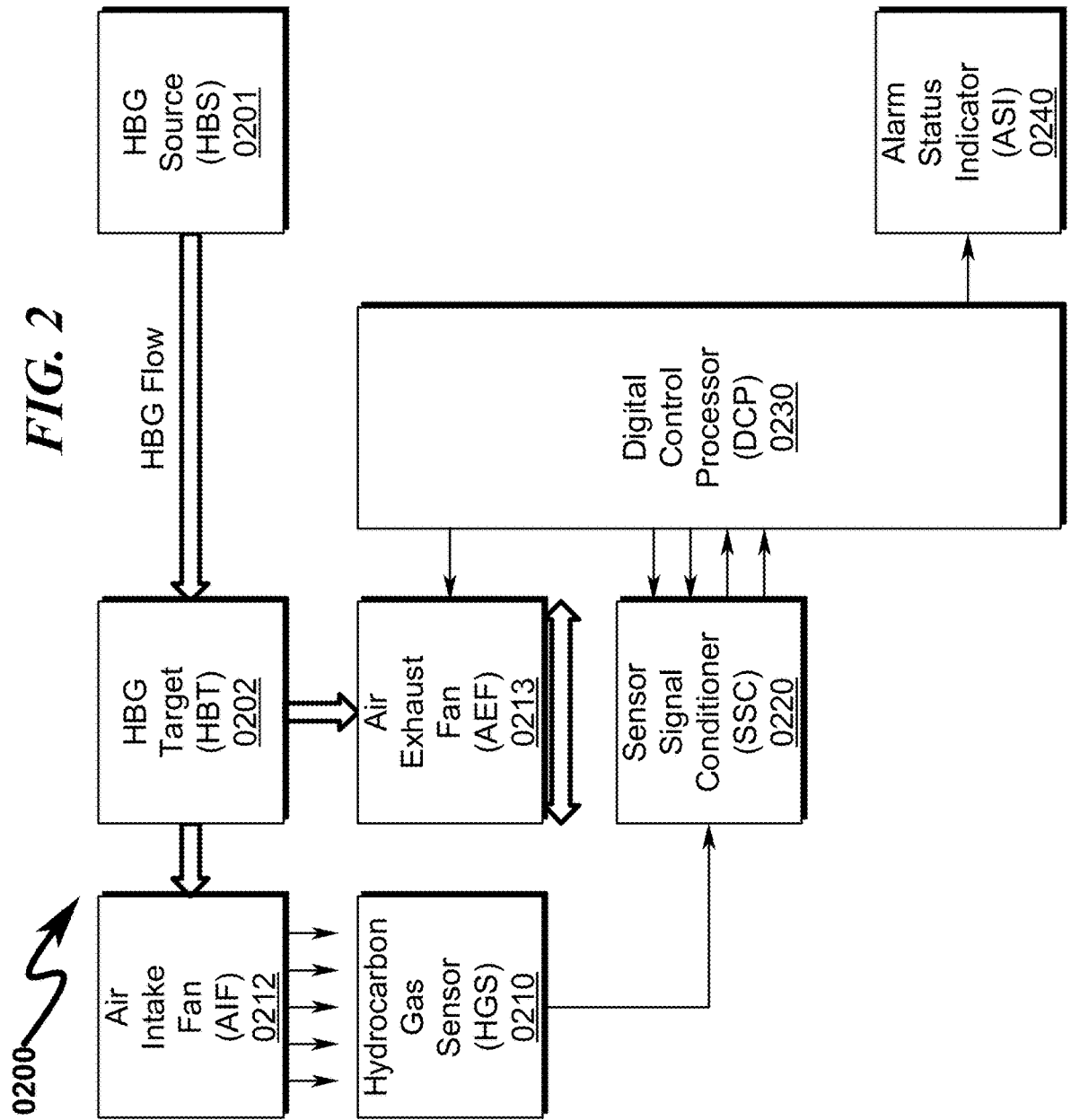
FIG. 2 illustrates a system block diagram depicting a preferred exemplary embodiment of a present invention hydrocarbon-based gas (HBG) leak detection system (HLD) augmented with an air intake fan (AIF)

As generally depicted in FIG. 2 (0200), the HLD may in some preferred embodiments be augmented with one or more air intake fans (AIF) (0212) that force ambient air surrounding one or more elements of the HBG target (HBT) (0202) across the HGS (0210) so as to enable better detection of a HGL in the HBT (0202) as well as force "stale" ambient air containing contaminants away from the HGS (0210) to enable rapid recalibration and reconfiguration of the SSC (0220) by the DCP (0230) and inhibit false HBG leak indications by the DCP (0230).

Air Exhaust Fan (AEF) (0200)

As generally depicted in FIG. 2 (0200), the HLD may in some preferred embodiments be augmented with one or more air exhaust fans (AEF) (0213) that force ambient air surrounding one or more elements of the HBG target (HBT) (0202) and/or HVAC ductwork outside the thermal boundary of the HVAC system in the event of any detected HBG leak by the DCP (0230). This AEF (0213) is generally separate from any distribution fan within the HVAC system and serves to vent combustible gas in the HVAC ductwork outside the thermal barrier of the HVAC system (typically venting this to the outside of the structure in which the HVAC system is contained). By properly detecting a HBG leak, the system is then capable of venting any combustible or other harmful gas that was detected by the present invention outside the thermal boundary of the HVAC system, thus protecting persons supported by the HVAC airflow.

The present invention may be configured to activate, deactivate, and/or change the operational state of the AEF depending on whether the DCP detects a HBG leak and a HLA is triggered by the ALARM STATE within the CCL operating on the DCP. The AEF may be independently powered so that in situations where the DCP disables all power to the HVAC ductwork/distribution fans the AEF is still operational to exhaust harmful/contaminated air from the inhabited space serviced by the HVAC system.

Sensor Record Memory (SRM)/Real-Time Clock (RTC) (0300)

Figure 3:
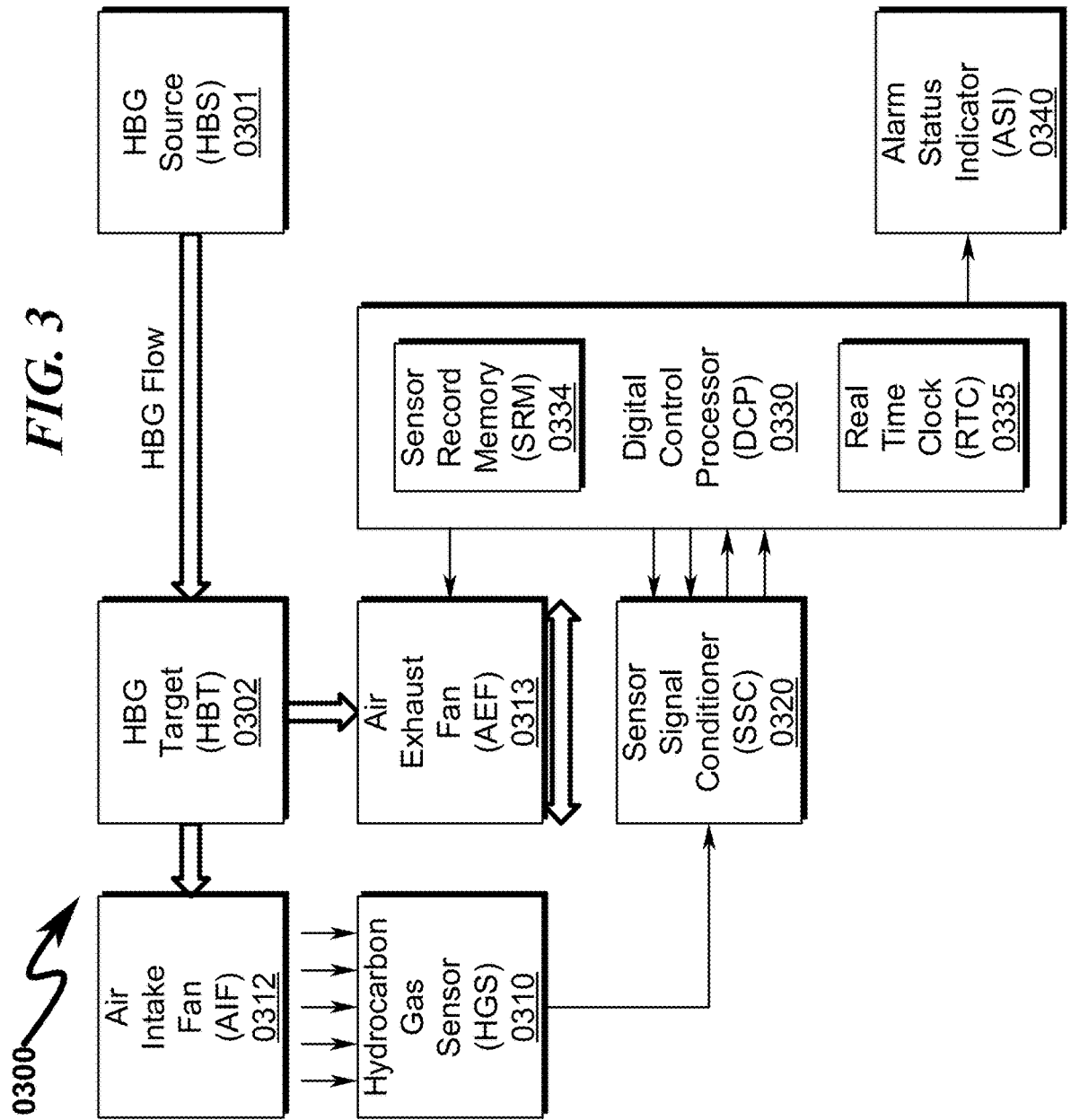
FIG. 3 illustrates a system block diagram depicting a preferred exemplary embodiment of a present invention hydrocarbon-based gas (HBG) leak detection system (HLD) augmented with an air intake fan (AIF), sensor record memory (SRM), and real-time clock (RTC)

As generally depicted in FIG. 3 (0300), the DCP (0330) may in some preferred embodiments be augmented with a sensor record memory (SRM) (0334) and/or a real-time clock (RTC) (0335) that allows the DCP (0330) to log HBG leak detections by the DCP (0330). This logging information may then be later communicated to an operator via the ASI (0340) or an alternative communication mechanism such as a wireless network. The SRM (0334) and/or a RTC (0335) may be implemented within the DCP (0330) or optionally incorporated as separate components in the overall system implementation.

Temperature/Humidity Sensor (THS) (0400)

Figure 4:
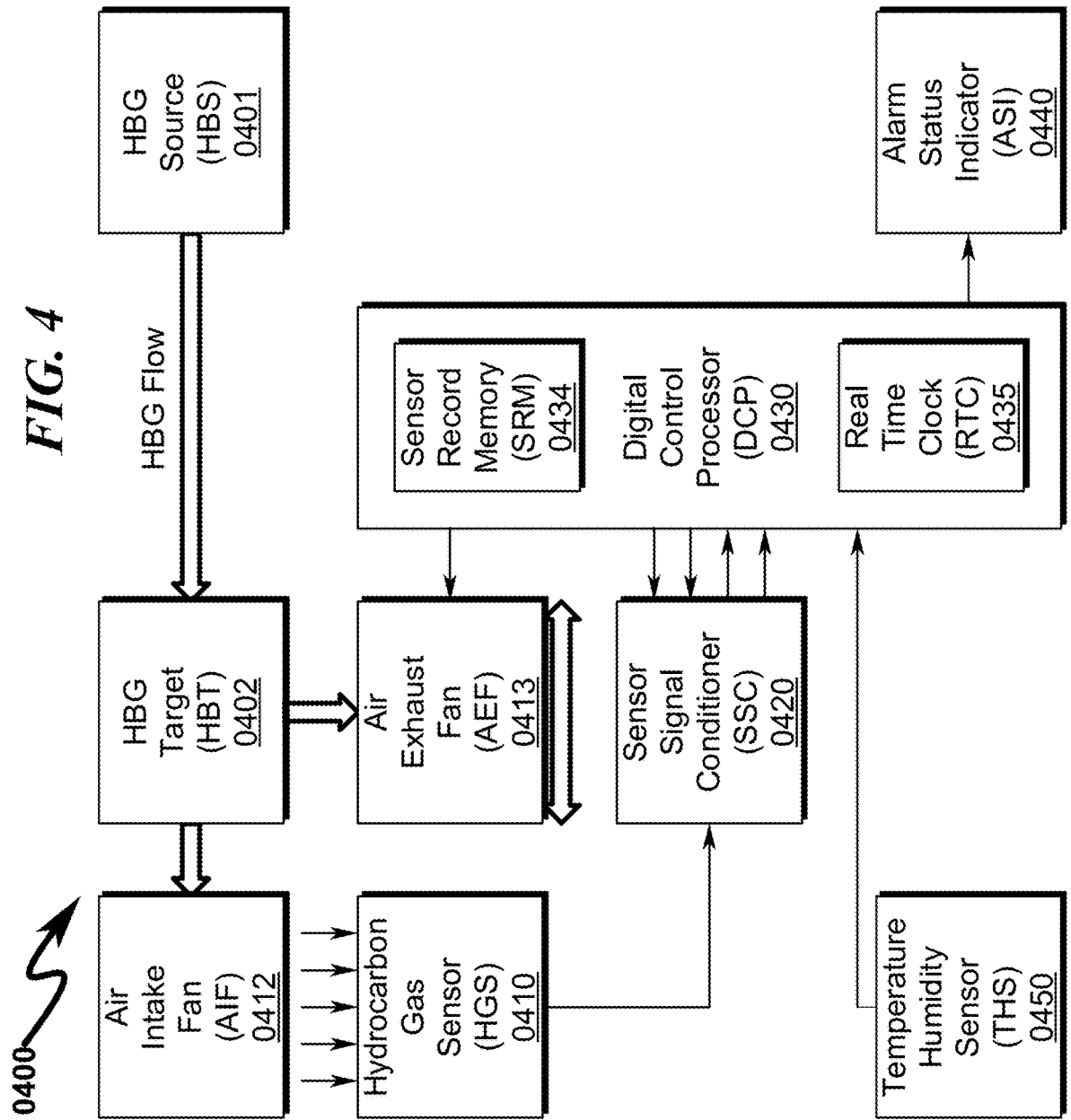
FIG. 4 illustrates a system block diagram depicting a preferred exemplary embodiment of a present invention hydrocarbon-based gas (HBG) leak detection system (HLD) augmented with an air intake fan (AIF), sensor record memory (SRM), real-time clock (RTC), and temperature/humidity sensor (THS)

As generally depicted in FIG. 4 (0400), the HLD system may in some preferred embodiments be augmented with a temperature/humidity sensor (THS) (0450) that allows the DCP (0430) to adjust the dynamic recalibration of the HGS (0410) based on ambient temperature and/or humidity readings.

This THS (0450) may also be used by the DCP (0430) to trigger performance alarms for the HVAC system even if no HBG leak is detected by the HGS (0410). In some circumstances a very slow refrigerant leak may reduce the performance of the HVAC system over time and be undetectable using the HGS (0450). In these circumstances a refrigerant recharge may be in order and this condition can be determined in some circumstances by monitoring the refrigerant coil temperatures during operation of the HVAC system. Thus, one or more THS (0450) sensors may be employed to constantly check the performance of the HVAC system and log these conditions as alarms to a technician or other individual.

A typical application of this temperature-based refrigerant leak detection system is the use of one or more temperature sensors monitoring the HVAC refrigerant liquid line temperature, HVAC refrigerant suction line temperature, HVAC return air temperature, and/or or the HVAC outdoor compressor discharge temperature. If some or all of these temperatures increase, it could indicate a refrigerant leak in the HVAC system that should be addressed by a repair technician. In this situation the DCP will activate the ASI and log a potential refrigerant leak for repair by the technician.

It should be noted that some refrigerants used in HVAC systems may be combustible or otherwise hazardous. Thus, a temperature-based leak detection methodology used in conjunction with a HBS sensor based approach may be used to detect and shutdown HVAC systems that incur slow leaks that may not be adequately detected using only HBS sensor based approaches.

Wireless Communication Interface (WCI)/Mobile User Device (MUD) (0500)

Figure 5:
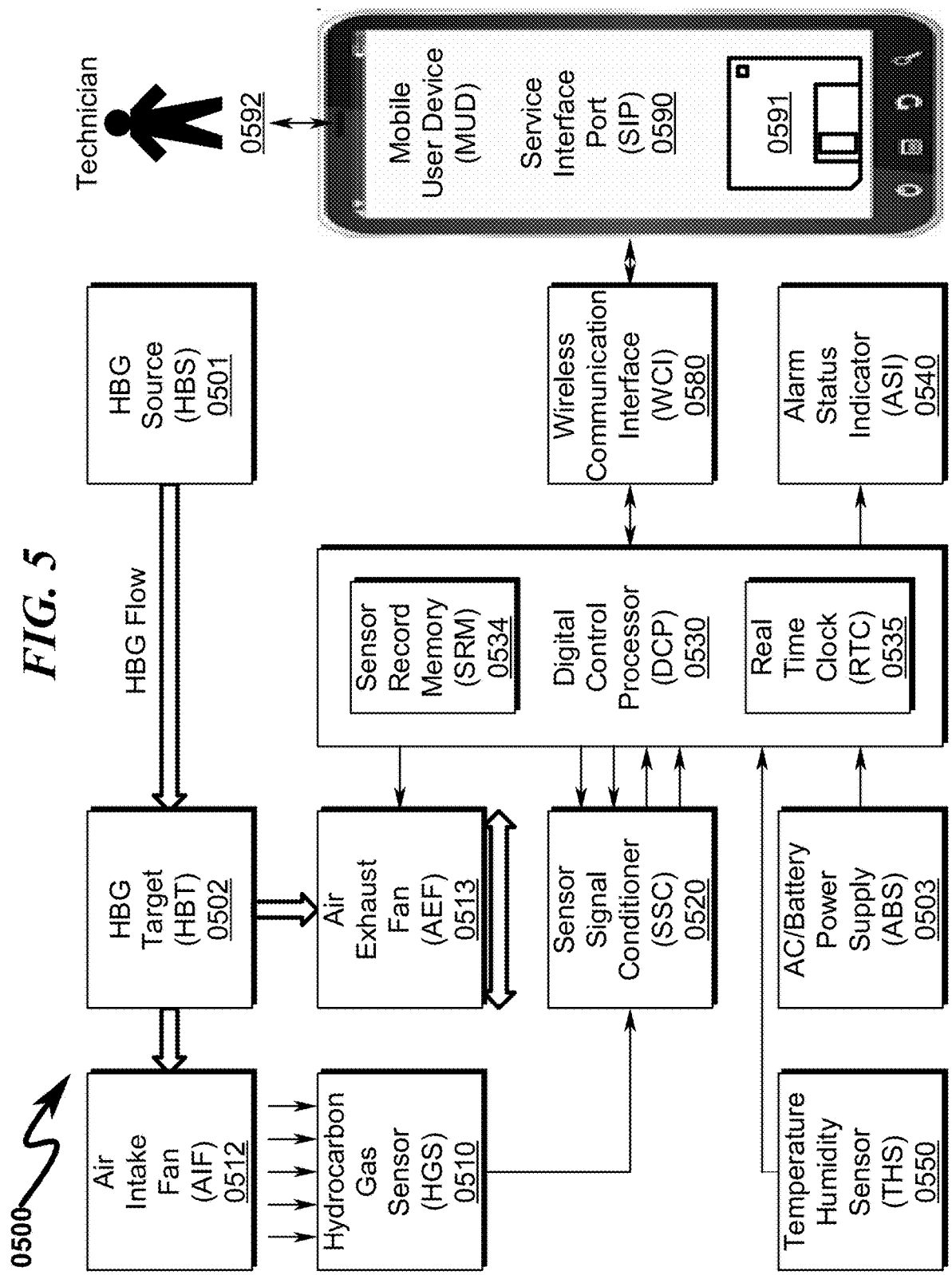
FIG. 5 illustrates a system block diagram depicting a preferred exemplary embodiment of a present invention hydrocarbon-based gas (HBG) leak detection system (HLD) augmented with an air intake fan (AIF), sensor record memory (SRM), real-time clock (RTC), temperature/humidity sensor (THS), AC/battery power supply (ABS), wireless communications interface (WCI), and mobile user device (MUD) service interface port (SIP)
Figure 7:
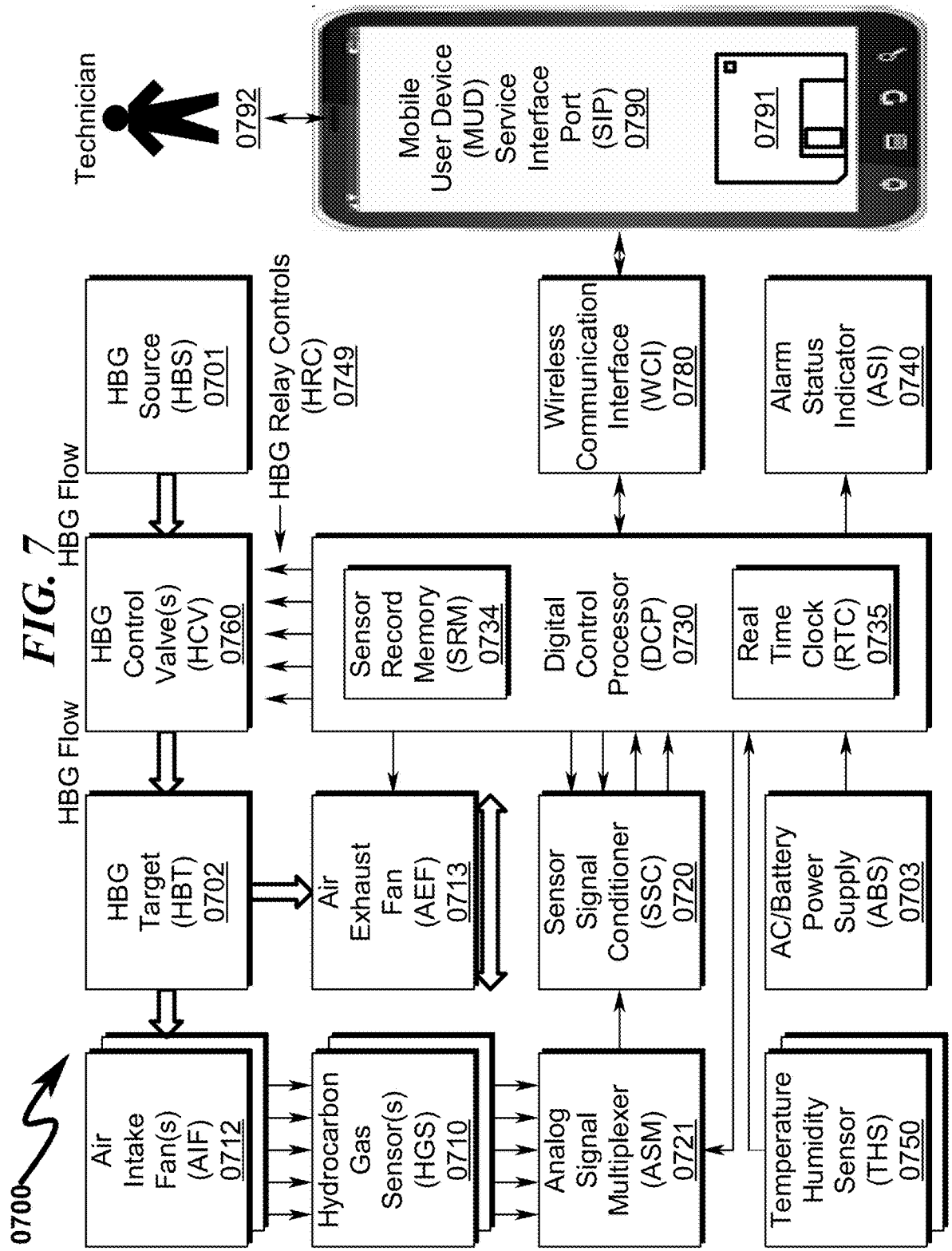
FIG. 7 illustrates a system block diagram depicting a preferred exemplary embodiment of a present invention hydrocarbon-based gas (HBG) leak mitigation system (HLM) incorporating HBG control valves (HCV) to enable shutdown of a leaking HBG source or target.

As generally depicted in FIG. 5 (0500), the HLD system may in some preferred embodiments be augmented with a wireless communication interface (WCI) (0580) and/or a mobile user device (MUD) service interface port (SIP) (0590) that allows information to be transmitted to/from the DCP (0530) relating to the state of the HVAC system, detected HBG leaks, and other information that may be logged in the sensor record memory (SRM) (0534). This WCI (0580)/MUD (0590) may also be used in some circumstances to control operation of the HVAC system such as control HBG flow valves or compressor contactors using the DCP (0530) as generally depicted in FIG. 7 (0700)-FIG. 8 (0800).

In many preferred embodiments an AC/Battery power supply (ABS) (0503) may be incorporated into the HLD system so as to allow it to be placed local to a potentially leaking HBT (0502) or HVAC compressor to allow logging of HBG leaks and reporting of same to the WCI (0580)/MUD (0590). In this manner a number of HLD systems can be deployed at a plurality of HBT (0502) or HVAC compressors and then a MUD (0590) be used at a later time to scan the individual HLD systems to determine which particular HBT (0502) or HVAC compressor is actually leaking. Since these leak conditions may be environmentally triggered and not constant, the ability to set the HLD systems in place, leave the facility, and return to obtain the SRM (0534) HBG leak logging information from each individual HLD system greatly simplifies the detection of HBG leaks in a spatially diverse and complex HBT (0502).

Multiplexed HGS Sensors (0600)

Figure 6:
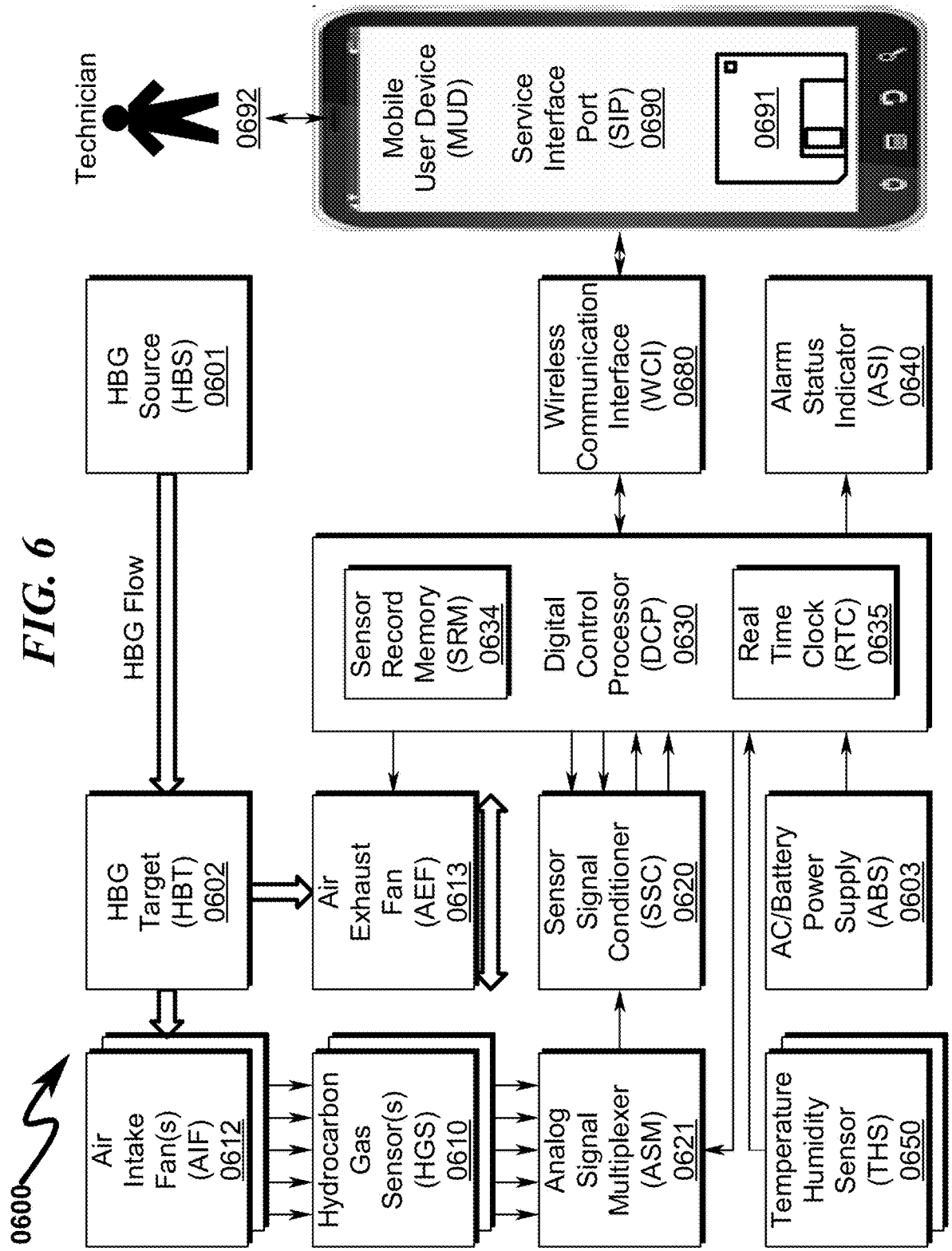
FIG. 6 illustrates a system block diagram depicting a preferred exemplary embodiment of a present invention hydrocarbon-based gas (HBG) leak detection system (HLD) augmented with an air intake fan (AIF), sensor record memory (SRM), real-time clock (RTC), temperature/humidity sensor (THS), AC/battery power supply (ABS), wireless communications interface (WCI), mobile user device (MUD) service interface port (SIP), and analog multiplexer multi-HGS sensor support.

As generally depicted in FIG. 6 (0600), the HLD system may in some preferred embodiments be augmented with an analog signal multiplexer (ASM) (0621) to allow inputs from multiple HGS (0610) to be inspected by the DCP (0630). In this manner a single HLD system may be used to gather HBG leak information from a multiple number of HGS (0610) sensors. Also shown in this diagram is the fact that many of the components such as the AIF (0612), HGS (0610), and THS (0650) may be replicated in the HLD system to provide for additional sensor monitoring functions based on particular application context.

HBG Leak Mitigation (HLM) Overview (0700)-(0800)

HVAC HBG Target (HBT) Individual Shutdown (0700)

The present invention HBG leak mitigation (HLM) system may contain any combination of HLD elements previously discussed in FIG. 1 (0100)-FIG. 6 (0600) and augments this HLD element configuration as generally depicted in FIG. 7 (0700) with one or more HBG control valves (HCV) (0760). The HCV (0760) are typically configured as relays or electrically activated flow valves that control operation of the fan blower motor (FBM), pilot gas valve (PGV), and/or HBG control valve (HCV) (controlling flow from a HBS to a HBT).

The HLM operation is such that when the DCP (0730) detects a HBG leak as signaled by the HGS (0710), an ALARM STATE is activated within the DCP (0730) and the DCP operates the HCV (0760) to shutdown HBG flow to the HBT (0702). In this manner a HVAC system servicing multiple HBT (0702) can be partially shut down so as to limit the HBG leak to one failing HBT (0702) rather than allowing the entire HVAC HBT (0702) to be drained of HBG to the leak in a particular HBT (0702). The ALARM STATE activated within the DCP (0730) will then activate appropriate alarms within the ASI (0740) and/or provide for an indication of the failing HBT (0702) via wireless communication (0780) to a mobile user device (0790) such as a tablet, smart phone, or other portable display device.

HVAC Compressor Contactor (HCC) Shutdown (0800)

Figure 8:
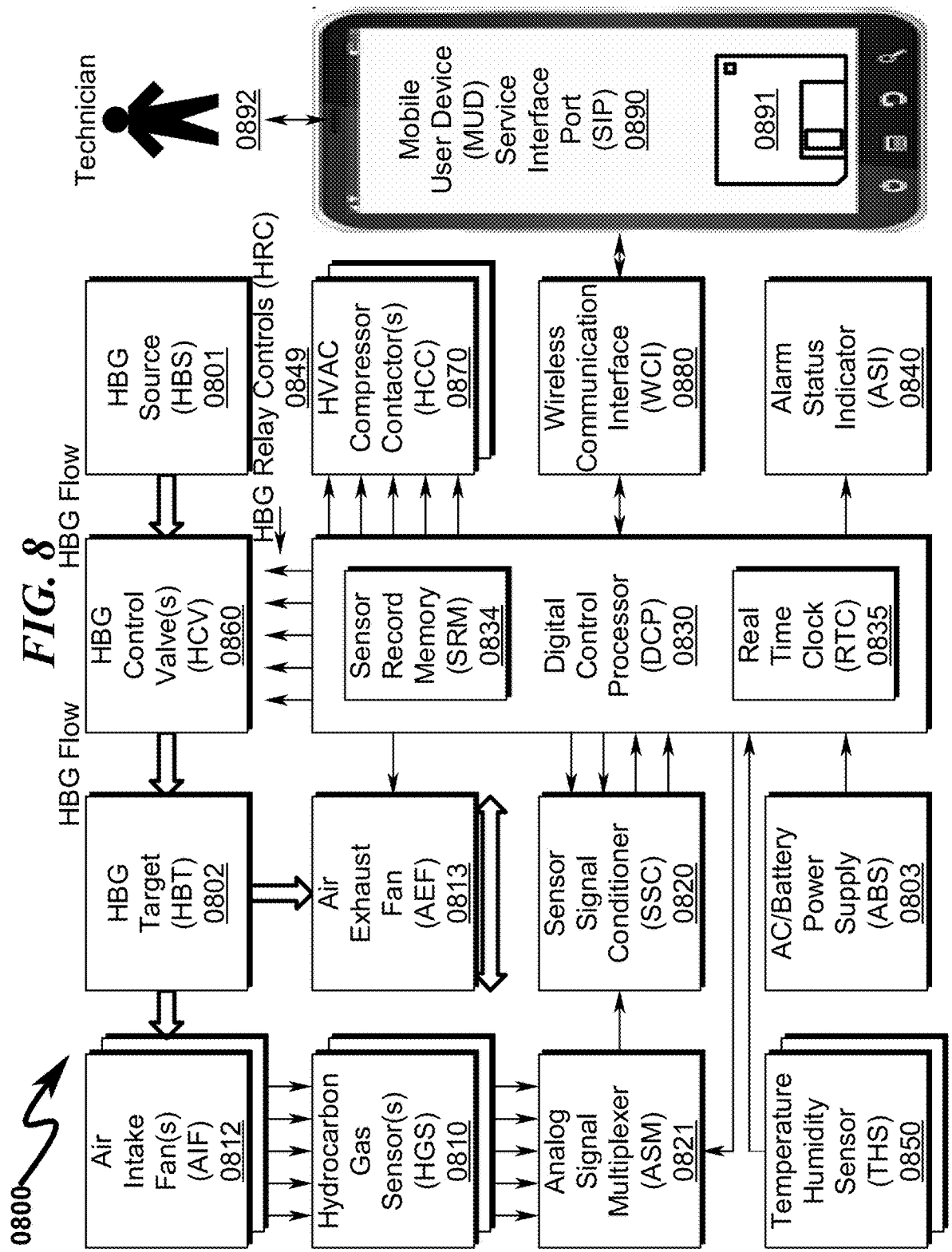
FIG. 8 illustrates a system block diagram depicting a preferred exemplary embodiment of a present invention hydrocarbon-based gas (HBG) leak mitigation system (HLM) incorporating HBG control valves (HCV) to enable shutdown of a leaking HBG source or target augmented with HVAC compressor contactors (HCC) to enable shutdown of the HVAC compressor.

The present invention HBG leak mitigation (HLM) system discussed in FIG. 7 (0700) may be augmented as depicted in FIG. 8 (0800) with an HVAC compressor contactor (HCC) (0870) interface to the DCP (0830) such that when the DCP (0830) ALARM STATE deactivates the HVAC HBG (0802) to one or more of the HVAC HBS (0801) via the use of one or more HBG control valves (HCV) (0860), the HCC (0870) are deactivated to inhibit operation of the HVAC refrigerant compressor. In this circumstance the offending HBS (0801) may be isolated and the HBT (0802) inhibited from losing HBG. As with the discussion of the HLM configuration of FIG. 7 (0700), the ALARM STATE activated within the DCP (0730) may then activate appropriate alarms within the ASI (0840) and/or provide for an indication of the failing HBS (0801) via wireless communication (0880) to a mobile user device (0890) such as a tablet, smart phone, or other portable display device.

Dynamic Sensor Calibration

The present invention incorporates dynamic sensor calibration to affect HBG leak detection (HLD) and HBG leak containment (HLC). Because hydrocarbon sensing detectors (HSD) are manufactured with wide variances in sensor detection levels and electrical tolerances, under normal circumstances a conventional HSD must be calibrated at the factory and these calibration constants embedded within the microcontroller or other instrument used in the field for HLD/HLC purposes.

LCS/LDT Sensor Calibration—Introduction

The hydrocarbon gas sensor (HGS) used in both the LCS and LDT consists of a heater and metal oxide semiconductor material on a ceramic substrate with a detection sensitivity typically in the range of 10-1000 ppm. Higher target gas concentrations result in a decrease of sensing element resistance. The HGS is heated above ambient temperature by an internal heating element and requires a minimum warm up of about two minutes to stabilize.

The LCS and LDT typically integrate the HGS with a microcontroller to form a control loop consisting of two digital potentiometers, an operational amplifier, and internal comparator within the microcontroller. There are four phases of operation controlled by machine instructions executed by the microcontroller that are stored in a non-tangible computer-readable medium (typically within the microcontroller): WARMUP STATE, MONITOR STATE, GAS DETECTION STATE, and ALARM STATE.

WARMUP STATE Operation

It is imperative that during the WARMUP STATE the device be placed outside the area to be tested with a good source of "clean air" such as a stairwell, open lobby, etc.

Digital potentiometers U2 (100 k) and U3 (10 k) are controlled by U1, the microcontroller which controls the digital potentiometer wiper positions and direction with a full range of 100 steps. The wiper of U2, pin 5 (W) is wired as a rheostat and forms a sensor load resistor that is varied as the senor is heated. The voltage developed across U2 (W) is connected to operation amplifier U4 that is set to a gain of 4. U4 output is connected to the internal microcontroller comparator input AIN0.

Digital potentiometer U3 (10 k) controlled by U1 functions as a reference voltage and is connected to the internal microcontroller comparator input AIN1.

At power up, the wiper of potentiometer U3 is set 2.5V which is applied to comparator input AIN1. Digital potentiometer U2 is initially set to a maximum resistance of 100 k and decremented in 1 k ohm steps until the output voltage of U4 connected to comparator input AIN0 drops to 2.5V and the internal comparator output flips to 0. This loop which requires about one second is then repeated during the selected warming time. The initial gas sensor resistance will steadily decrease as the sensor is heated until it stabilizes to a resistance of about 20 k ohms depending on quality of fresh air.

Monitor State

When the WARMUP STATE is complete and the device is relocated to the testing area, operation now switches to the MONITOR STATE that functions as a window comparator with U3 wiper output alternately switching from an upper threshold voltage of approximately 2.65V to a lower voltage threshold reference voltage of approximately 2.4V. The sensor output, which was calibrated in fresh air, is stabilized at 2.5V within the window of these upper and lower threshold voltages.

At this point one of three events will occur depending on hydrocarbon sensor voltage:
(1) If air quality remains constant, sensor output will remain between the upper and lower threshold voltage levels.
(2) If air within the testing area is "cleaner" causing sensor resistance to increase, that will cause a voltage decrease at AIN0 and if voltage drops below the lower threshold of 2.4V, the sensor will be recalibrated by adjusting U2 wiper back to 2.5V.
(3) If air within the testing area contains HBG gas (as small as 20 ppm), sensor resistance will decrease causing an increase in AIN0 voltage until it exceeds the upper threshold of 2.65V. At that point the auto calibrate function is disabled and control changes to the GAS DETECTION STATE.

Gas Detection State

Once sensor output exceeds upper threshold voltage, control will increment the wiper output voltage of U3, connected to AIN1 in 50mVDC increments and compare it to the sensor output at AIN0. The delay between each step is selectable in various amounts from 10 seconds to 2 minutes. A STEP COUNTER is incremented and stored as AIN1 chases the sensor voltage. The STEP COUNT is used as a diagnosis tool to determine severity of HBG gas leaks. If leak level exceeds 3.7 VDC or about 21 steps, system operation goes into ALARM STATE.

If gas leak concentrations decrease causing a decrease in sensor output, U3 will chase the sensor output decrementing by 50 mV and decrement step counter until system stabilizes or reenters MONITOR STATE.

Alarm State

When gas concentrations cause a sensor output greater than 3.7V then ALARM STATE is triggered. In the LCS product HVAC valve operation voltages would be disabled closing both solenoid valves, opening contacts to building management systems, and enabling an audible and visual alarm. In the LDT only the audible and visual alarms would be enabled. The system then reenters the WARMUP STATE by performing a remote reset or power reset.

HBG Leak Mitigation Method Overview
(0900)-(1000)

Figure 9:
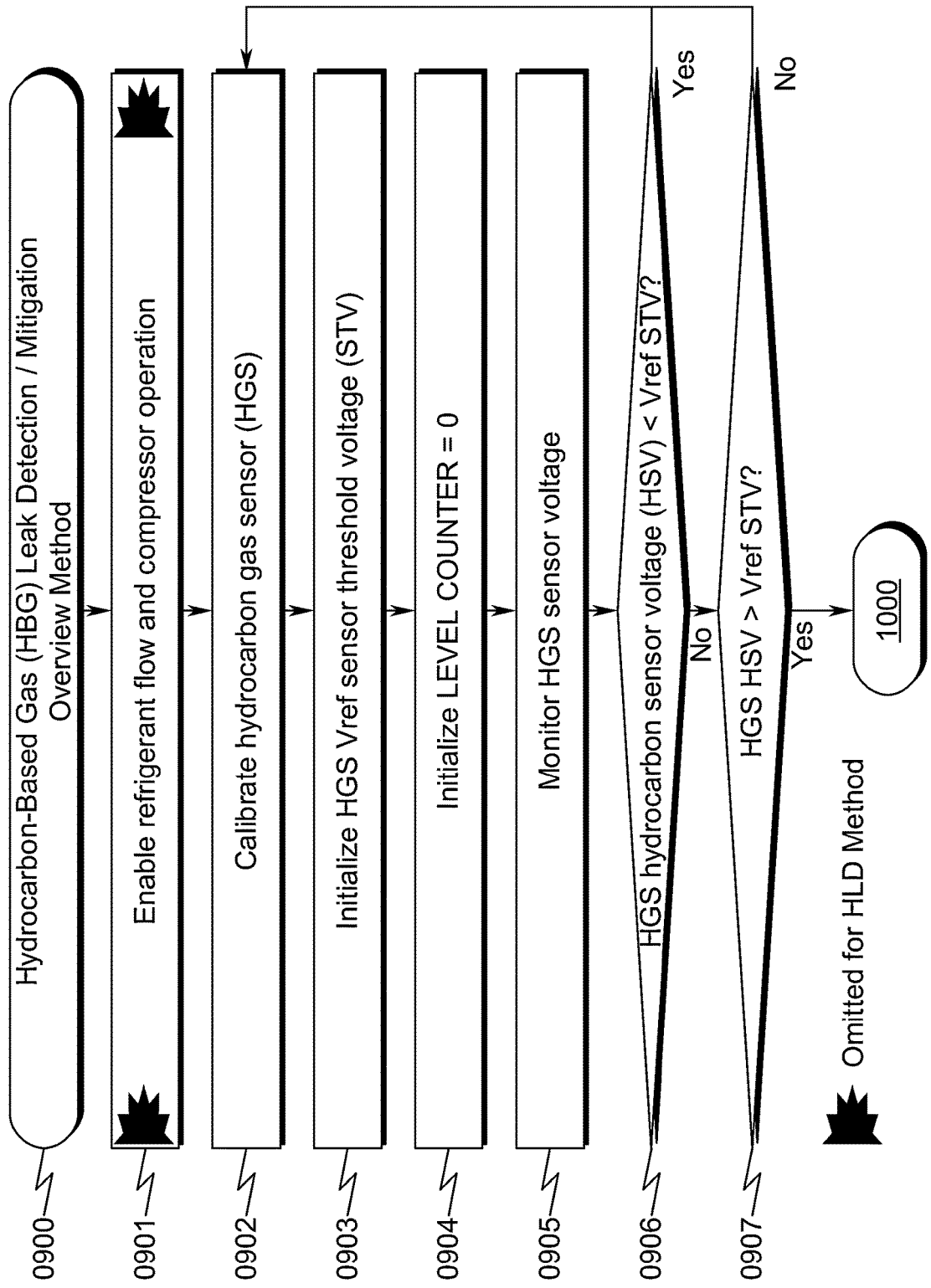
FIG. 9 illustrates a flowchart depicting a hydrocarbon-based gas (HBG) leak detection/mitigation overview method (1 of 2)
Figure 10:
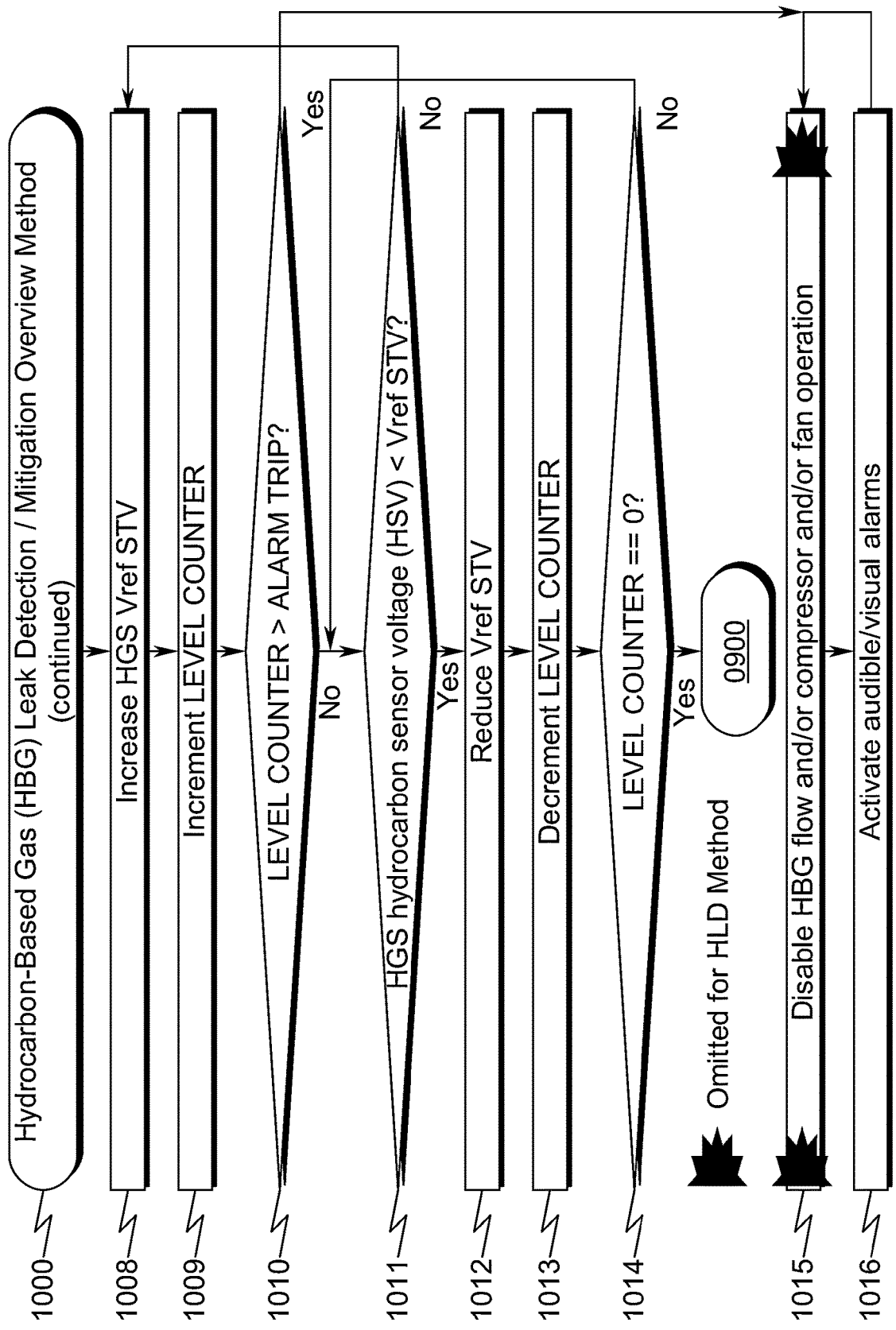
FIG. 10 illustrates a flowchart depicting a hydrocarbon-based gas (HBG) leak detection/mitigation overview method (2 of 2)

An exemplary embodiment of a HBG leak mitigation (HLM) method overview is generally depicted in FIG. 9 (0900)-FIG. 10 (1000). This method encompasses many, if not all, of the steps associated with a corresponding HBG leak (HLD) detection method but provides additional steps in which the HBG control valves (HCV) are open/closed as necessary to isolate portions of the HVAC system experiencing a HBG leak. In the case of a HLD system implementation, the alarms present in the method steps are designed to alert an operator or repair technician as to the presence of a HBG leak and the severity of the leak in question.

Figure 16:
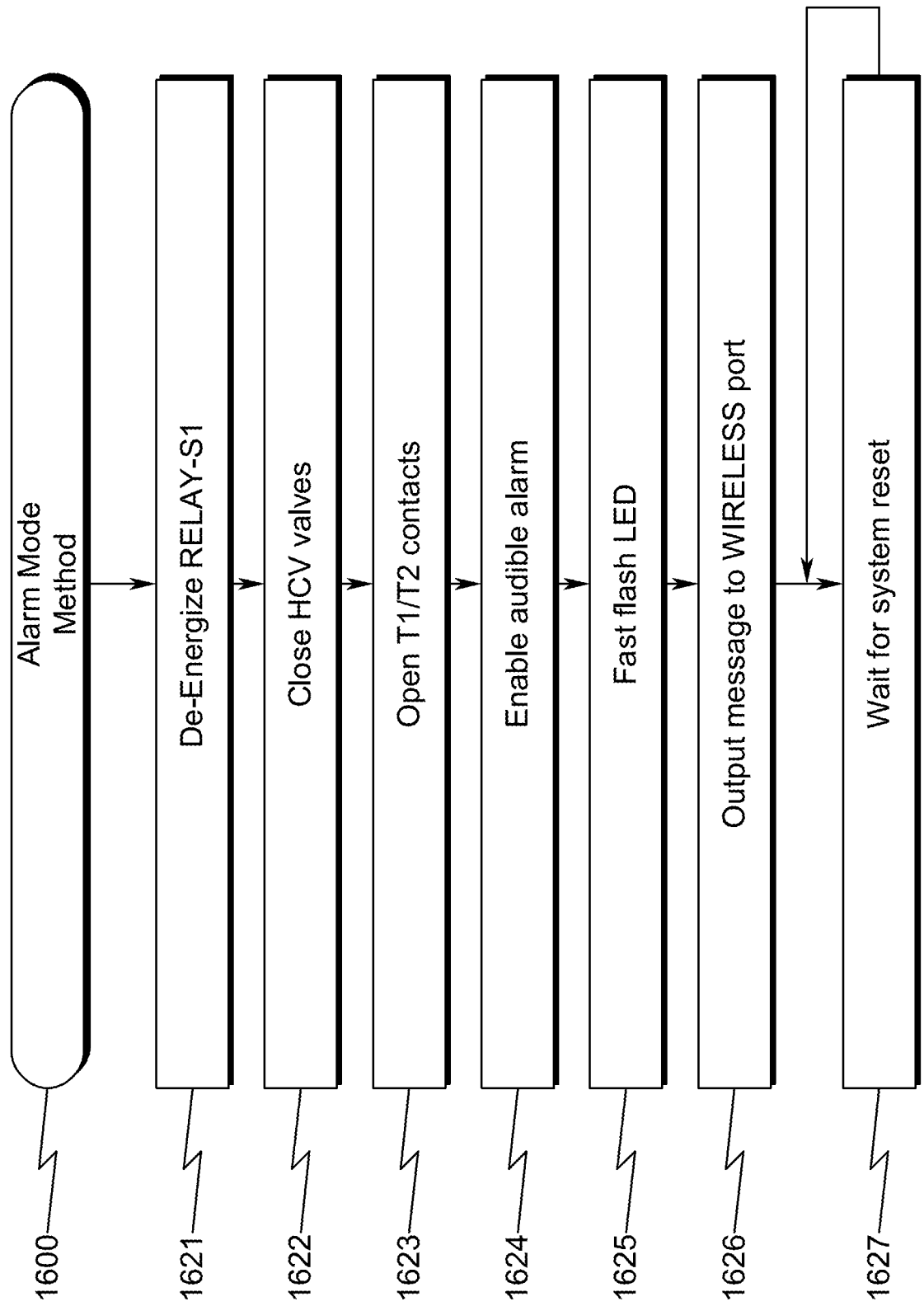
FIG. 16 illustrates a flowchart depicting a hydrocarbon-based gas (HBG) leak detection/mitigation detail method (alarm mode) (6 of 6)

As generally depicted in FIG. 9 (0900)-FIG. 16 (1600), the HLM method comprises the following steps:
(1) with the DCP, enabling HBG flow and compressor operation in the HVAC system (0901);
(2) with the DCP and the SSC, calibrating the hydrocarbon gas sensor (HGS) (0902);
(3) with the DCP and the SSC, initializing the HGS Vref sensor threshold voltage (STV) (0903);

(4) with the DCP, initializing a LEVEL COUNTER to 0 (0904);
(5) with the DCP and the SSC, monitoring the HGS hydrocarbon sensor voltage (HSV) (0905);
(6) with the DCP and the SSC, determining if the HGS HSV is less than the Vref STV, and if so, proceeding to step (2) (0906);
(7) with the DCP and the SSC, determining if the HGS HSV is greater than the Vref STV, and if not, proceeding to step (2) (0907);
(8) with the DCP and the SSC, initializing the Vref STV (1008);
(9) with the DCP, increasing the LEVEL COUNTER (1009);
(10) with the DCP, determining if the LEVEL COUNTER is greater than an ALARM TRIP value, and if so, proceeding to step (15) (1010);
(11) with the DCP and the SSC, determining if the HGS HSV is less than the HGS Vref STV, and if not, proceeding to step (8) (1011);
(12) with the DCP and the SSC, reducing the HGS Vref STV (1012);
(13) with the DCP, decrementing the LEVEL COUNTER (1013);
(14) with the DCP, determining if the LEVEL COUNTER is 0, and if not, proceeding to step (11), otherwise proceeding to step (1) (1014);
(15) with the DCP, disabling HVAC HBG flow and/or compressor and/or fan operation (1015);
(16) with the DCP, activating audible/visual alarms and proceeding to step (15) (1016).

One skilled in the art will recognize that these process steps are exemplary and may be rearranged, augmented, or redacted and will by necessity be adjusted based on application context and the hardware implementation of the system.

HBG Leak Detection Method Overview (0900)-(1000)

An exemplary embodiment of a HBG leak detection (HLD) method overview is generally depicted in FIG. 9 (0900)-FIG. 10 (1000) wherein some of the steps of the HLM method are omitted. In the case of a HLD system implementation, the alarms present in the method steps are designed to alert an operator or repair technician as to the presence of a HBG leak and the severity of the leak in question.

As generally depicted in FIG. 9 (0900)-FIG. 16 (1600), the HLD method comprises the following steps:
(1) with the DCP and the SSC, calibrating the hydrocarbon gas sensor (HGS) (0902);
(2) with the DCP and the SSC, initializing the HGS Vref sensor threshold voltage (STV) (0903);
(3) with the DCP, initializing a LEVEL COUNTER to 0 (0904);
(4) with the DCP and the SSC, monitoring the HGS hydrocarbon sensor voltage (HSV) (0905);
(5) with the DCP and the SSC, determining if the HGS HSV is less than the Vref STV, and if so, proceeding to step (1) (0906);
(6) with the DCP and the SSC, determining if the HGS HSV is greater than the Vref STV, and if not, proceeding to step (1) (0907);
(7) with the DCP and the SSC, initializing the Vref STV (1008);
(8) with the DCP, increasing the LEVEL COUNTER (1009);
(9) with the DCP, determining if the LEVEL COUNTER is greater than an ALARM TRIP value, and if so, proceeding to step (14) (1010);
(10) with the DCP and the SSC, determining if the HGS HSV is less than the HGS Vref STV, and if not, proceeding to step (7) (1011);
(11) with the DCP and the SSC, reducing the HGS Vref STV (1012);
(12) with the DCP, decrementing the LEVEL COUNTER (1013);
(13) with the DCP, determining if the LEVEL COUNTER is 0, and if not, proceeding to step (10), otherwise proceeding to step (1) (1014);
(14) with the DCP, activating audible/visual alarms and proceeding to step (14) (1016).

One skilled in the art will recognize that these process steps are exemplary and may be rearranged, augmented, or redacted and will by necessity be adjusted based on application context and the hardware implementation of the system.

HBG Leak Mitigation Method Detail (1100)-(1600)

Figure 11:
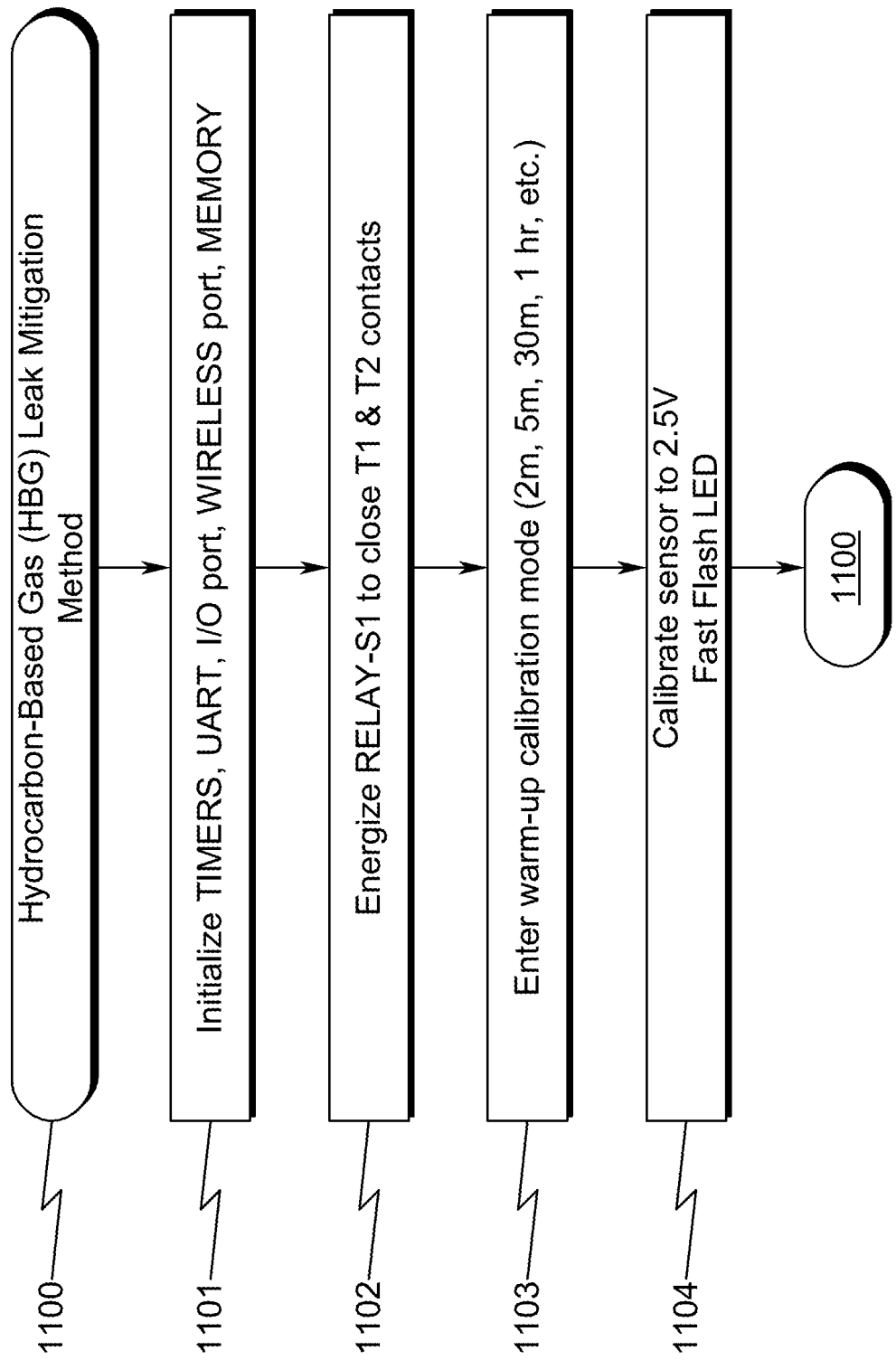
FIG. 11 illustrates a flowchart depicting a hydrocarbon-based gas (HBG) leak detection/mitigation detail method (1 of 6)
Figure 12:
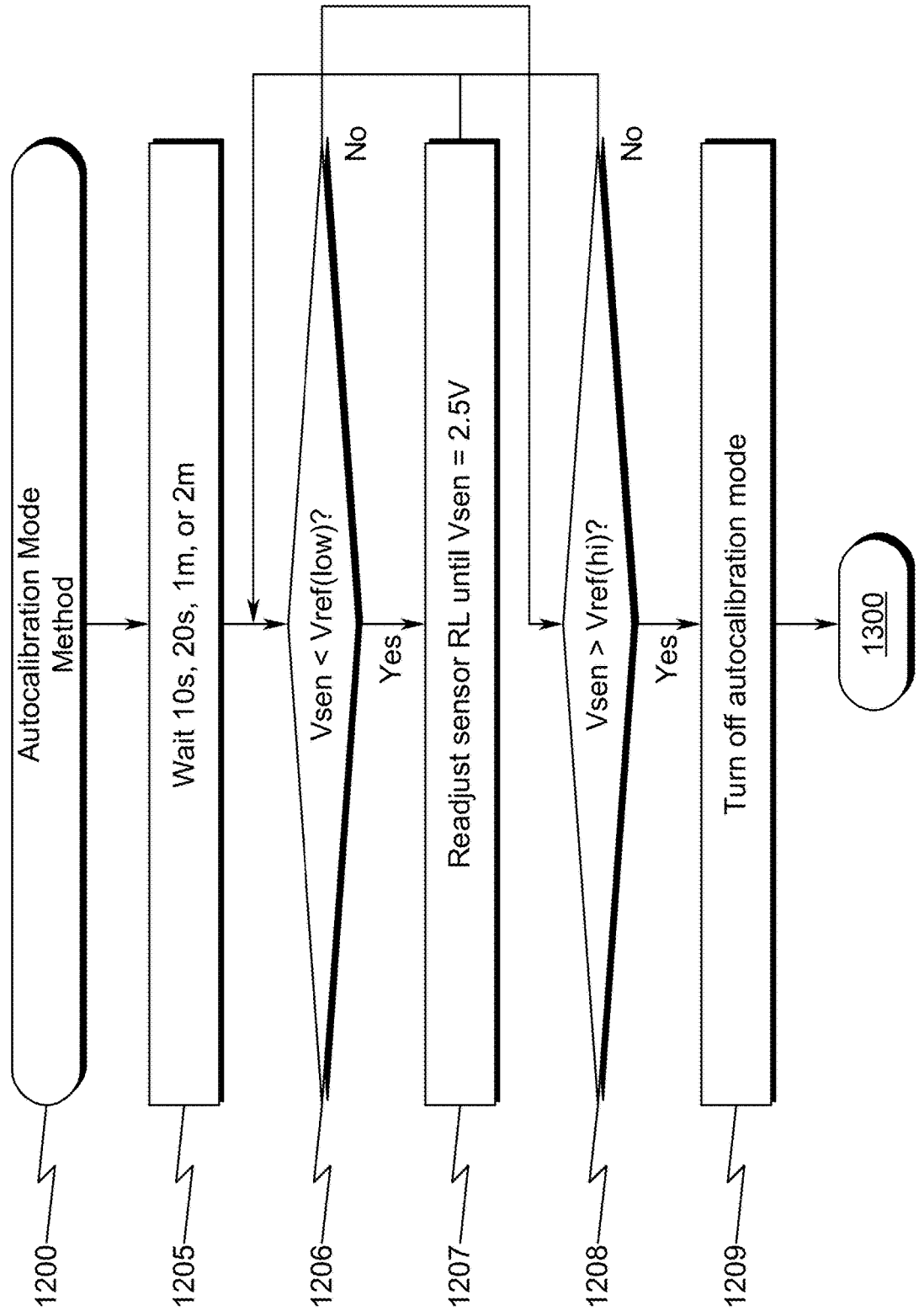
FIG. 12 illustrates a flowchart depicting a hydrocarbon-based gas (HBG) leak detection/mitigation detail method (autocalibrate mode) (2 of 6)
Figure 13:
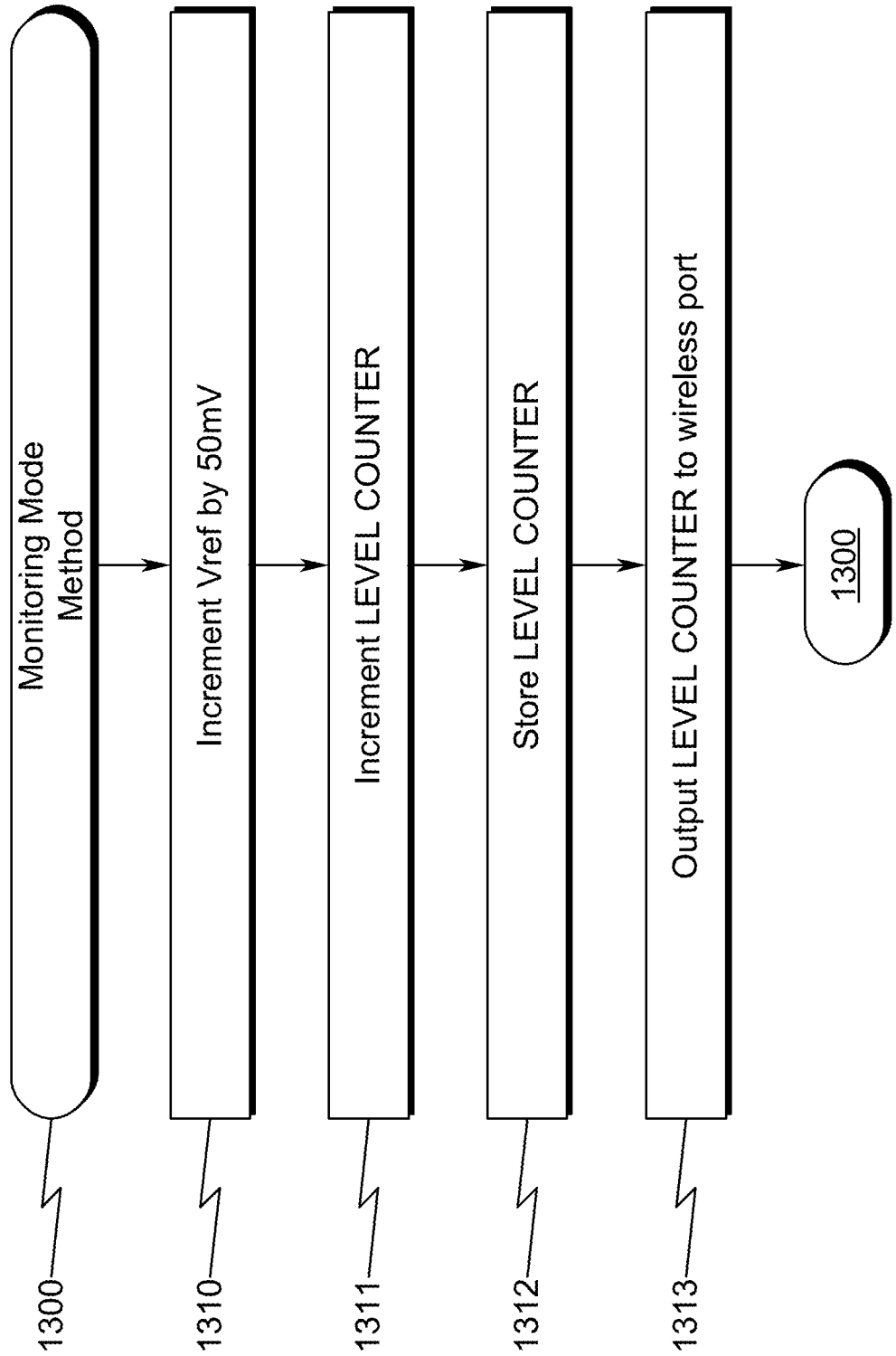
FIG. 13 illustrates a flowchart depicting a hydrocarbon-based gas (HBG) leak detection/mitigation detail method (monitoring mode) (3 of 6)
Figure 14:
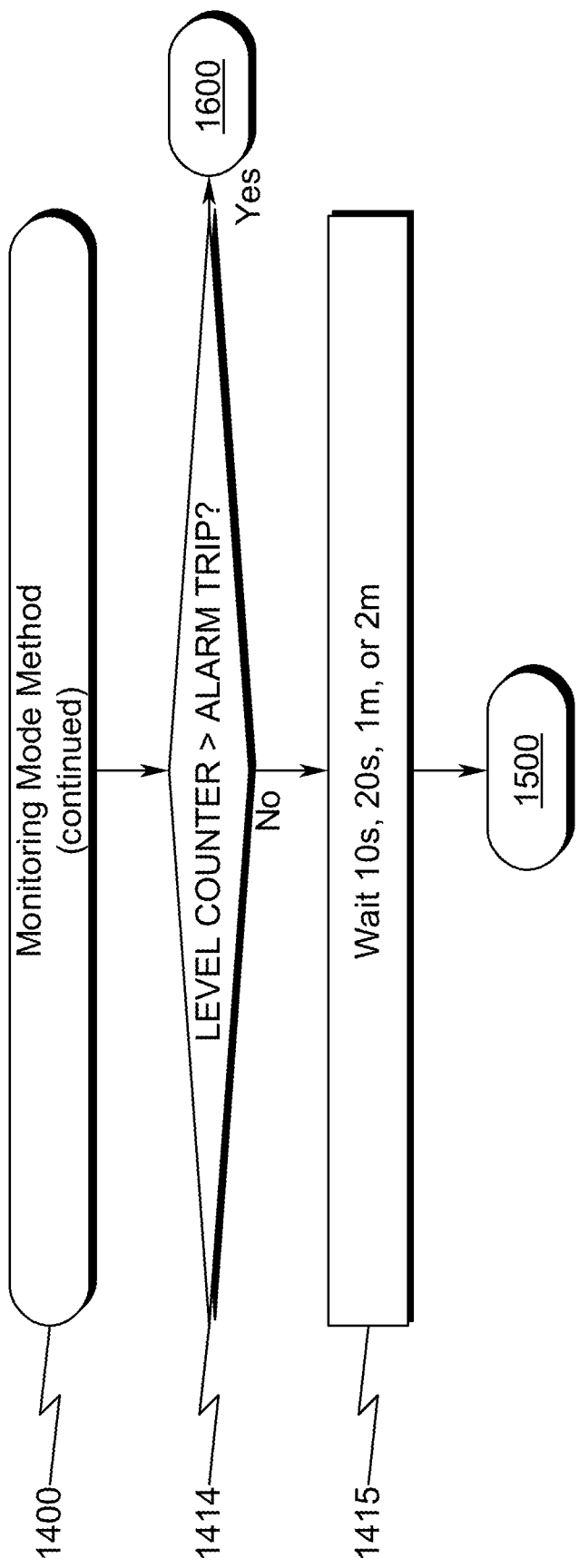
FIG. 14 illustrates a flowchart depicting a hydrocarbon-based gas (HBG) leak detection/mitigation detail method (monitoring mode continued) (4 of 6)
Figure 15:
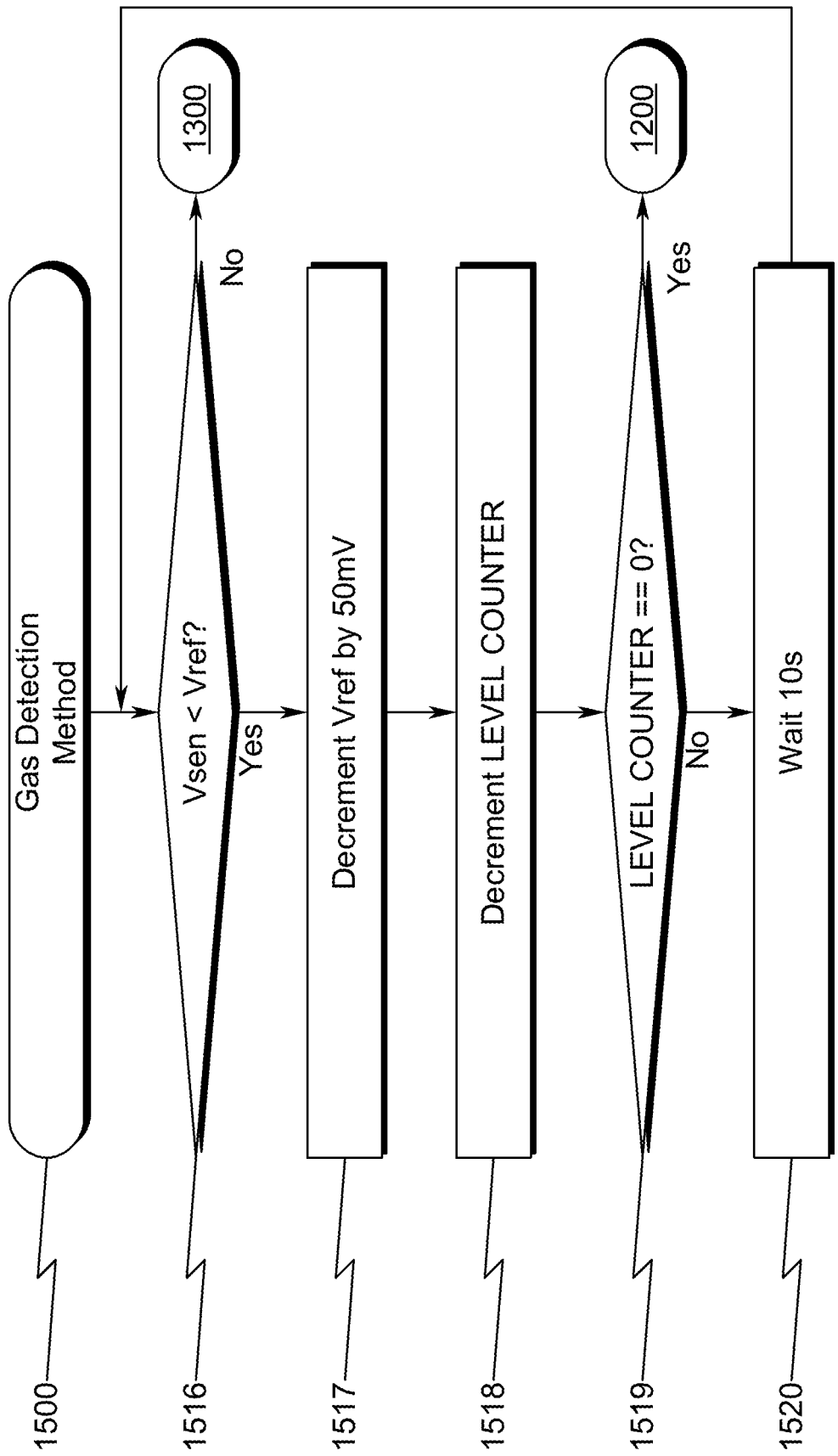
FIG. 15 illustrates a flowchart depicting a hydrocarbon-based gas (HBG) leak detection/mitigation detail method (gas detection mode) (5 of 6)

Additional detail of a HBG leak mitigation (HLM) method is generally depicted in FIG. 11 (1100)-FIG. 16 (1600). This method encompasses many, if not all, of the steps associated with a corresponding HBG leak (HLD) detection method but provides additional steps in which the HBG control valves (HCV) are open/closed as necessary to isolate portions of the HVAC system experiencing a HBG leak. In the case of a HLD system implementation, the alarms present in the method steps are designed to alert an operator or repair technician as to the presence of a HBG leak and the severity of the leak in question.

As generally depicted in FIG. 11 (1100)-FIG. 16 (1600), the HLM method detail comprises the following steps:
(1) with the DCP, initializing TIMERS, UART, I/O PORTS, WIRELESS PORT, and MEMORY (1101);
(2) with the DCP, energizing RELAY-S1 to close T1 & T2 contacts for FBM, PGV, HCV (1102);
(3) with the DCP, entering a warm-up calibration mode for a selected timer period (2 m, 5 m, 30 m, 1 hr, etc.) (1103);
(4) with the DCP and the SSC, calibrating the HGS to 2.5V and indicating calibration mode with a flashing LED (1104);
(5) with the DCP, entering AUTOCALIBRATION MODE by delaying a selected time period (10 s, 20 s, 1 m, 2 m, etc.) (1205);
(6) with the DCP and the SSC, determining if the HGS Vsen output is less than the Vref low trip level, and if not, proceeding to step (8) (1206);
(7) with the DCP and the SSC, readjusting the HGS sensor RL until Vsen=2.5V, and proceeding to step (6) (1207);
(8) with the DCP and the SSC, determining if the HGS Vsen output is greater than the Vref low trip level, and if not, proceeding to step (6) (1208);
(9) with the DCP, disabling AUTOCALIBRATION MODE (1209);
(10) with the DCP and the SSC, entering MONITORING MODE by incrementing Vref by 50 mV (1310);
(11) with the DCP, incrementing the LEVEL COUNTER (1311);
(12) with the DCP, storing the LEVEL COUNTER in local memory for later retrieval (1312);

(13) with the DCP, outputting the LEVEL COUNTER to the wireless communication interface (WCI) port (1313);

(14) with the DCP, determining if the LEVEL COUNTER is greater than an ALARM TRIP threshold value, and if so, proceeding to step (21) (1414);

(15) with the DCP, delaying a selected period of time (10 s, 20 s, 1 m, 2 m, etc.) (1415);

(16) with the DCP and the SSC, entering a GAS DETECTION MODE and determining if the HGS Vsen is less than Vref, and if not, proceeding to step (10) (1516);

(17) with the DCP and the SSC, decrementing Vref by 50 mV (1517);

(18) with the DCP, decrementing the LEVEL COUNTER (1518);

(19) with the DCP, determining if the LEVEL COUNTER is 0, and if so, proceeding to step (5) (1519);

(20) with the DCP, delaying a selected time period (10 s, 20 s, etc.) (1520);

(21) with the DCP, entering an ALARM MODE, and de-energizing HVAC RELAY-S1 (1621);

(22) with the DCP, closing SVS and SVL HBG control valves (HCV) to isolate the HBS (1622);

(23) with the DCP, opening T1/T2 contacts in a HVAC relay (1623);

(24) with the DCP, enabling an audible alarm (1624);

(25) with the DCP, enabling a LED visual alarm (1625);

(26) with the DCP, outputting a message to the WIRELESS PORT (1626); and

(27) with the DCP, halting HVAC HBG flow and waiting for a system reset and proceeding to step (27) (1627).

One skilled in the art will recognize that these process steps are exemplary and may be rearranged, augmented, or redacted and will by necessity be adjusted based on application context and the hardware implementation of the system.

State Machine Detail (1700)-(2000)

State Machine Overview (1700)

Figure 17:
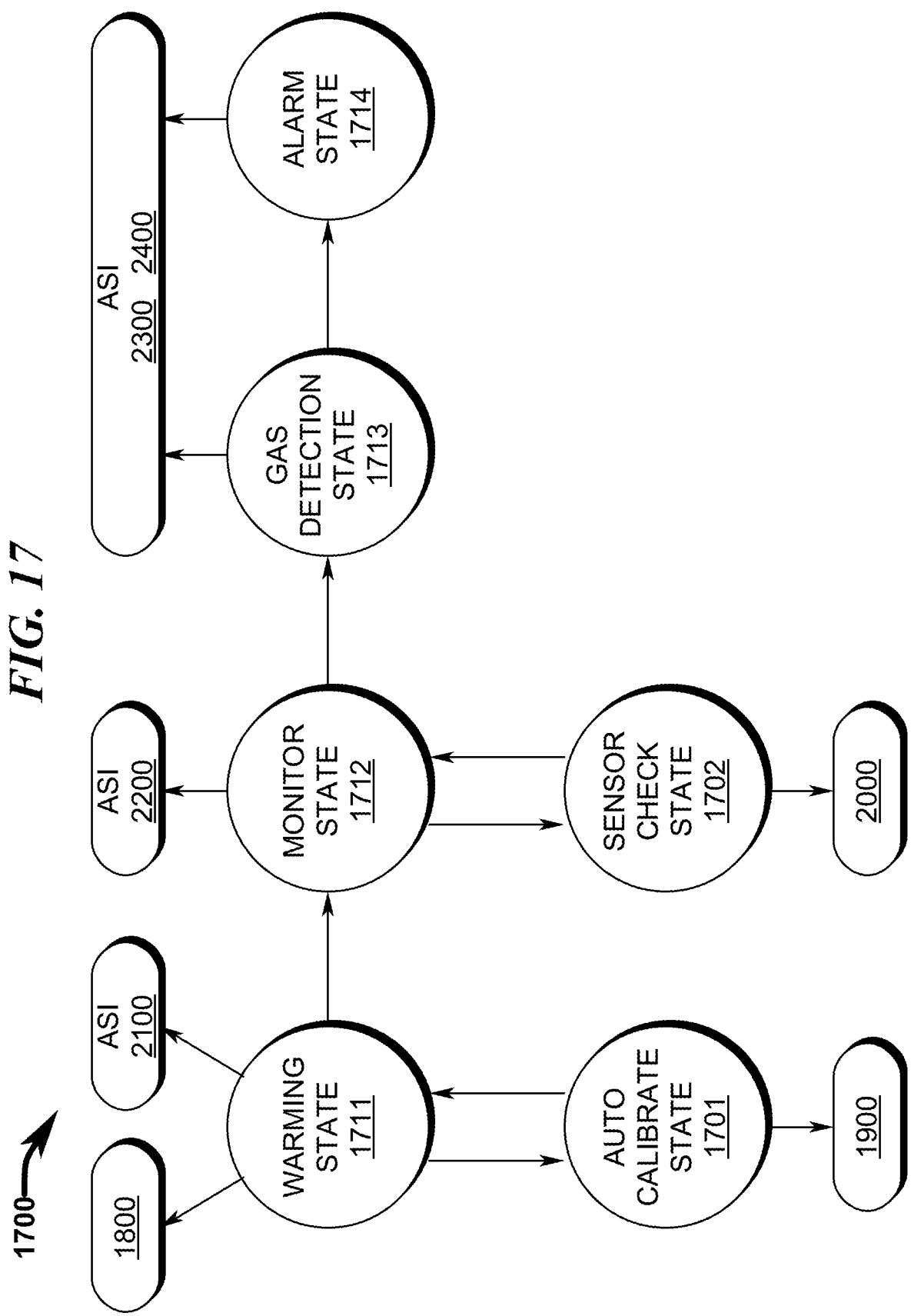
FIG. 17 illustrates a state diagram depicting various states associated with the CCL and DCP.
Figure 20:
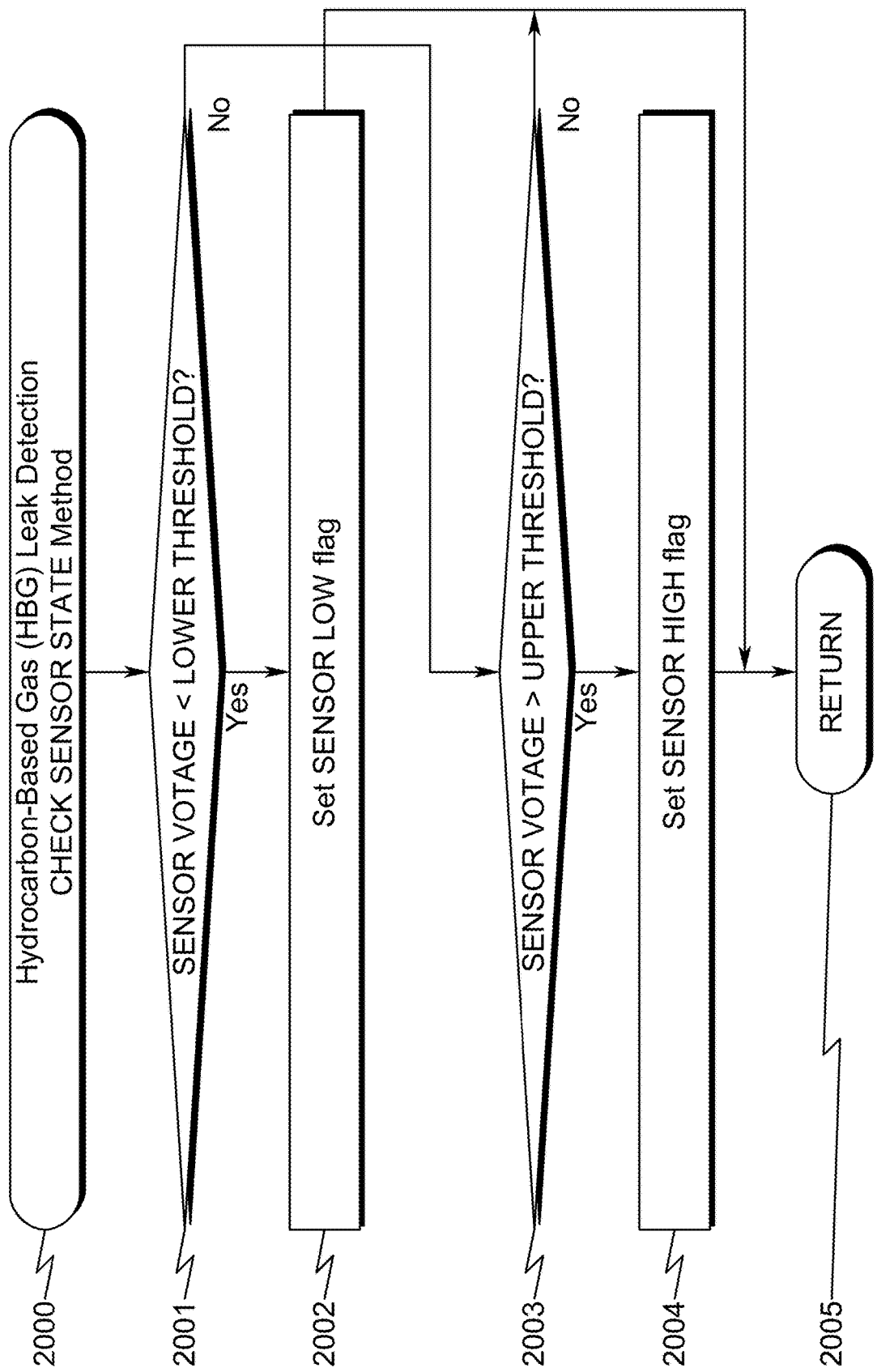
FIG. 20 illustrates a flowchart depicting a hydrocarbon-based gas (HBG) leak detection method (check sensor state)

A more detailed overview of the closed control loop (CCL) implemented between the DCP and the SSC is generally depicted in FIG. 17 (1700)-FIG. 20 (2000). Referencing the state machine diagram depicted in FIG. 17 (1700), it can be seen that the CCL comprises major states consisting of: a WARMING STATE (1711), a MONITORING STATE (1712), a GAS DETECTION STATE (1713), and an ALARM STATE (1714), and is supplemented with ancillary AUTO CALIBRATION STATE (1701) and SENSOR CHECK STATE (1702).

Figure 25:
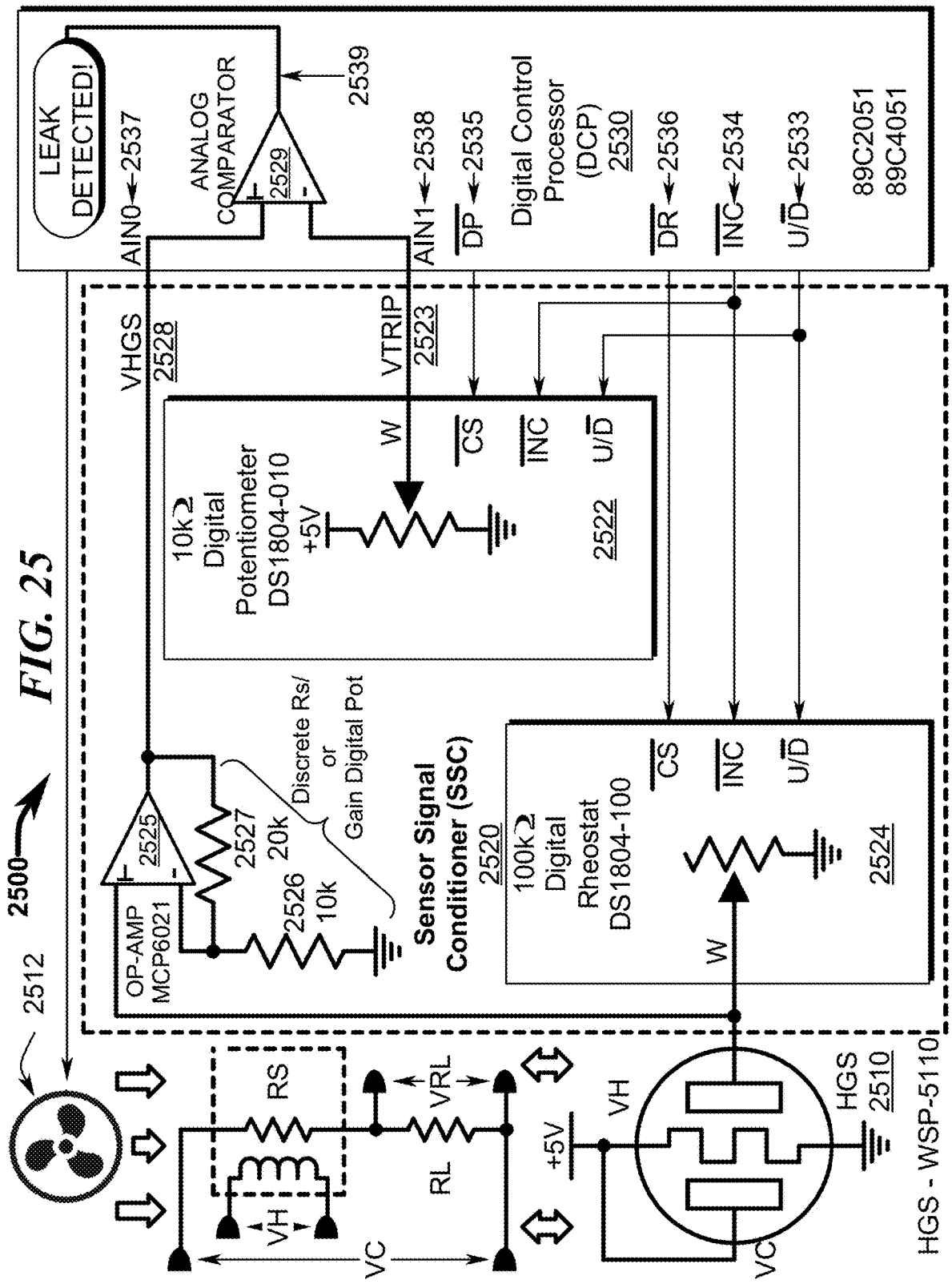
FIG. 25 illustrates a schematic depicting a preferred exemplary sensor signal conditioner (SSC) embodiment.
Figure 64:
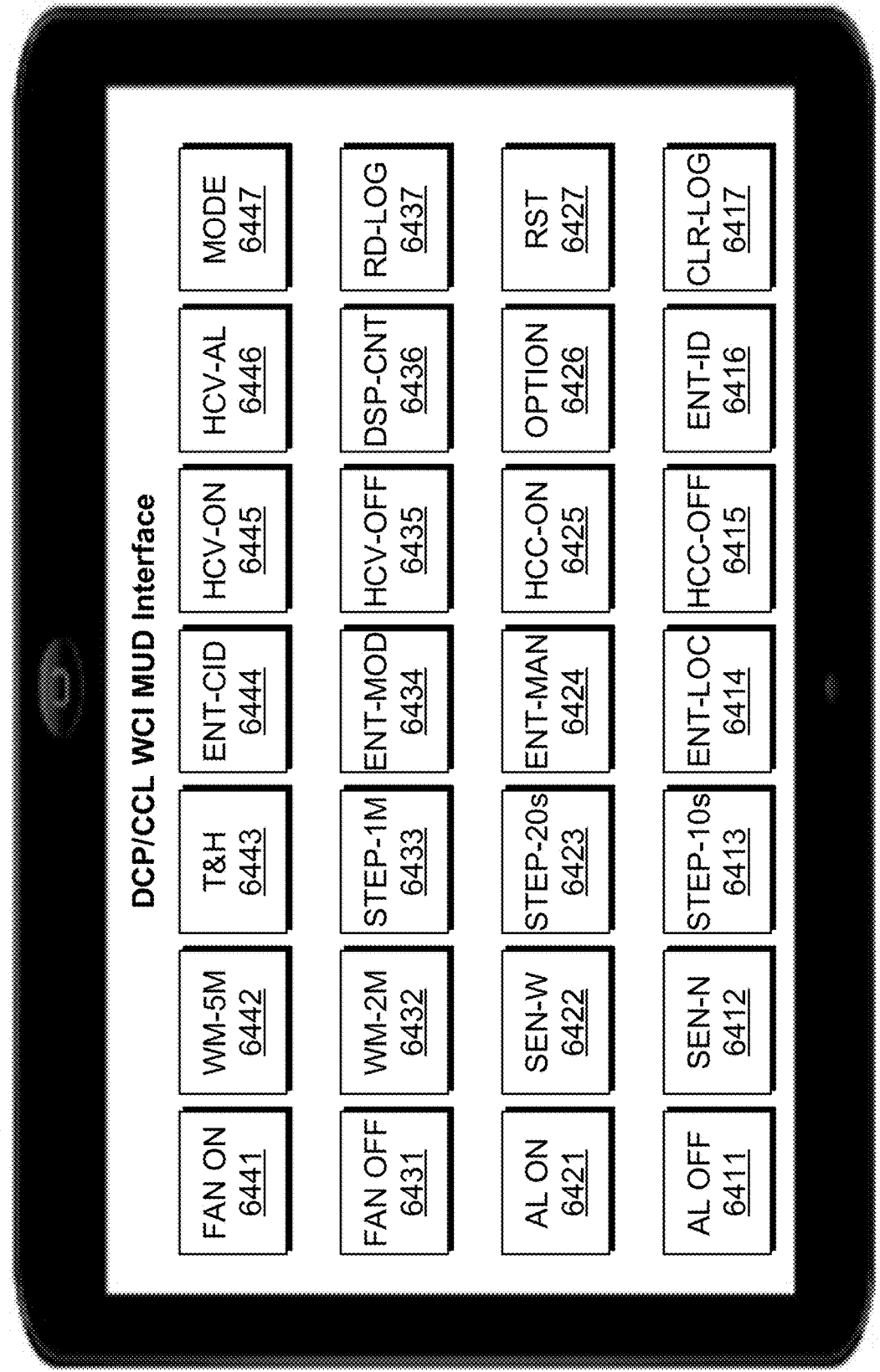
FIG. 64 illustrates a typical DCP/CCL mobile user device (MUD) status and control tablet interface useful in some preferred invention embodiments.

The following discussion implements a CCL between the DCP and the SSC with respect to hardware depicted and described in detail in FIG. 25 (2500)-FIG. 64 (6400).

WARMING STATE (1800)

Figure 18:
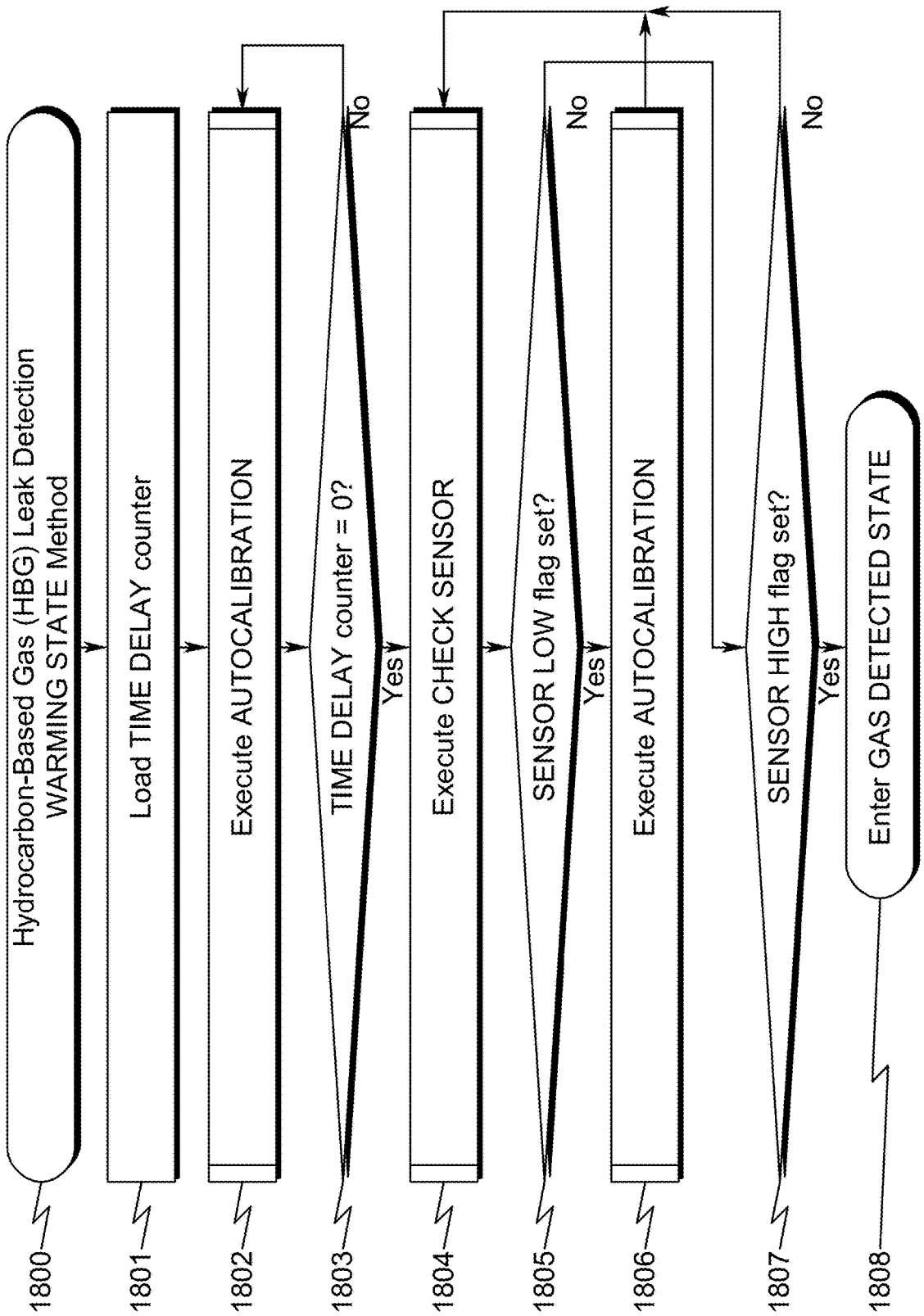
FIG. 18 illustrates a flowchart depicting a hydrocarbon-based gas (HBG) leak detection method (warming state)
Figure 19:
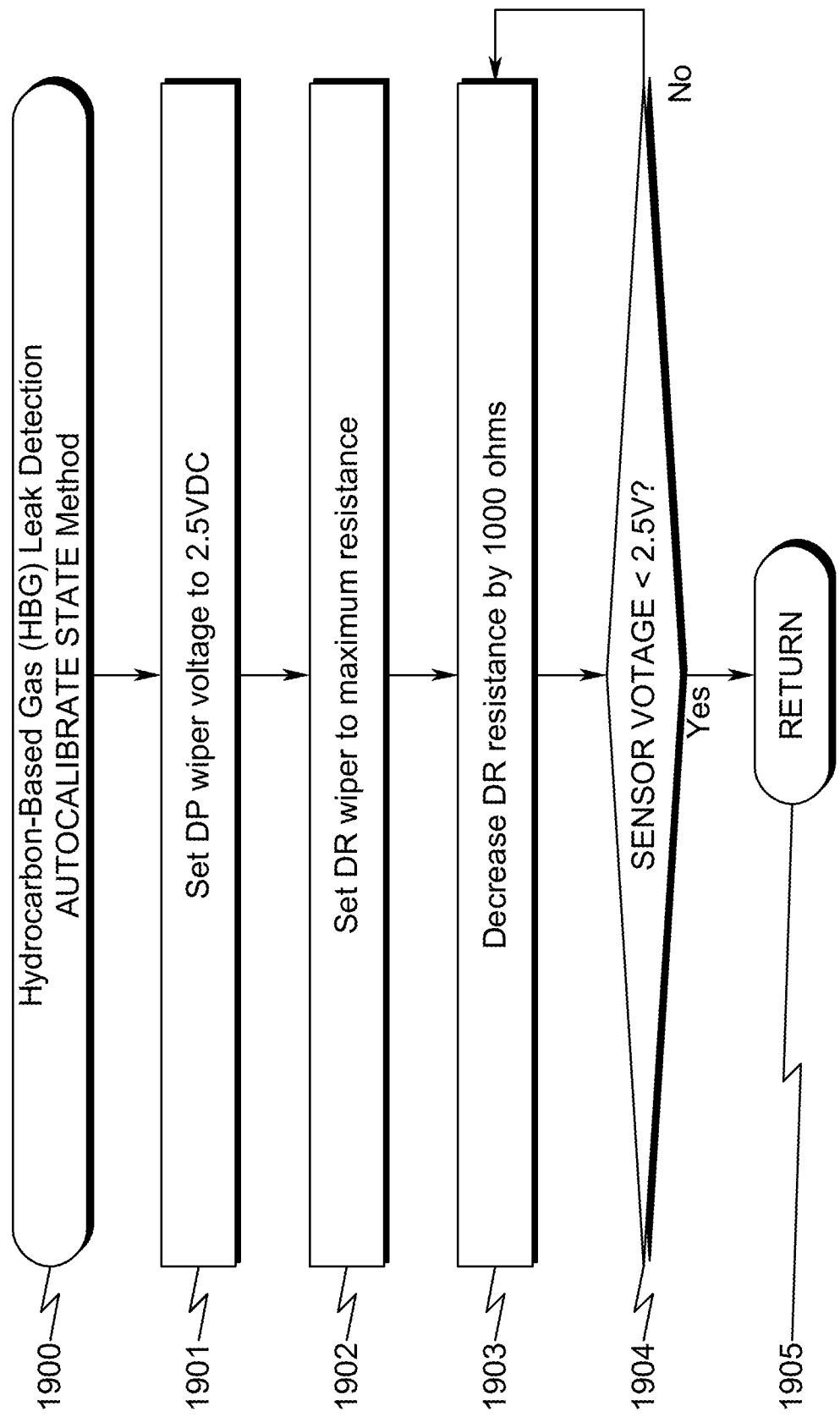
FIG. 19 illustrates a flowchart depicting a hydrocarbon-based gas (HBG) leak detection method (autocalibrate state)

Referencing FIG. 18 (1800), the WARMING STATE typically incorporates the following control logic method:

(1) Loading a TIME DELAY counter with a timeout value (1801);

(2) Executing an AUTOCALIBRATION routine (as generally depicted in FIG. 19 (1900)) (1802);

(3) Determining if the TIME DELAY counter is zero, and if not, proceeding to step (2) (1803);

(4) Executing a CHECK SENSOR routine (as generally depicted in FIG. 20 (2000)) (1804);

(5) Determining if the SENSOR LOW flag is set, and if not, proceeding to step (7) (1805);

(6) Executing an AUTOCALIBRATION routine (as generally depicted in FIG. 19 (1900)) and proceeding to step (4) (1806);

(7) Determining if the SENSOR HIGH flag is set, and if not, proceeding to step (7) (1807); and (8) Invoking the GAS DETECTION STATE (1808).

One skilled in the art will recognize that these process steps are exemplary and may be rearranged, augmented, or redacted and will by necessity be adjusted based on application context and the hardware implementation of the system.

AUTO CALIBRATION STATE (1900)

Referencing FIG. 19 (1900), the AUTO CALIBRATION STATE typically incorporates the following control logic method:

(1) Setting the digital potentiometer (DP) voltage to approximately a supply midpoint (typically 2.5 VDC) (1901);

(2) Setting the digital rheostat (DP) wiper to maximum resistance (1902);

(3) Decreasing the digital rheostat (DR) resistance by one step (typically 1000 ohms for a 100,000 ohm rheostat configuration) (1903);

(4) Determining if the detected HGS sensor voltage is less than the supply midpoint set in step (1), and if not, proceeding to step (3) (1904); and (5) Returning to the process caller (1905).

One skilled in the art will recognize that these process steps are exemplary and may be rearranged, augmented, or redacted and will by necessity be adjusted based on application context and the hardware implementation of the system.

CHECK SENSOR STATE (2000)

Referencing FIG. 20 (2000), the CHECK SENSOR STATE typically incorporates the following control logic method:

(1) Determining if the detected sensor voltage is less than a lower threshold value (LTV), and if not, proceeding to step (3) (2001);

(2) Setting a SENSOR LOW flag and proceeding to step (5) (2002);

(3) Determining if the detected sensor voltage is greater than an upper threshold value (UTV), and if not, proceeding to step (5) (2003);

(4) Setting a SENSOR HIGH flag (2004); and (5) Returning to the process caller (2005).

One skilled in the art will recognize that these process steps are exemplary and may be rearranged, augmented, or redacted and will by necessity be adjusted based on application context and the hardware implementation of the system.

It can be seen from this exemplary process flow that the system attempts to track the detected sensor voltage between a lower threshold voltage (LTV) and an upper threshold voltage (UTV). Deviation above this window triggers an adjustment of the Vref detection threshold voltage and/or an adjustment of the LEVEL COUNTER that determines if repeated measurements indicate a true HBG leak as compared to an intermittent detection of an excursion of the HGS sensor value from the nominal ambient non-leak conditions.

Alarm Status Indicator (ASI) Operation (1700), (2100)-(2400)

The present invention describes a hardware system that may be utilized for HBG leak detection (HLD) and/or HBG leak mitigation (HLM). The difference between the application contexts for these two configurations generally revolves around whether the system is permanently or semi-permanently installed in the HVAC system and whether the system is configured to isolate at least a part of the HVAC refrigerant loop if a HBG leak is detected. The alternative to this "installed" HVAC HLM system is the use of a "portable" HLD system that is typically configured with battery power and suitable for placement near a portion of a HVAC system experiencing a leak that has been undiagnosed and has yet to be located. In this manner, one or more portable HLD systems may be placed around a number of refrigerant coils within a suspect HVAC system and then interrogated using a MUD or via the ASI interface to determine if a HBG leak has been detected.

The following discussion addresses situations in which the HLD is configured in a very modest configuration with the ADI constituting only a single indicator LED that may be flashed at varying rates or duty cycles in order to indicate which STATE the HLD is operating. In this fashion, the HLD may be portably placed within a suspect HVAC system, activated, and the ASI LED pulse rate and/or duty cycle inspected to determine if a HBG leak has been detected.

ASI State Overview (1700)

An overview of the states for the ASI is generally depicted in FIG. 17 (1700) where it can be seen that provisions for separate alarms are provided for in the WARMING STATE (1711), MONITOR STATE (1713), and GAS DETECTION STATE (1715)/ALARM STATE (1716). These alarm conditions will now be discussed in detail in terms of a preferred exemplary ASI operation method.

ASI Operation Method (2100)-(2400)

Figure 21:
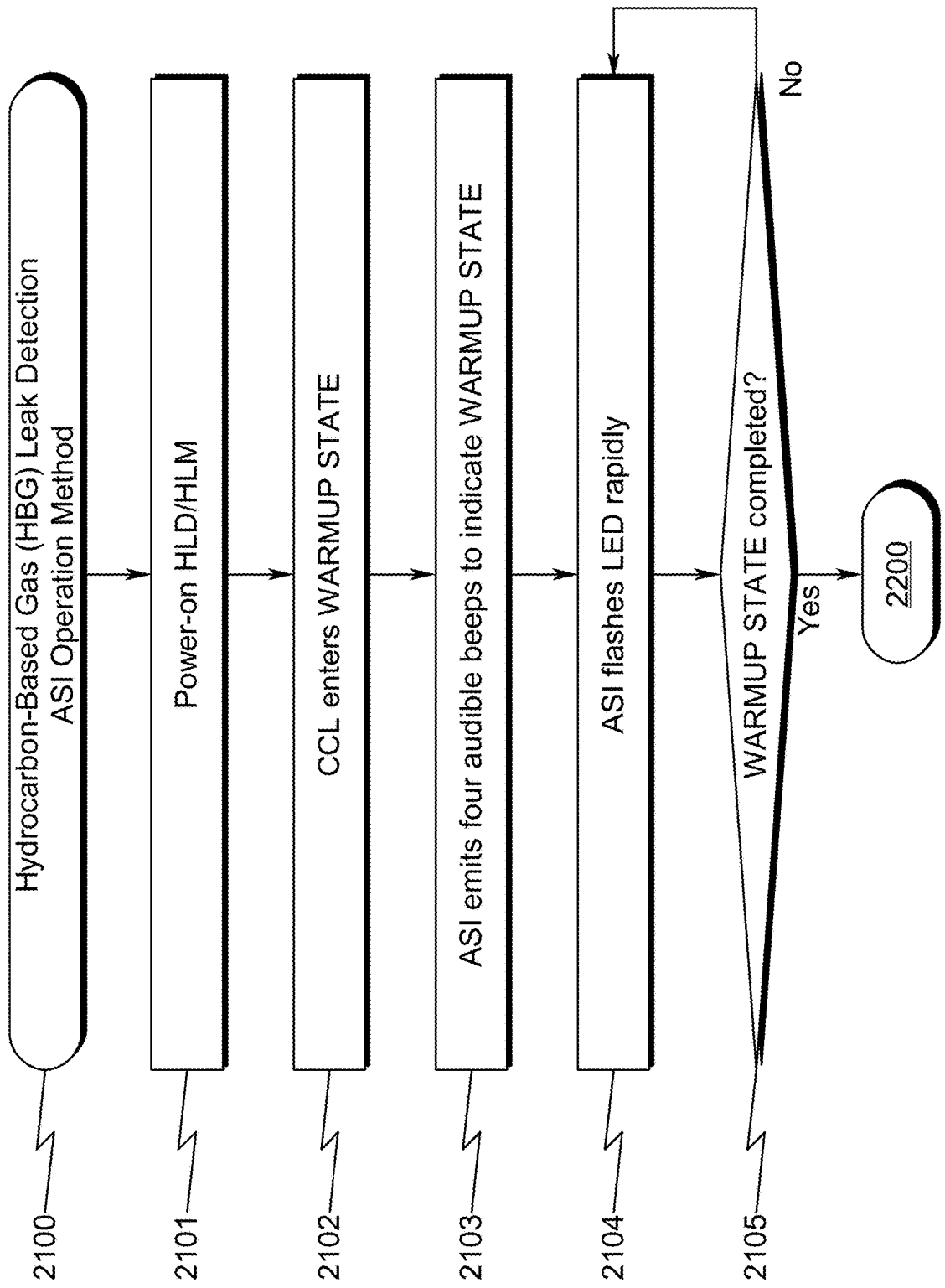
FIG. 21 illustrates a flowchart depicting a hydrocarbon-based gas (HBG) leak detection ASI operation method (1 of 4)
Figure 22:
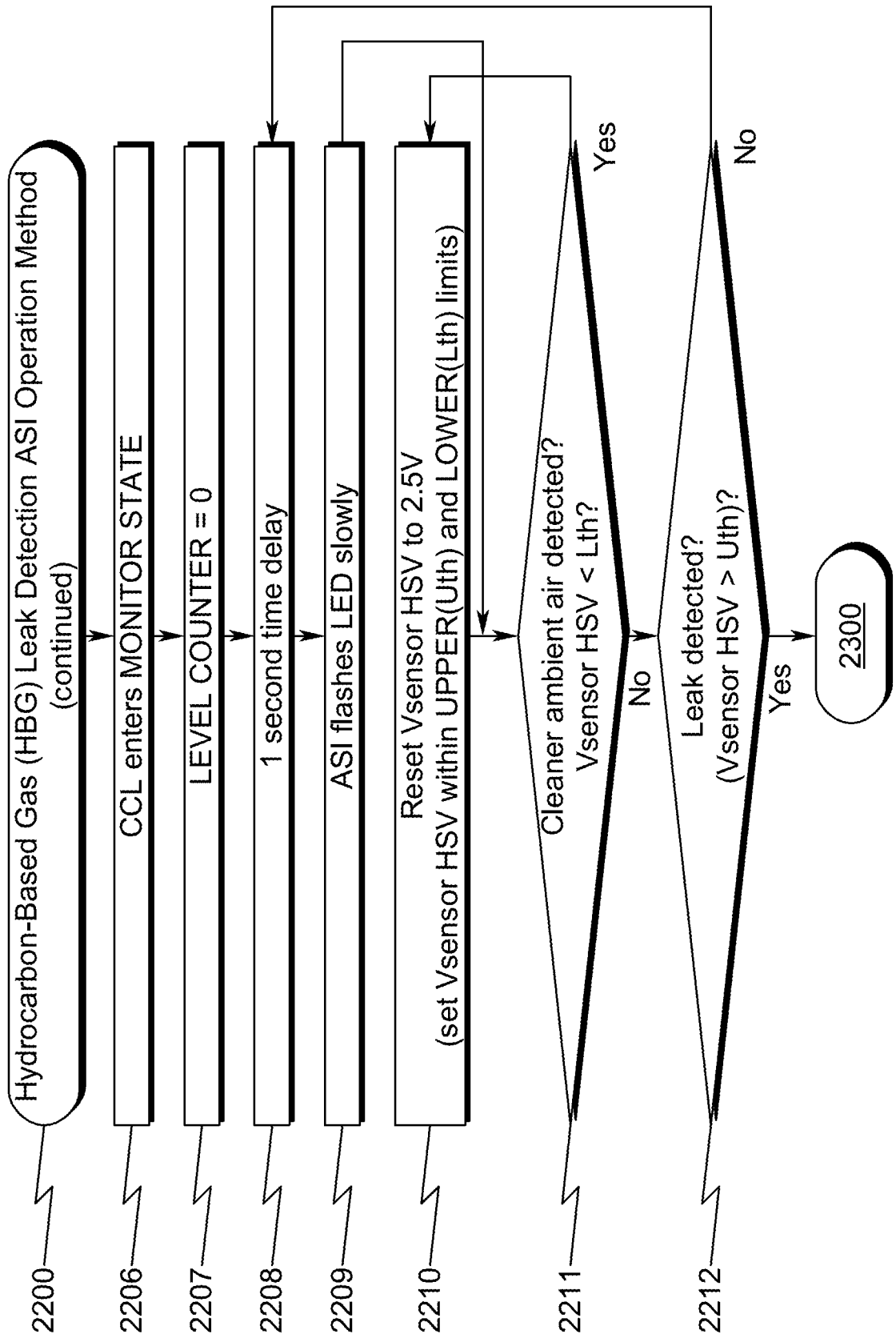
FIG. 22 illustrates a flowchart depicting a hydrocarbon-based gas (HBG) leak detection ASI operation method (2 of 4)
Figure 23:
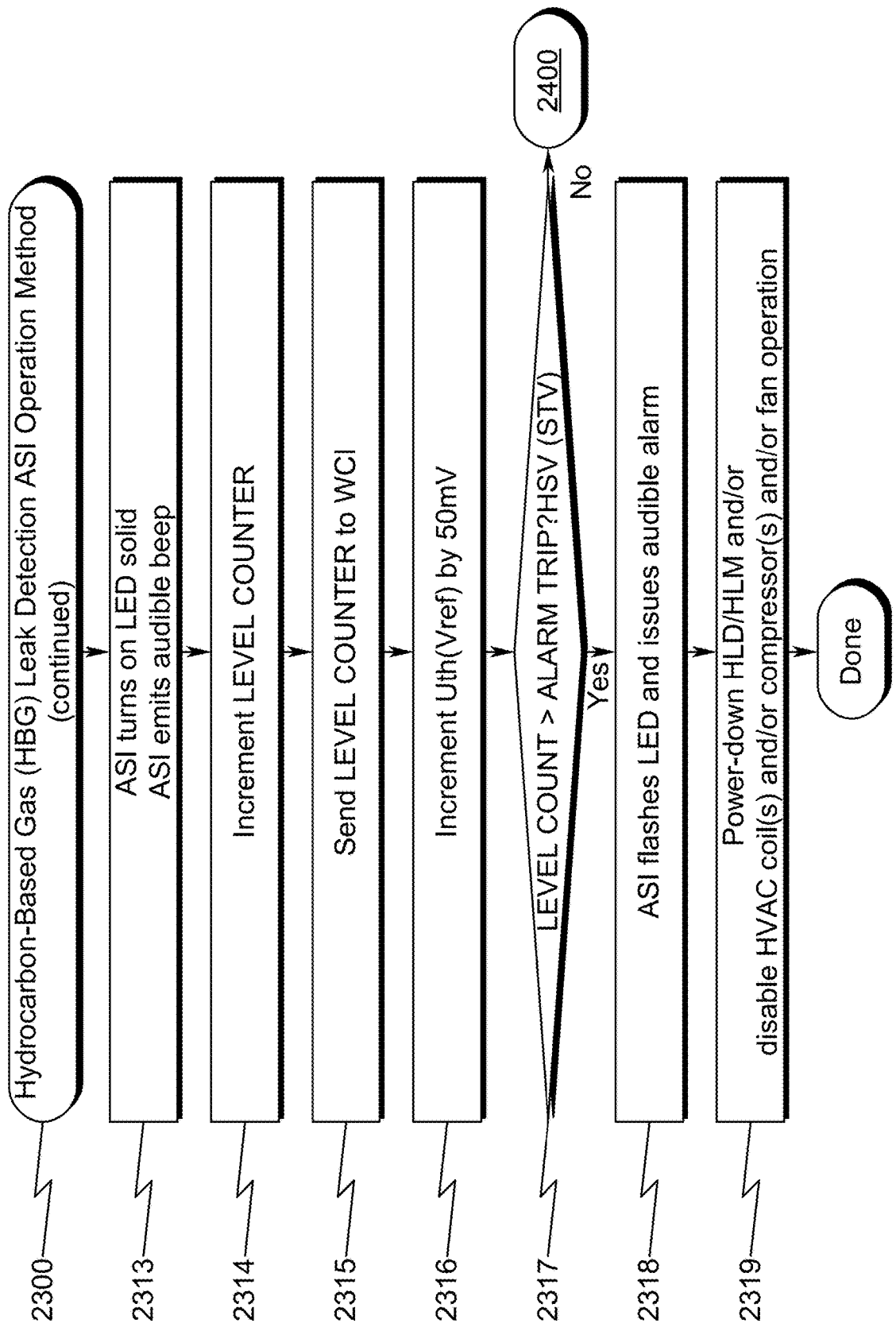
FIG. 23 illustrates a flowchart depicting a hydrocarbon-based gas (HBG) leak detection ASI operation method (3 of 4)
Figure 24:
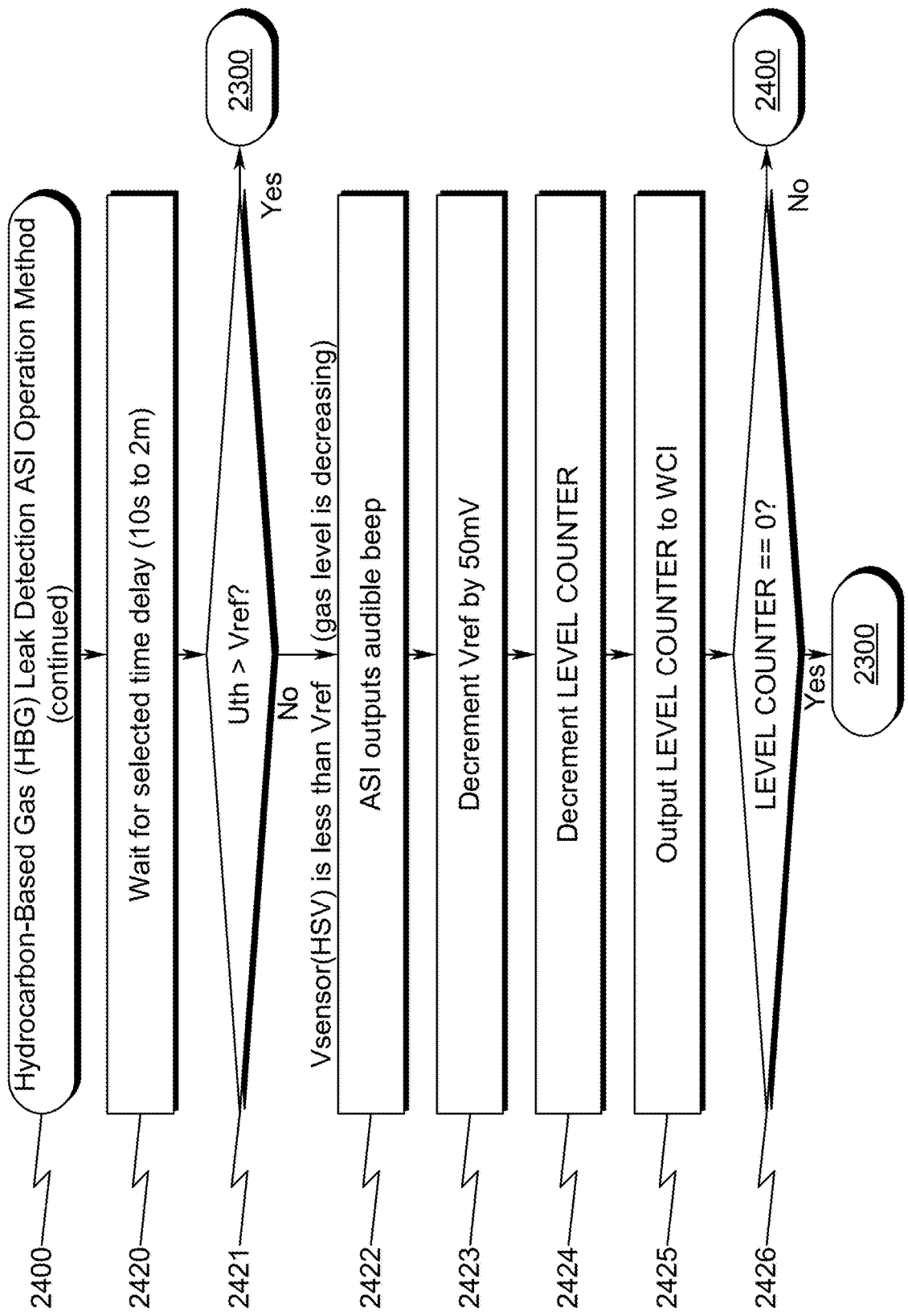
FIG. 24 illustrates a flowchart depicting a hydrocarbon-based gas (HBG) leak detection ASI operation method (4 of 4)

Referencing FIG. 21 (2100)-FIG. 24 (2400), the ASI operation method typically incorporates the following control logic method:
  (1) powering on the HLD/HLM (2101);
  (2) with the DCP and the SSC, entering a CCL WARMUP STATE (2102);
  (3) ASI emits four audible beeps to indicate WARMUP STATE operation (2103);
  (4) ASI flashes LED rapidly (2104);
  (5) with the DCP, determining if the WARMUP STATE is completed, and if not, proceeding to step (4) (2105);
  (6) with the DCP and the SSC, entering a MONITOR STATE (2206);
  (7) with the DCP, initializing the LEVEL COUNTER to 0 (2207);
  (8) with the DCP, initiating a 1 second time delay (2208);
  (9) ASI flashes LED slowly (2209) and proceeds to step (11);
  (10) reset Vsensor HSV to 2.5V (set Vsensor HSV within UPPER (Uth) and LOWER (Lth) limits) (2210);
  (11) with the DCP and the SSC, determining if cleaner ambient air detected? Vsensor HSV<Lth?, and if so, proceeding to step (10) (2211);
  (12) with the DCP and the SSC, determining if leak detected? (Vsensor HSV>Uth)?, and if not, proceeding to step (8) (2212);
  (13) ASI turns on LED solid and emits audible alarm (2313);
  (14) with the DCP, incrementing the LEVEL COUNTER (2314);
  (15) with the DCP, sending the LEVEL COUNTER to the WCI (2315);
  (16) with the DCP, increment Uth (Vref) by 50 mV (2316);
  (17) with the DCP, determining if LEVEL COUNT>ALARM TRIP? HSV (STV), and if not, proceeding to step (20) (2317);
  (18) ASI flashes LED and issues audible alarm (2318);
  (19) power-down HLD/HLM and/or disable HVAC coil(s) and/or compressor(s) and/or fan operation (2319);
  (20) wait for selected time delay (10 s to 2 m) (2420);
  (21) with the DCP, determining if Uth>Vref?, and if so, proceeding to step (13) (2421);
  (22) ASI emits audible beep for every INCREASE in the LEVEL COUNTER towards the ALARM STATE (2422);
  (23) with the DCP, Decrement Vref by 50 mV (2423);
  (24) with the DCP, Decrement LEVEL COUNTER (2424);
  (25) with the DCP, output LEVEL COUNTER to WCI (2425); and
  (26) with the DCP, determining if the LEVEL COUNTER==0, and if so, proceeding to step (13), else proceeding to step (20) (2426).

One skilled in the art will recognize that these process steps are exemplary and may be rearranged, augmented, or redacted and will by necessity be adjusted based on application context and the hardware implementation of the system.

Operational Example

Under normal circumstances the HLD operates to wirelessly inform a MUD of a detected HBG leak and is able to provide information as to the severity of the detected HBG leak.

However, there are circumstances in which a MUD is not available to receive these leak detection messages and in these circumstances the HLD may operate independently of the MUD and allow detection of the HBG leak. In these circumstances, all that is necessary is to turn on power to the HLD, wait until the WARMUP MODE was complete, and when in MONITOR MODE take and install the HLD on the HVAC indoor coils and if there is a leak the HLD will go into GAS DETECTION MODE and the ASI LED light will be on solid and at every increase in the LEVEL COUNTER detected by the HGS the ASI will emit a indicating another steps towards ALARM MODE.

As seen from the ASI operational flowcharts of FIG. 21 (2100)-FIG. 24 (2400), by watching the ASI LED light output on the HLD the operator/technician can perform a VISUAL TEST ONLY with the HLD with no need for a MUD to display leak detection data. Thus, a significant amount of HVAC leak detection analysis may be performed by watching the HLD ADI LED and listening for the ASI annunciator to determine what mode of operation the HLD is operating and thus if a HBG leak has been detected.

Overview of Leak Detection Testing (LDT)

The present invention has many application contexts, but one preferred application context is the detection and mitigation of HBG leaks in Variable Refrigerant Flow (VRF) climate control heating, ventilation, and air conditioning (HVAC) systems. VRF systems are widely used in large buildings such as hotels, dormitories, and retirement facilities.

A single compressor driving multiple parallel evaporators in multiple locations presents some unique and difficult scenarios when a system begins to develop a leak and decreases in cooling and heating capability thus requiring service. In a hotel scenario, system failure and down time will cost hotel operators many thousands of dollars, as one failure may force a block of rooms to be unavailable for guest use.

Step one in the troubleshooting process is provide a good visual inspection of the compressor condenser and related piping and repair as needed. If no leaks are found the next step would be provide a partial system recharge and the testing of each indoor air handler for possible leaks. In the past locating indoor air handler leaks (coil leaks in most cases) would require time from several days to as much as a month. The procedure was to open each air handler housing and inspect units for the presence of compressor oil in the condensate pan, coil area, and piping. This arbitrary method of locating leaks can take several minutes to hours per unit, with no guarantee of finding the leak on the first or fifteenth unit.

The idea of a portable HBG leak detector (HLD) designed to be mounted and powered within the air handler and used for the sole purpose of locating and recording leaks is novel within the industry and the focus of the present invention.

The LDT is a modification of the LCS design described herein, minus valve/solenoid/contactor controls and the requirement for AC power. Major sections of LDT consist of:
(1) Gas Sensor & signal conditioning
(2) Visual and audible status indicators
(3) BlueTooth communication capability
(4) Intake fan with enable/disable control
(5) Microcontroller
(6) Battery power
(7) Temperature and Humidity Sensor Troubleshooting Procedure Using the LDT The following procedure describes a typical HBG leak troubleshooting procedure using the LDT described herein:
(1) Begin by selecting a clean air location within the facility away from areas to be tested such as hallways, lobbies, and stairways. Do not power LDT if located on the floor, as refrigerant is heavier than air and will collect in this area.
(2) When a suitable location is found, turn on the LDT device (LED fast flash) and allow to self-calibrate for 2, 5, or 30 minutes (selectable).
(3) During warm-up, pair the device with a smartphone or tablet application and select suitable options.
(4) Execute operational options (alarm on/off, step time, fan on/off, clear gas log, add service data, room location etc.)
(5) After the WARMUP STATE, the system enters the MONITOR STATE (LED slow flash) and is ready to be moved to test location.
(6) Hang device on grill of the air handler such that air is forced into the enclosure. Intake fan can be enabled if necessary.
(7) If LDT remains in the MONITOR STATE for 5 minutes signifying no leak detected, it is then relocated to next available air handlers to be checked. This check and relocate methodology saves a tremendous amount of time and expense in the overall leak detection process.
(8) When a leak is detected, the LED status indicator will change from a slow flash to solid, an audible alarm beep will be heard for each change in gas level and the LDT records and stores the step count (1-21), dependent on severity of gas leak.
(9) When a leak is detected, the operator may verify the leak with a visual inspection as previously described.
(10) The intake fan on the LDT serves as two functions: (a) it allows the leak detector to test an area where piping and junctions are located and no forced air is available, and (b) the fan can be used to push clean air across the sensor in a unit that has previously detected a leak, so it can be relocated quicker to the next test location.
(11) Based on experimental field data using the LDT to detect HBG leaks, it typically takes about an hour to check 20 air handlers with 5 LDTs, compared to previous procedures that would take days, weeks, or months.
(12) To check for small leaks at the outdoor condenser, first locate the LDT at the lowest point of the condenser, disconnect power to the refrigerant compressor and outdoor cooling fan. Then enable the intake fan on the LDT to draw air across the sensor. This procedure works well to detect leaks because refrigerant is heavier than air and locating the LDT as low as possible with respect to the outdoor condenser will ensure the best chance of sensing leaking refrigerant from the outdoor condenser.

One skilled in the art will recognize that the above leak detection procedure may be modified by adding or removing steps and that the order of the above steps may be rearranged in some circumstances without limiting the scope of the claimed invention.

Sensor Signal Conditioner (SSC) Description (2500)-(2600)

A preferred exemplary embodiment of the sensor signal conditioner (SSC) is detailed in FIG. 25 (2500) wherein the SSC (2520) conditions signals from the HGS (2510) before they are presented to the DCP (2530) for interpretation. In this context the SSC (2520) and DCP (2530) form a controlled feedback loop in which the electrical characteristics of the SSC (2520) are dynamically adjusted by the DCP (2530) so as to account for a wide variety of operational ranges and variations in the HGS (2510). These operational ranges may encompass a number of factors, including but not limited to background refrigerant gas levels, changes in ambient air conditions, HGS manufacturing tolerances, and/or other field-specific operational conditions that impact the HGS detection capabilities.

The DCP (2530) in this configuration is illustrated as a conventional 8051 class microcontroller and may take many forms and one skilled in the art will recognize that the functions embodied in this element may be implemented using a wide variety of digital circuits including but not limited to microcontrollers, digital state machines, and in some cases analog computational circuitry such as translinear loops and the like.

The SSC (2520) operates as follows. A 10 kΩ digital potentiometer (DS1804-010) (2522) is used to generate a VTRIP (2523) voltage reference ranging from 0 VDC to +5 VDC as determined by the wiper W position that is digitally set using the UP/DOWN (U/D) (2533), INCREMENT (INC) (2534), and DP CHIP SELECT (CS) (2535) inputs emitted from the DCP (2530). This digital potentiometer (2522) is used to generate a VTRIP (2523) voltage reference and is used as the baseline reference for an internal analog comparator (2529) that is contained within the DCP (2530) (but in some preferred embodiments may be embodied as an analog comparator separate from the DCP (2530)). The LEAK DETECTED output (2539) of this internal analog comparator (2529) is an indication that the conditioned output of the HGS (2510) is above a threshold indicating a detected HBG leak. Internal logic within the DCP (2530) will then determine what state machine steps to invoke when this condition occurs.

The HGS (2510) may take many forms in this exemplary embodiment but in many preferred embodiments the HGS (2510) is a Zhengzhou Winsen Electronics Technology Co., Ltd. (No. 299, Jinsuo Road, National Hi-Tech Zone, Zhengzhou 450001 China, Tel: +86-371-67169097/ 67169670, www.winsen-sensor.com) Model WPS-5110 Refrigerant Detection Gas Sensor. This particular sensor requires two voltage inputs: a heater voltage (VH) and circuit voltage (VC). As illustrated in the drawing inset, VH is used to supply standard working temperature to the sensor and it can adopt DC or AC power, while VRL is the voltage of load resistance RL which is in series with sensor. VC supplies the detection voltage to load resistance RL and it requires DC power.

Within this exemplary embodiment, a 100 kΩ digital rheostat (DS1804-100) (2524) is used as RL to form a voltage divider with respect to the HGS internal resistance RS. The resistance of this digital rheostat (2524) is digitally set using the UP/DOWN (U/D) (2533), INCREMENT (INC) (2534), and DR CHIP SELECT (CS) (2536) inputs emitted from the DCP (2530). This RS/RL voltage divider produces a voltage from 0 VDC to 5 VDC that is then amplified by the operational amplifier (2525) having a gain determined by input resistor RI (2526) (10 kΩ) and feedback resistor RF (2727) (20 kΩ) of (1+RF/RI)=(1+20 kΩ/10 kΩ)=3. One skilled in the art will recognize that this gain may vary based on the specific type of HGS used in the system and the characteristics of the analog leak detection comparator (2529). Many preferred invention embodiments provide for a gain of in the range of 1 to 10 in this operational amplifier (2525) configuration.

In some circumstances the DCP (2530) may be configured with an additional gain digital potentiometer (GDP) (not shown) that allows the DCP (2530) to dynamically adjust the gain of the operational amplifier (2525). In these configurations the wiper W of the GDP is connected to the inverting input of the operational amplifier (2525) with the remaining GDP resistor connections connected to analog ground and the VHGS (2528) output of the operational amplifier (2525). In this way the DCP (2530) may change the wiper position of the GDP to adjust the gain of the operational amplifier (2525) and thus the sensitivity of the overall HGS (2510).

Operation of the SSC (2520) includes adjustment of the DP (2522) and DR (2524) based on detected comparisons of VTRIP (2523) and VHGS (2528) as monitored by the analog comparator (2529) to generate the refrigerant detection signal (2539) within the DCP (2530).

An optional air intake fan (AIF) (2512) may be incorporated into the SSC (2520) operation to allow a forced air flow of ambient air across the HGS (2510) in order to obtain a more real-time measurement of the actual HBG leak as opposed to a settling of the refrigerant from a leak prior in time. Note that this AIF (2512) may be under control of the DCP (2530) so as to allow dynamic purging of the HGS (2510) during measurement and/or dynamic recalibration operations.

Figure 26:
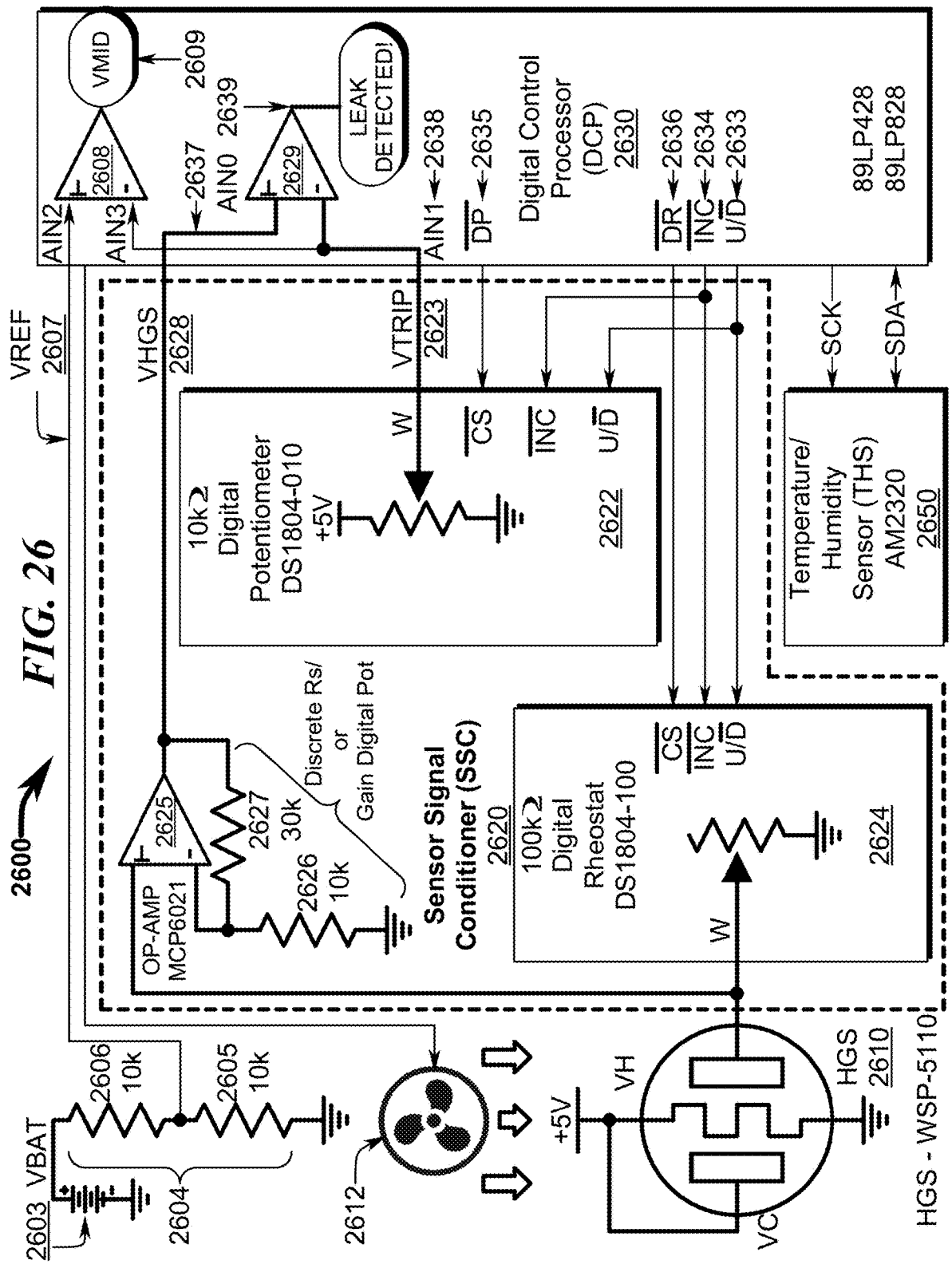
FIG. 26 illustrates a schematic depicting a preferred exemplary sensor signal conditioner (SSC) embodiment augmented with a temperature/humidity sensor (THS) and midpoint voltage reference.

FIG. 26 (2600) depicts another preferred exemplary embodiment of the SSC (2620) in which the CCL is augmented with an ambient temperature/humidity sensor (THS) (2640) that may be read by the DCP (2630) using an industry standard SPI serial interface (SCK/SDA) when performing the dynamic recalibration operations or as a means to determine if a refrigerant coil is operating properly. While an AOSONG ELECTRONICS model AM2320 digital temperature and humidity sensor is illustrated in this preferred exemplary embodiment, one skilled in the art will recognize that a wide variety of temperature and/or humidity sensors may be applicable in this application context.

This schematic depicts a method by which the DCP (2630) may determine the state of the battery (2603) supplying power to the overall system when implemented in a portable context. Here it is seen that a voltage divider (2604) comprising a first (2605) and second (2606) resistor generates a VBAT battery midpoint voltage reference (2607) that is compared by the DCP (2630) analog comparator (2608) to the VTRIP (2623) voltage generated by the digitally adjustable potentiometer (2622). Since the VTRIP voltage is generated using the +5V supply reference, it can be then used to compare the wiper voltage value of the digitally adjustable potentiometer (2622) to that of the VREF (2607) signal to determine the overall voltage of the battery (2603), since VREF represents a midpoint VBAT voltage. In circumstances where the battery (2603) voltage drops below a selected threshold, the DCP (2630) may issue an alarm via the ASI or otherwise modify operation to account for a depleted battery condition.

This schematic also depicts another method by which the DCP (2630) may determine the midpoint voltage of the digital potentiometer (2622). In this configuration the battery (2603) voltage VBAT is replaced by an electrical connection to the +5V regulated supply or some other regulated supply voltage. Here it is seen that a voltage divider (2604) comprising a first (2605) and second (2606) resistor generates a midpoint voltage reference (2607) that is compared by the DCP (2630) analog comparator (2608) to the VTRIP (2623) voltage generated by the digitally adjustable potentiometer (2622). When the digitally adjustable potentiometer (2622) wiper W generates a voltage greater than the VREF (2607) voltage, the analog comparator (2608) is tripped and a VMID signal (2609) is activated internal to the DCP (2630) indicating that the digitally adjustable potentiometer (2622) is positioned at the midpoint of operation. This midpoint reference voltage VREF (2607) is then used as a starting point for analysis of the adjustment of the adjustable rheostat (2624) to determine a proper trip point for the leak detection analog comparator (2629) during the dynamic recalibration process for the HGS (2610).

HGS Sensor Characteristics (2700)-(3200)

While the present invention may operate using a variety of hydrocarbon gas sensors (HGS), the model WSP-5110 is used in many preferred embodiments. FIG. 27 (2700)-FIG. 32 (3200) illustrate the electrical and performance characteristics of this device. Of particular note is the wide variation in output characteristics of this device as exhibited by the graphs in FIG. 28 (2800)-FIG. 32 (3200). Here it can be seen that ambient operating conditions and gas concentrations will cause the HGS to output widely varying voltage levels. For this reason this HGS cannot be calibrated at manufacturing of the overall leak detection system but must rather be dynamically recalibrated in the field using the CCL SSC/DCP combination described herein. In this manner both the environmental and gas detection variances in the HGS may be compensated for and a true indication of a HBG leak will be indicated for the operator/technician.

Figure 28:
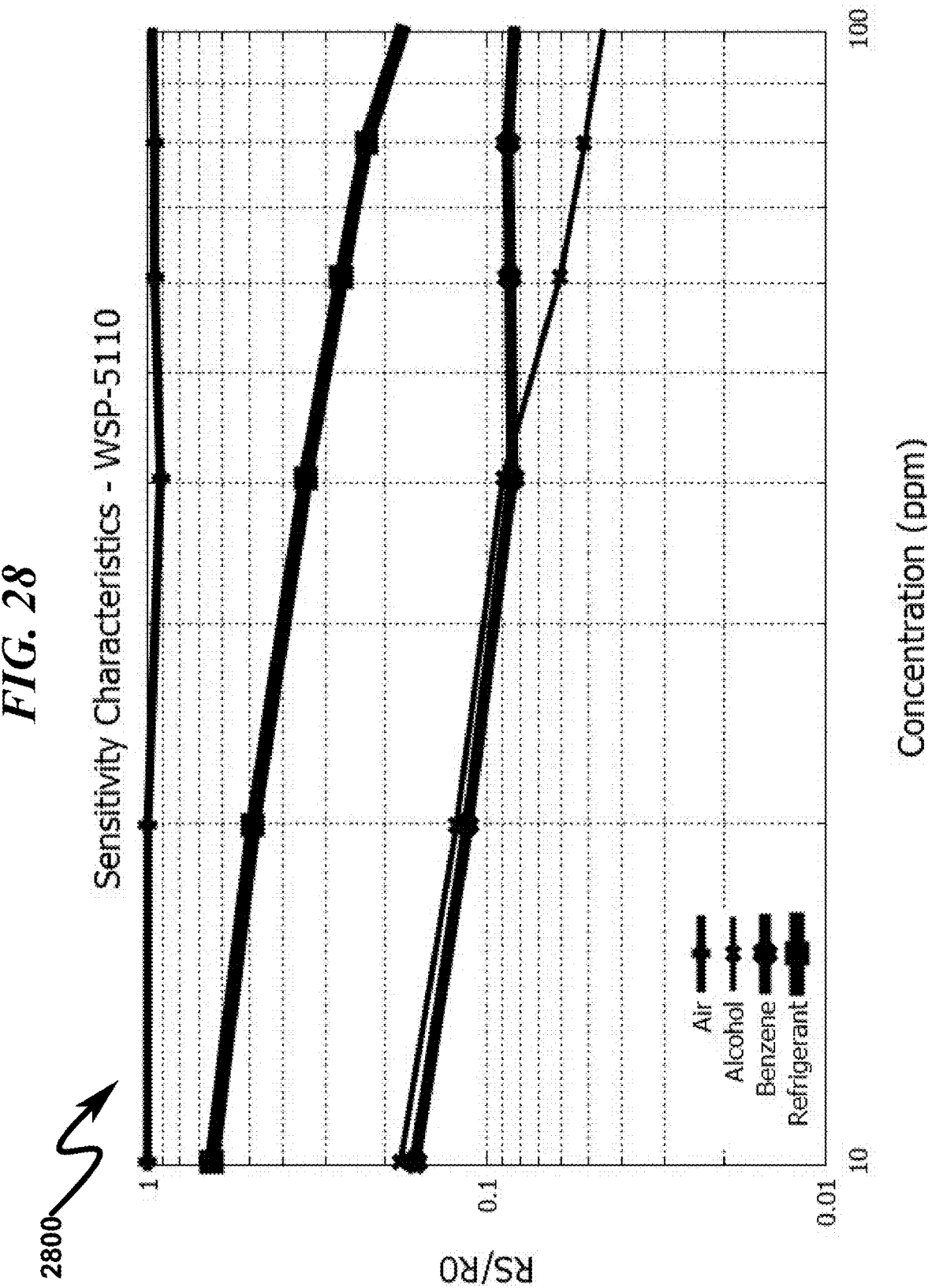
FIG. 28 illustrates a graph depicting an exemplary model WSP-5110 HGS sensitivity characteristic to a variety of gasses.
Figure 29:
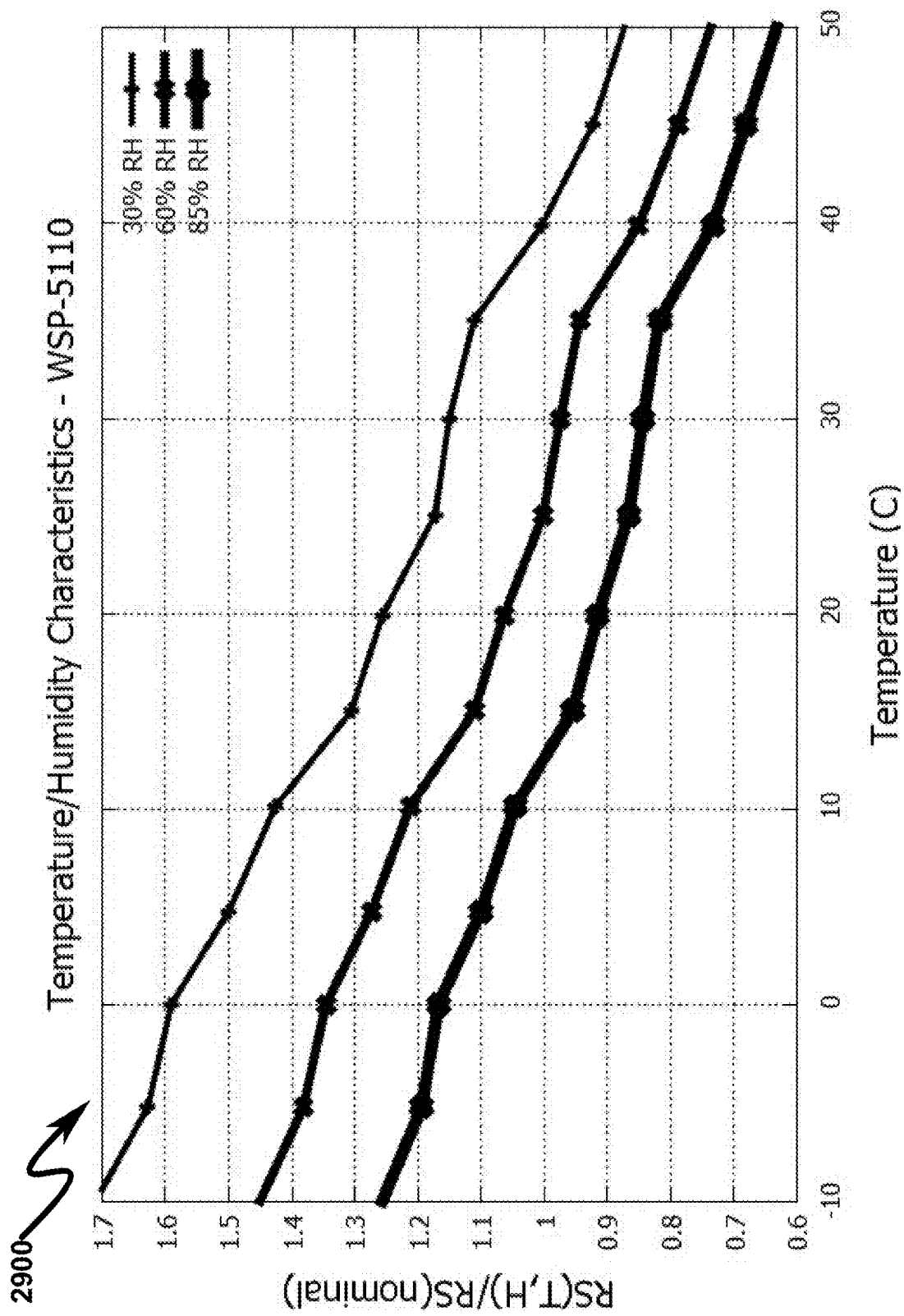
FIG. 29 illustrates a graph depicting an exemplary model WSP-5110 HGS temperature/humidity characteristic.
Figure 30:
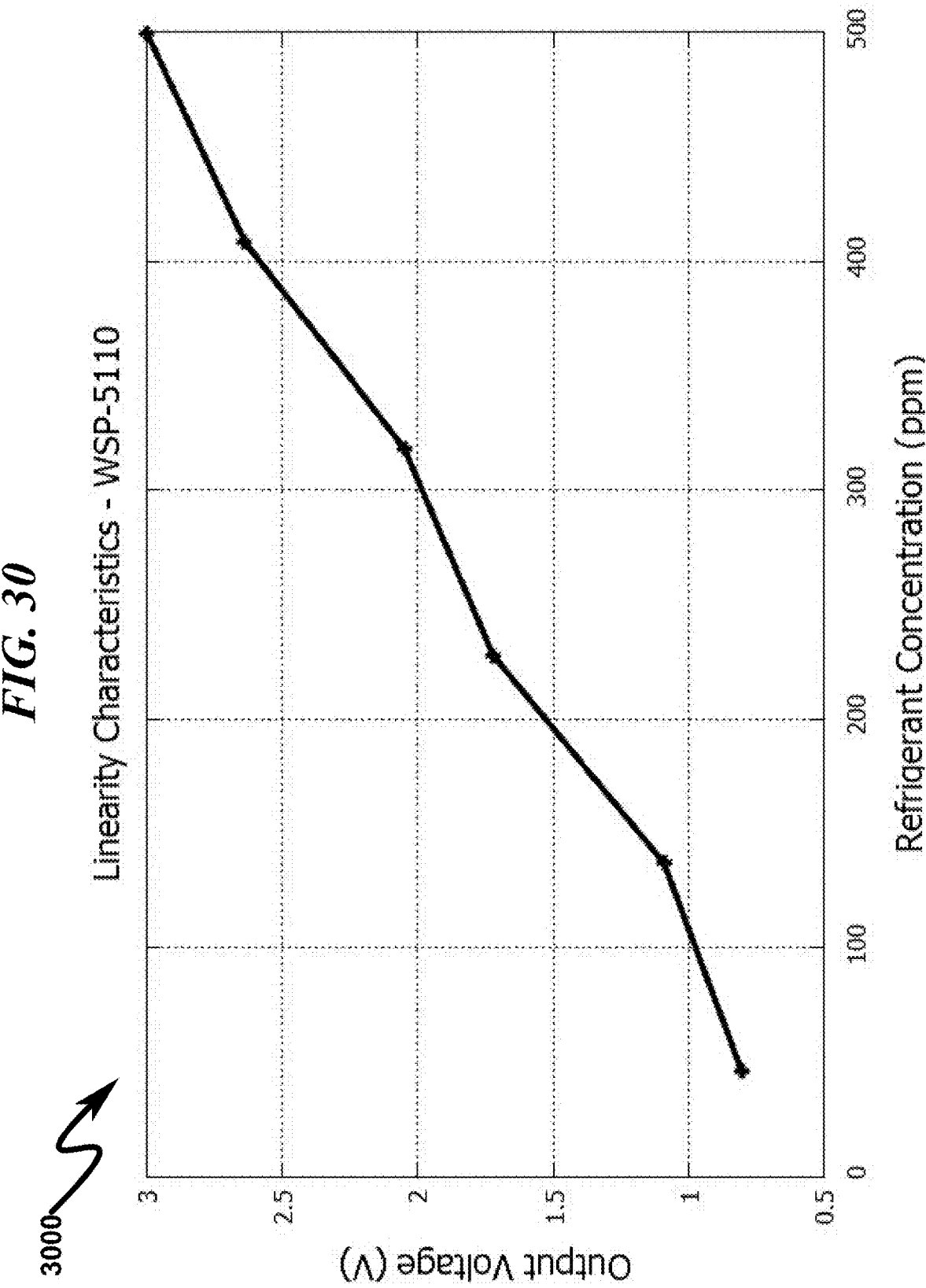
FIG. 30 illustrates a graph depicting an exemplary model WSP-5110 HGS linearity characteristic.
Figure 31:
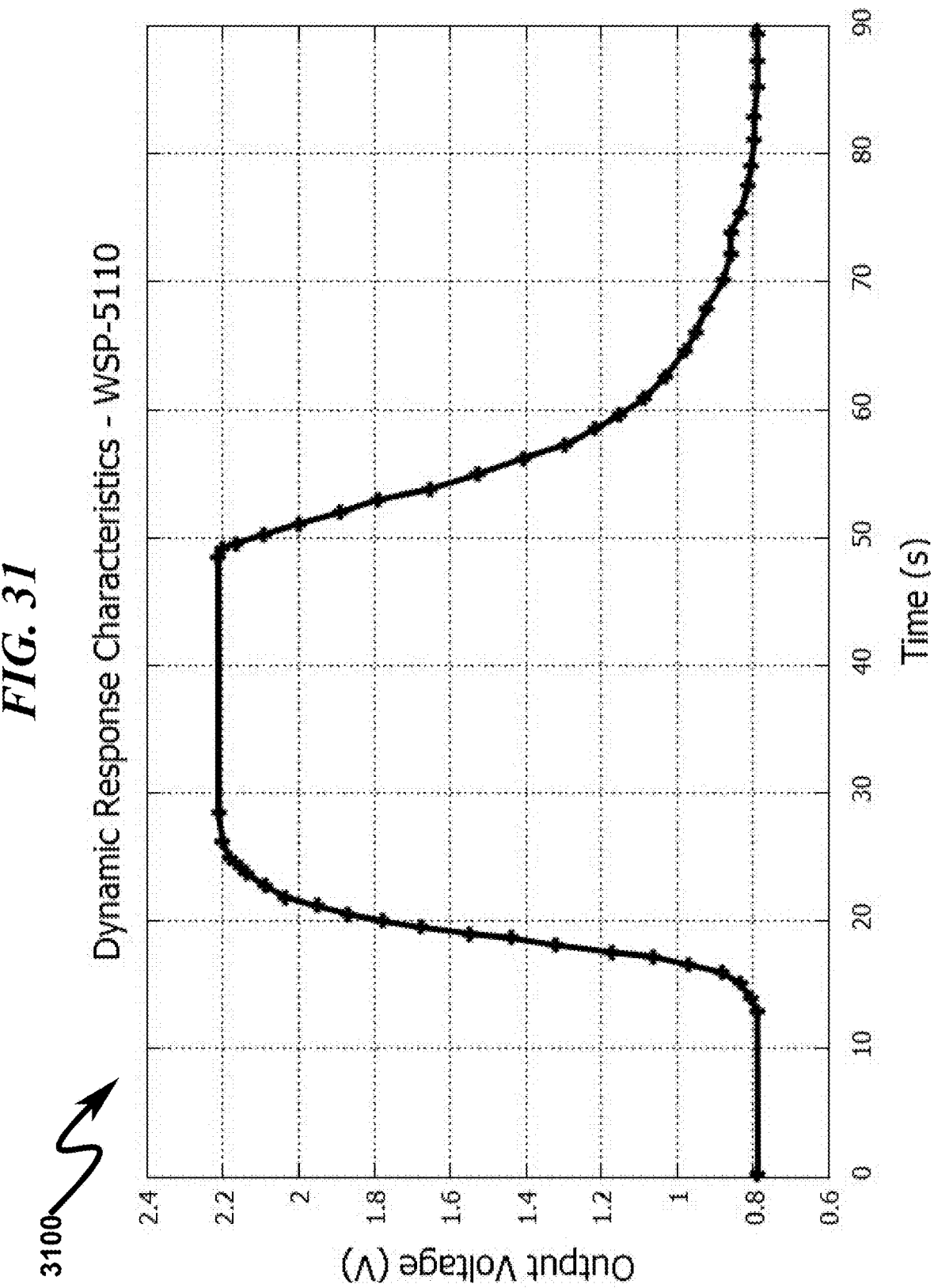
FIG. 31 illustrates a graph depicting an exemplary model WSP-5110 HGS dynamic response characteristic.
Figure 32:
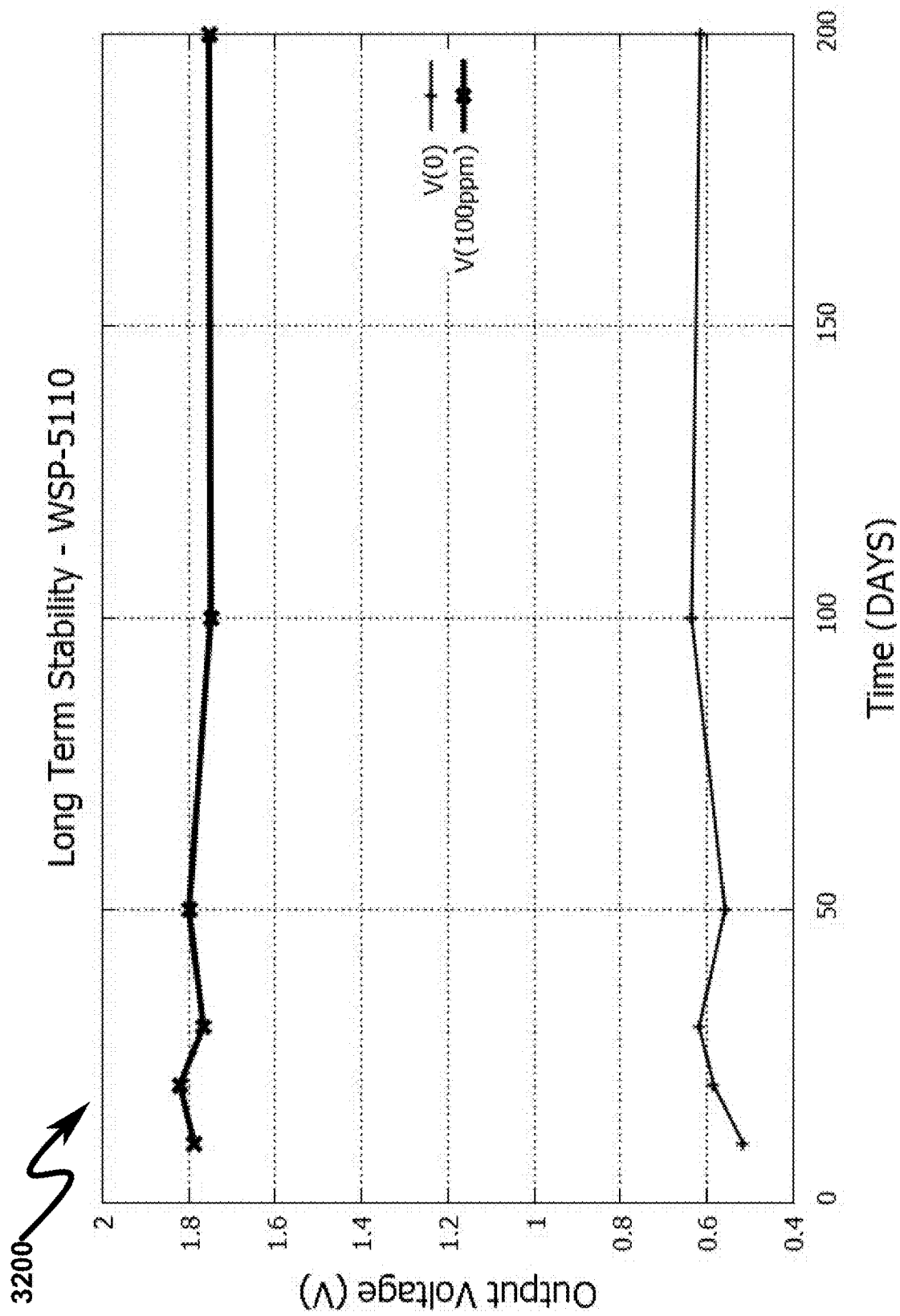
FIG. 32 illustrates a graph depicting an exemplary model WSP-5110 HGS long-term stability characteristic.

It is also important to note as depicted in FIG. 28 (2800) that the HGS is sensitive to not only refrigerant but other hydrocarbons, including cleaning solutions that may be used in a commercial building. For this reason there is a need to allow some background level of these materials to be ignored by the recalibration CCL so as to not cause false HBG leak alarms. As indicated in FIG. 29 (2900), the HGS is highly sensitive to variations in temperature/humidity. This may be accounted for in some preferred embodiments via the use of a temperature/humidity sensor (THS) as depicted in FIG. 26 (2600), or in some embodiments this may be simply be adjusted for in the overall dynamic recalibration of the HGS within the CCL. As indicated by FIG. 31 (3100) the dynamic response of the HGS may require some delays to be built into the CCL to allow for dissipation of intermittent false hydrocarbon readings such as may occur during commercial cleaning operations in the vicinity of the HVAC system. Finally, as indicated in FIG. 32 (3200), the HGS may experience long-term stability drift. This is also another reason the CCL implemented by the SSC/DCP is necessary to compensate for changes in the HGS as it ages in the field.

Exemplary Operational Waveform Displays (3300)-(4000)

Figure 33:
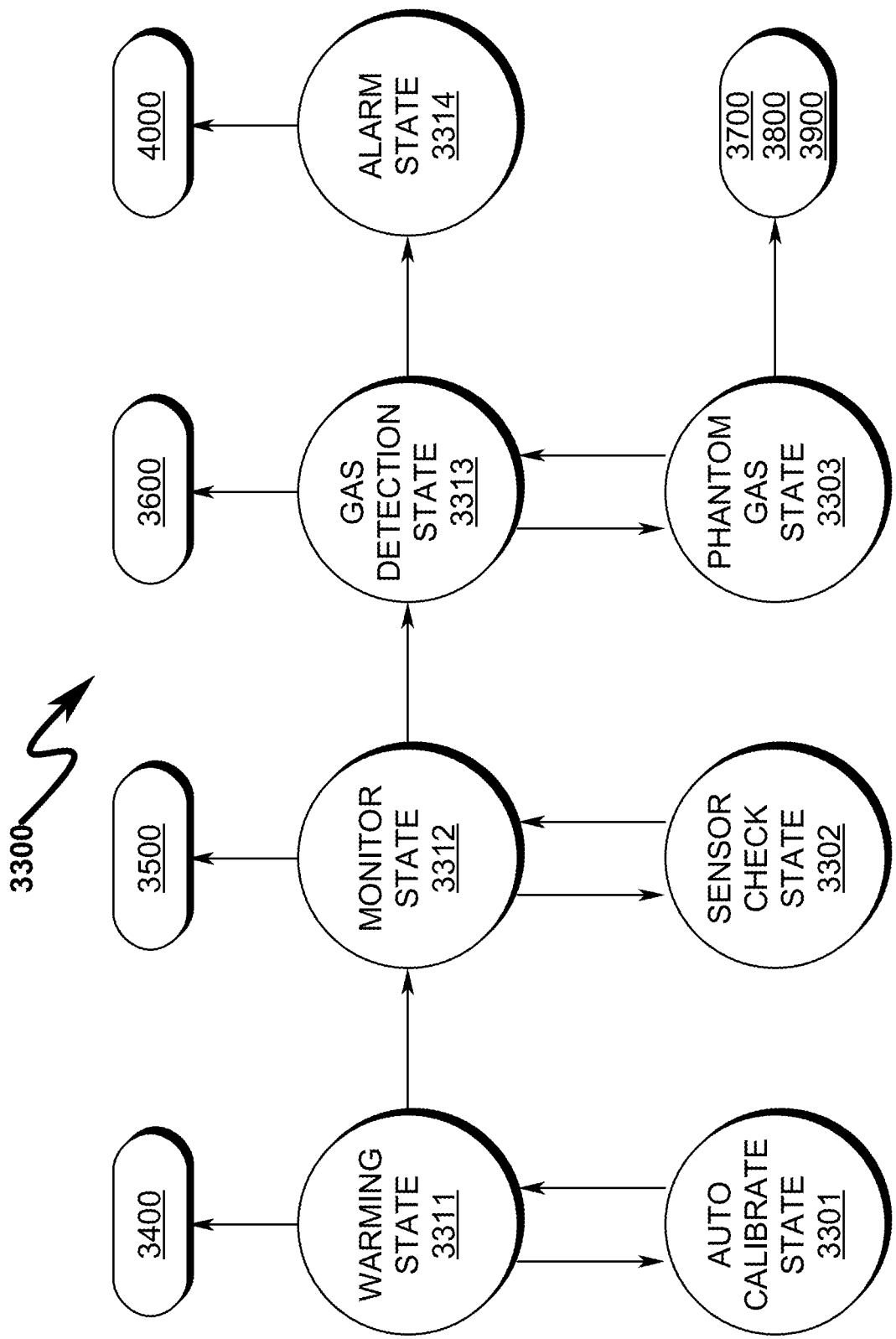
FIG. 33 illustrates an exemplary CCL state diagram with oscilloscope figure references depicting typical operating characteristics of a preferred exemplary invention system embodiment.
Figure 34:
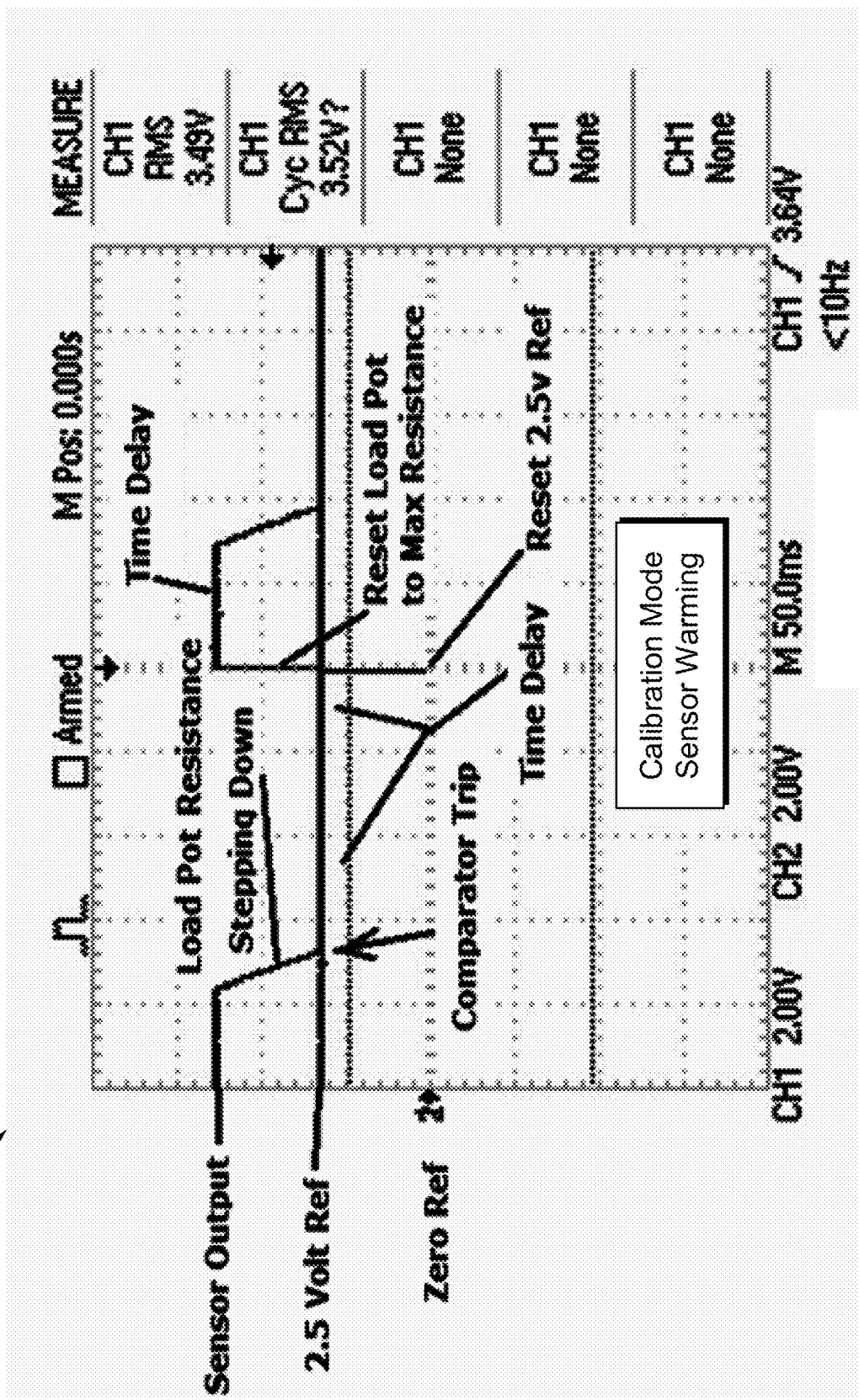
FIG. 34 illustrates an oscilloscope waveform graph depicting operation of a preferred exemplary system embodiment in the WARMUP STATE.
Figure 35:
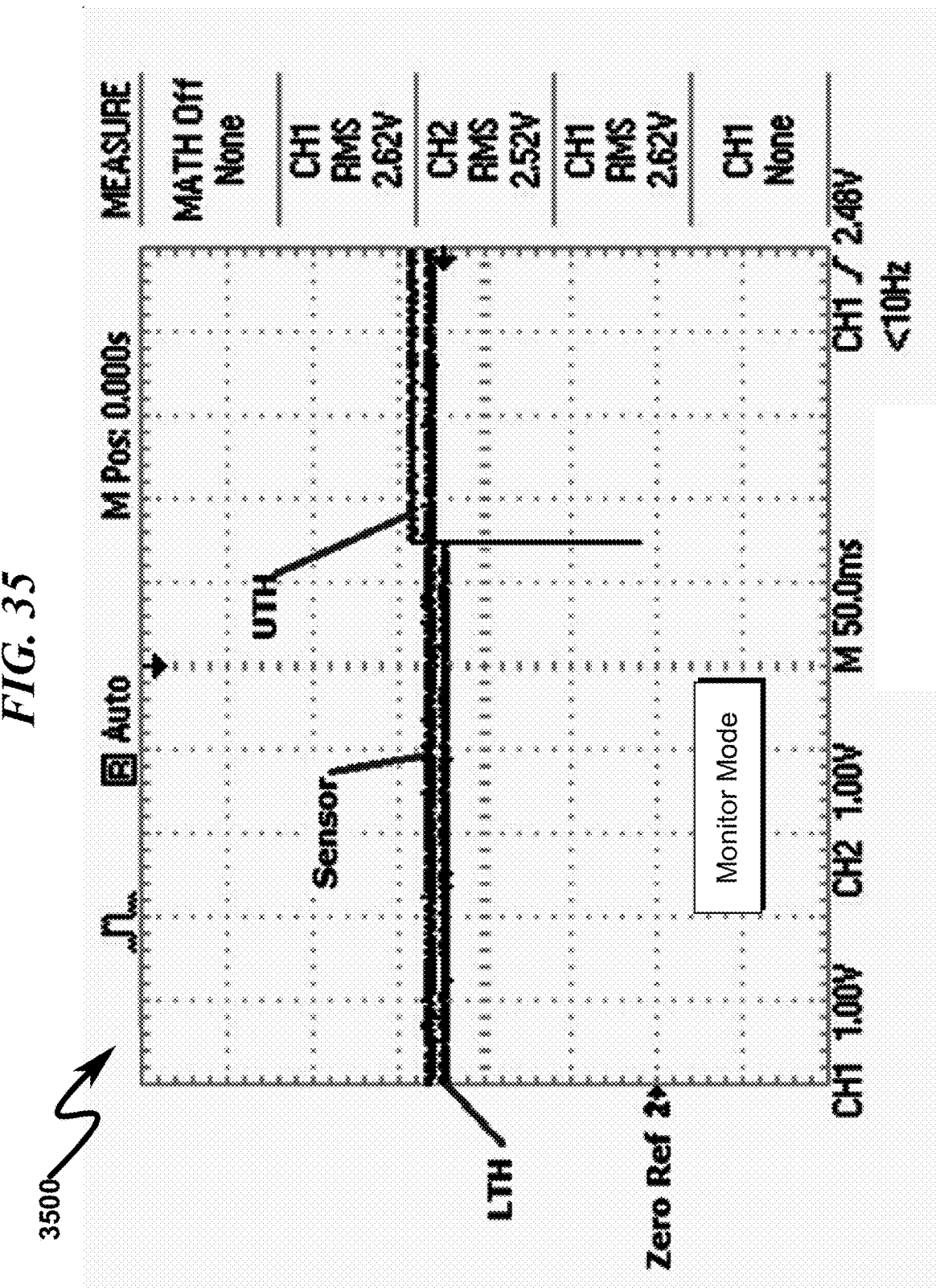
FIG. 35 illustrates an oscilloscope waveform graph depicting operation of a preferred exemplary system embodiment in the MONITOR STATE.
Figure 36:
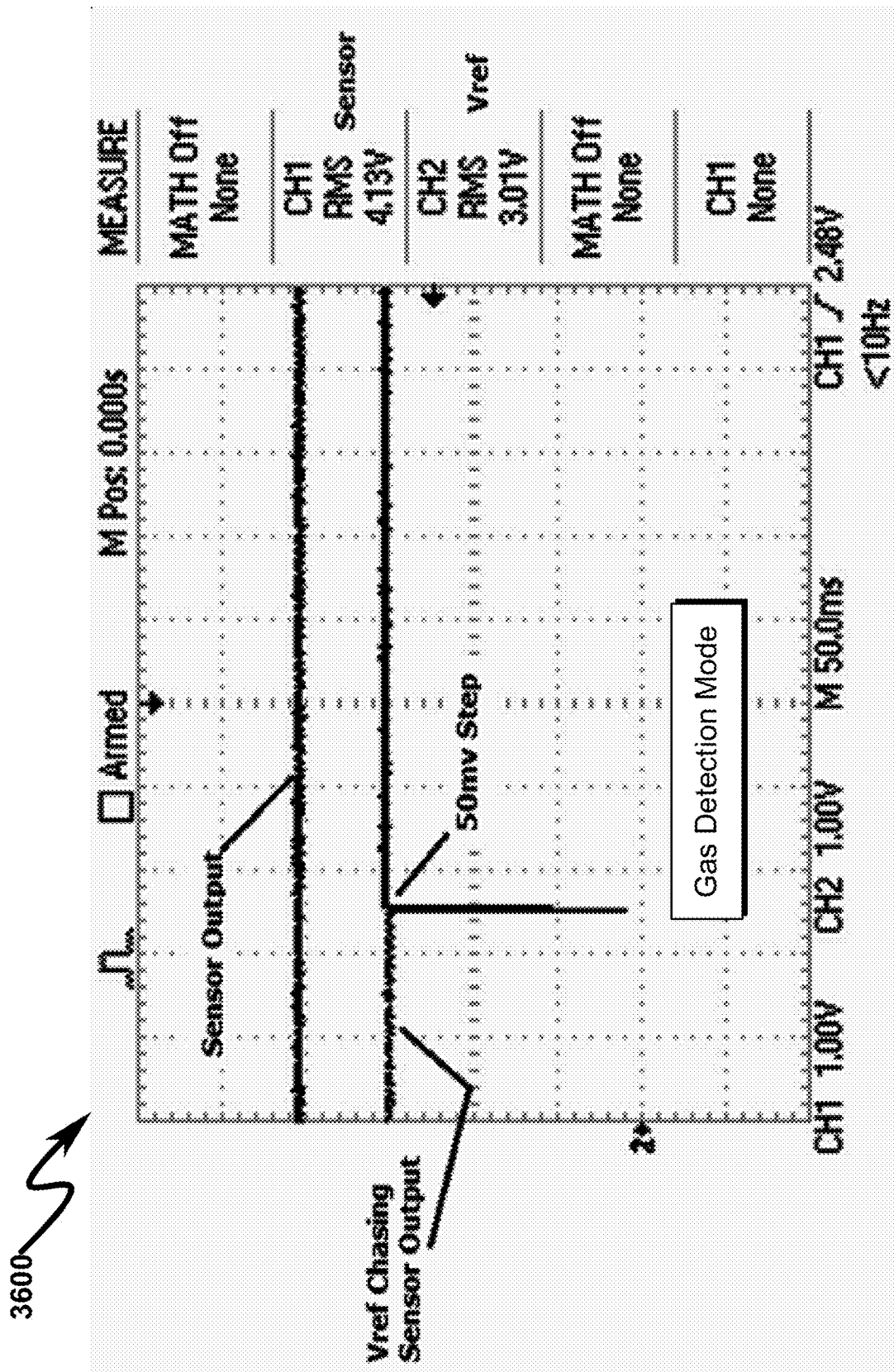
FIG. 36 illustrates an oscilloscope waveform graph depicting operation of a preferred exemplary system embodiment in the GAS DETECTION STATE.
Figure 40:
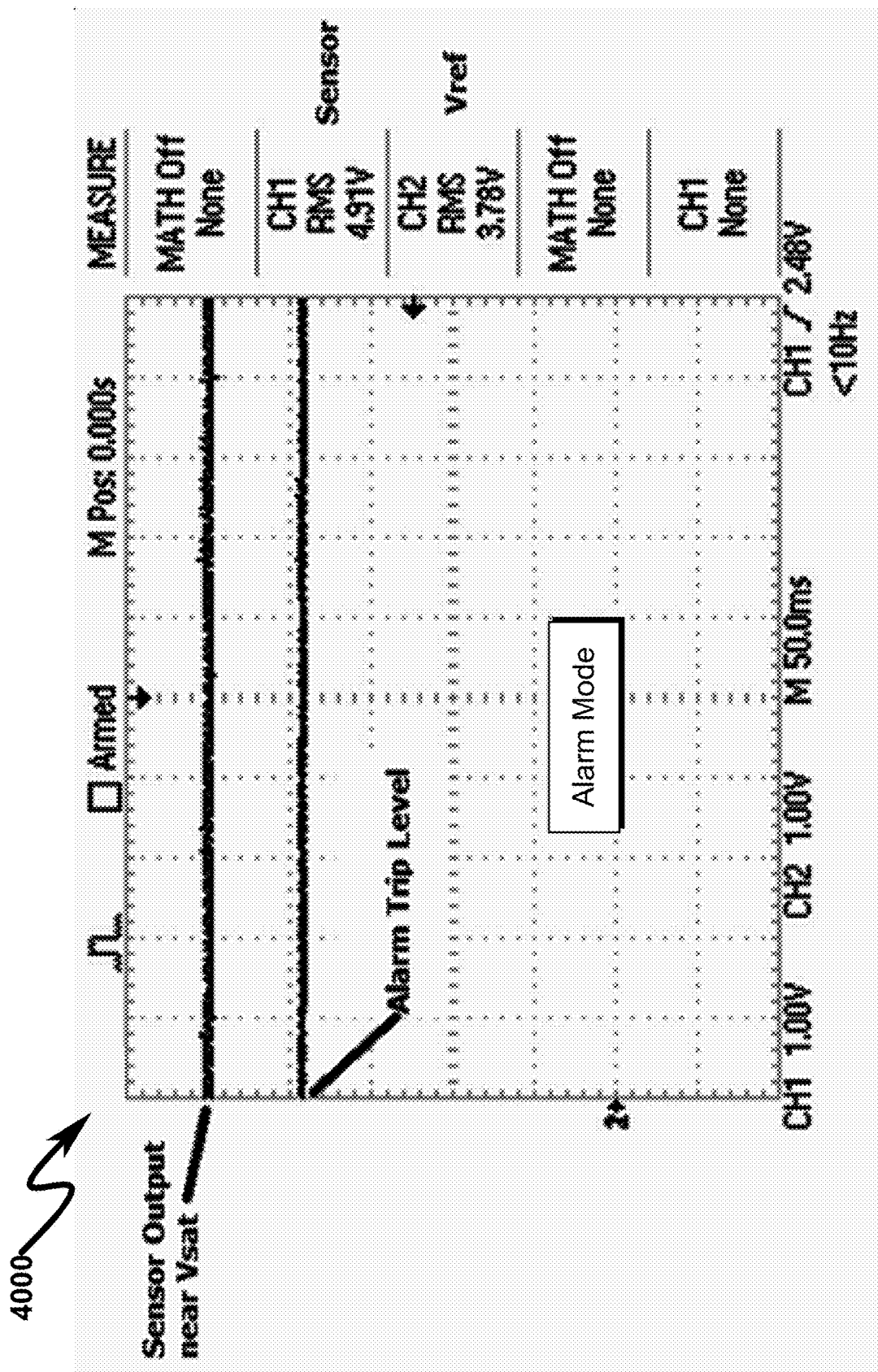
FIG. 40 illustrates an oscilloscope waveform graph depicting operation of a preferred exemplary system embodiment in the ALARM STATE.

As an aid in understanding the operation of the CCL interaction between the SSC and DCP, exemplary waveform displays are presented in FIG. 33 (3300)-FIG. 40 (4000). FIG. 33 (3300) depicts various CCL states described in more detail in the waveform diagrams of FIG. 34 (3400)-FIG. 40 (4000), including the WARMING STATE (3311, 3400), MONITOR STATE (3312, 3500), GAS DETECTION STATE (3313, 3600), PHANTOM GAS STATE (3303, 3700, 3800, 3900) (a sub-state of the GAS DETECTION STATE (3313)), and ALARM STATE (3314, 4000).
WARMUP STATE (3400)
As generally depicted in FIG. 34 (3400), at power up or reset, the system enters CALIBRATION MODE for a selected time period (typically user selectable from 2 minutes to 1 hour). ASI LED is in fast flash mode during this state.
MONITOR STATE (3500)
As generally depicted in FIG. 35 (3500), after calibration/warming mode, the system enters the MONITOR STATE. A stabile sensor output will remain between the upper and lower threshold voltages.
The ASI LED in this mode is in slow flash operation.
If the sensor output drifts below the lower threshold voltage (LTH) due to cleaner ambient air, the system will recalibrate the sensor output between LTH and UTH (~2.5V).
If the sensor output moves above LTH gas has been detected, and the system now switches off auto calibrate mode and the V reference will now step in 50 mV increments at a selectable time delay from 10 seconds to 2 minutes.
GAS DETECTION STATE (3600)
As generally depicted in FIG. 36 (3600), in the GAS DETECTION STATE the sensor output rises above UTH, and Vref begins to move upward toward the sensor output in 50 mV increments and a variable sample time from 10 seconds to 2 minutes is established. The longer sample time requires about 42-45 minutes before the alarm threshold voltage is reached and is used to allow phantom gases to dissipate causing the sensor output to decrease below the alarm threshold.

Figure 37:
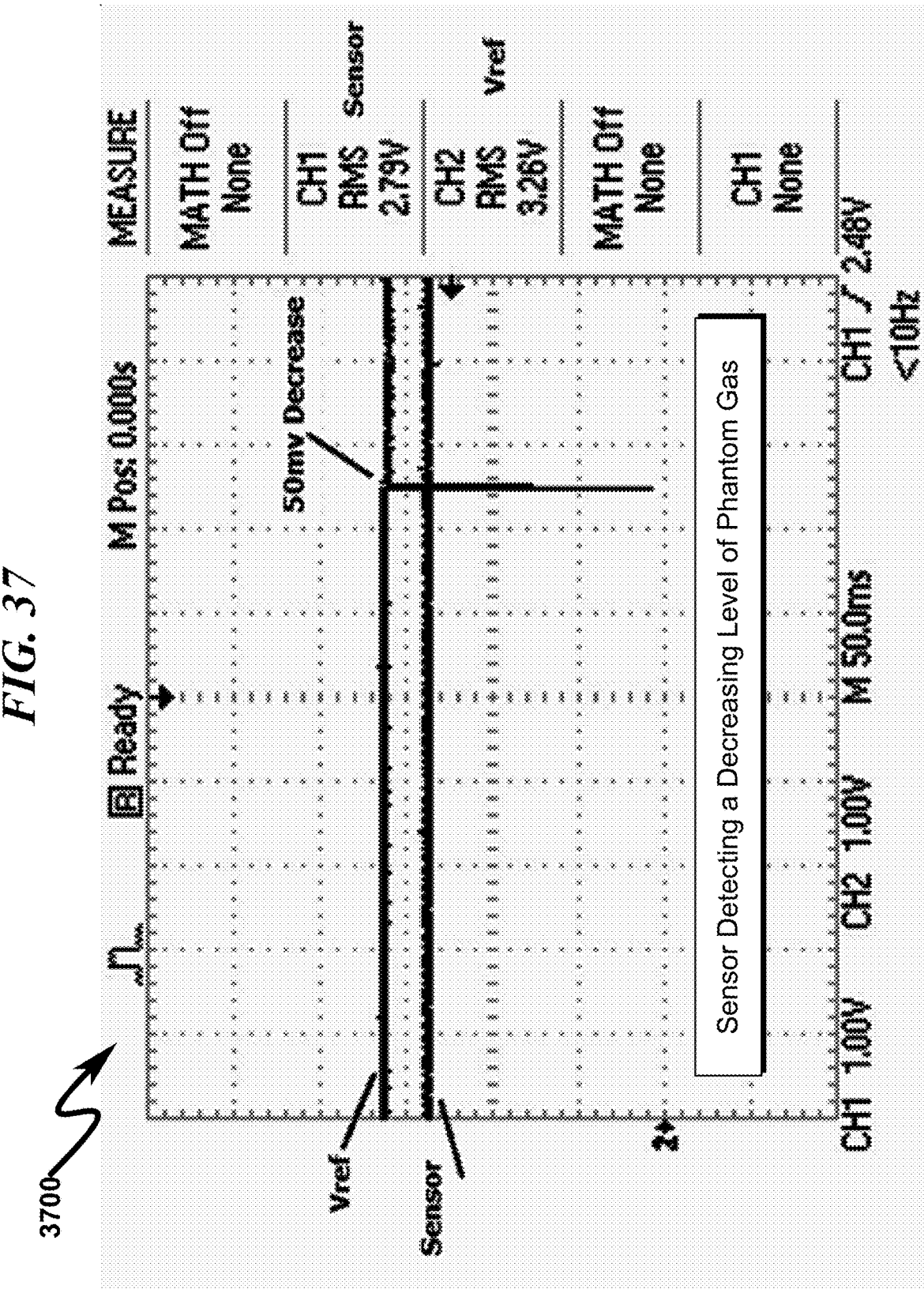
FIG. 37 illustrates an oscilloscope waveform graph depicting operation of a preferred exemplary system embodiment in the GAS DETECTION PHANTOM GAS LEVEL DECREASING STATE.
Figure 38:
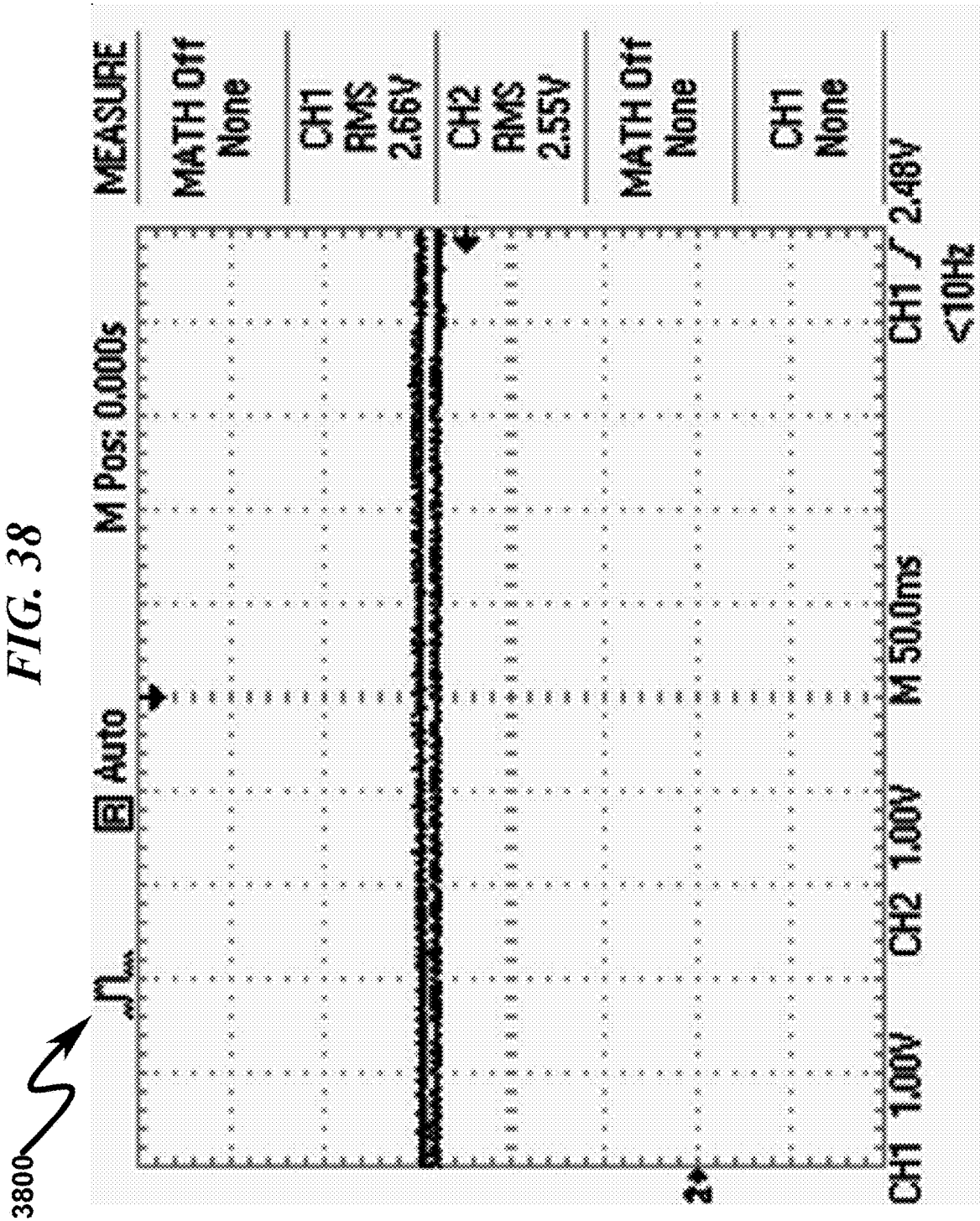
FIG. 38 illustrates an oscilloscope waveform graph depicting operation of a preferred exemplary system embodiment in the GAS DETECTION PHANTOM GAS LEVEL INCREASING STATE.
Figure 39:
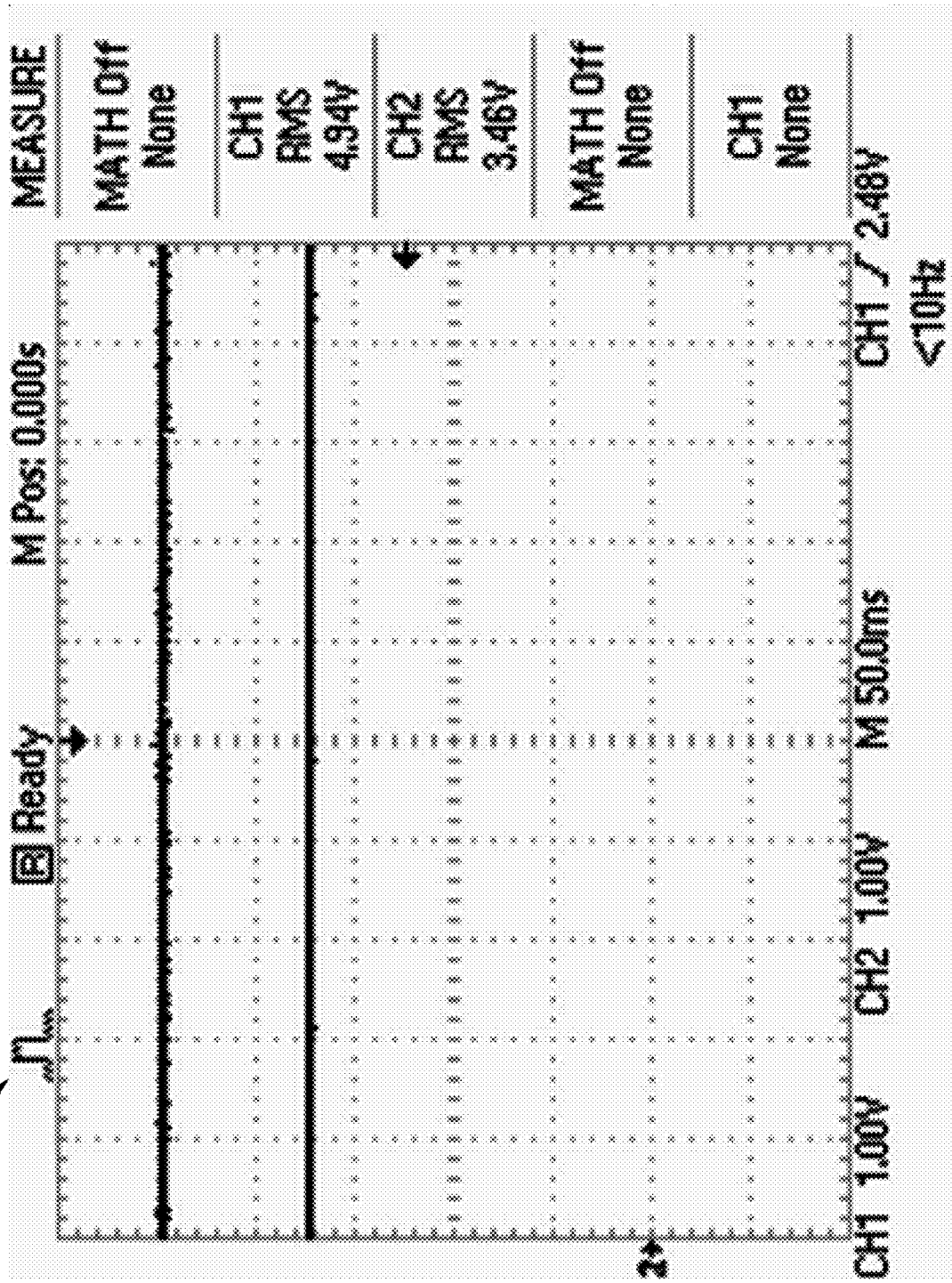
FIG. 39 illustrates an oscilloscope waveform graph depicting operation of a preferred exemplary system embodiment in the GAS DETECTION PHANTOM GAS LEVEL CONTINUES INCREASING STATE.

In this state the ASI LED is consistently on. Each time Vref is increased, the ASI audible alarm outputs a short 2 kHz burst. The STEP COUNTER will be incremented for each Vref step increase.
PHANTOM GAS LEVEL DECREASING OPERATION (3700)
As generally depicted in FIG. 37 (3700), system operation in the presence of a phantom gas is displayed. This example depicts the phantom gas level decreasing. Vref will follow Vsensor downward every 10 seconds.
The ASI LED remains consistently on in this mode. The ASI audible alarm outputs a frequency lower than 2 khz to indicate Vref is decreasing.
The STEP COUNTER will be decremented for each Vref step decrease.
PHANTOM GAS LEVEL INCREASING OPERATION (3800)
As generally depicted in FIG. 38 (3800), system operation in the presence of a phantom gas is displayed. In this example Vref is increasing toward Vsensor.
PHANTOM GAS LEVEL CONTINUES INCREASING OPERATION (3900)
As generally depicted in FIG. 39 (3900), system operation in the presence of a phantom gas is displayed. In this example Vref continues to increase toward Vsensor.
ALARM STATE (4000)
As generally depicted in FIG. 40 (4000), system operation in the presence of an alarm condition is displayed. In this example when Vref reaches a voltage of 3.78 v the ALARM STATE is triggered and system shuts down power to both solenoid valves, opens T1 & T2 contacts, ASI LED flashes 5 times fast followed by a pause while the ASI audible alarms outputs a 2 khz burst. In this state the system must be manually reset by pressing manual reset switch, cycling system power, or issuing a remote reset via BLUETOOTH® communication application operating on a mobile user device (MUD).

Description of Monitor Loop

For the purpose of clarifying operation of the MONITOR STATE with respect to the HLD/HLM, an exemplary HLD system will now be discussed in detail. For this example a 1 hour warm up and 2 minute step time will be assumed.
Exemplary HLD Operation
After a one hour warm up, system now enters the Monitor mode:
(1) If Vsensor is stable and remains between Lth (2.4V) & Uth (2.63V), no action is taken.
(2) If ambient air becomes cleaner than initial warm up mode, sensor output will drop below Lth (2.4V), and sensor is then recalibrated to midpoint (2.5V) of Uth & Lth.
(3) If HBG or phantom gas is detected, sensor output will increase above Uth (2.62V). System now enters gas detected mode and sensor recalibration is disabled. Depending upon gas concentration, Vsensor output will increase limited only by Vsat of +5V. A gas concentration of approximately 100 ppm is usually adequate for sensor output to rise above Uth.
(4) One of three scenarios are now possible (see FIG. 35 (3500)-FIG. 40 (4000):
   (a) Vsensor increases above Uth but stabilizes below the alarm trip voltage of 3.78V. This indicates a small gas leak that is sustained but not adequate to trip alarm. Vref will step above and below the stabilized voltage of Vsensor. The LEVEL COUNTER will show maximum step level reached and is an indicator of gas leak severity.

(b) Vsensor increases above Uth and initially at a level above the alarm trip voltage of 3.78V. This indicates a large gas concentration caused by HBG leakage or phantom gas. The program will step Vref in 50 mV increments starting at Uth with a time delay of 2 minutes between each step which takes 42 minutes to reach alarm trip point. Each time Vref is incremented, the LEVEL COUNTER will also be incremented and stored in flash memory.

(c) If phantom gas is being detected, Vsensor will begin a gradual decline (before the alarm trip voltage is reached), in which case Vref will overcome Vsensor at some voltage below the alarm trip voltage, Vref and step counter will be decremented in 10 second intervals until Vsensor drops below Uth and system returns to monitor mode.

(d) If a severe HBG leak is being detected, Vsensor will remain above the alarm trip voltage of 3.78 for a time period that allows Vref to be incremented in 50 mV steps. It would take approximately 21 steps times 2 minutes or 42 minutes to reach alarm trip point.

Optional Operations

There are a couple of options that may be changed via the WCI to provide adaptation to extreme environments, including but not limited to the following:

(a) Alarm trip voltage can be switch between a normal value of 3.78 and higher value of 4.25V. This changes the maximum step counter from 21 to about 30, thus changing the alarm detection time from 42 to 60 minutes or any value of our choosing.

(b) The deadband voltage between Lth and Uth can be changed to allow an increase or decrease in sensor drift sensitivity.

One skilled in the art will recognize that theses options may be expanded in some application contexts.

SUMMARY

When system enters monitor mode, Vsensor is stable (no gas detected), Vsensor decreases below Lth, Vsensor is recalibrated to 2.5V (cleaner ambient air) or Vsensor rises above Uth and system enters gas detected mode.

In gas detected mode Vref starts at Uth and is incremented in 50 mV steps along with step counter. Vsensor could be sensing a minor HBG gas leak no alarm would trip, a phantom gas where gas levels decrease over time until system returns to monitor mode, or a major HBG leak which results in an alarm trip.

HLM Exemplary System Embodiment (4100)-(4800)

Figure 41:
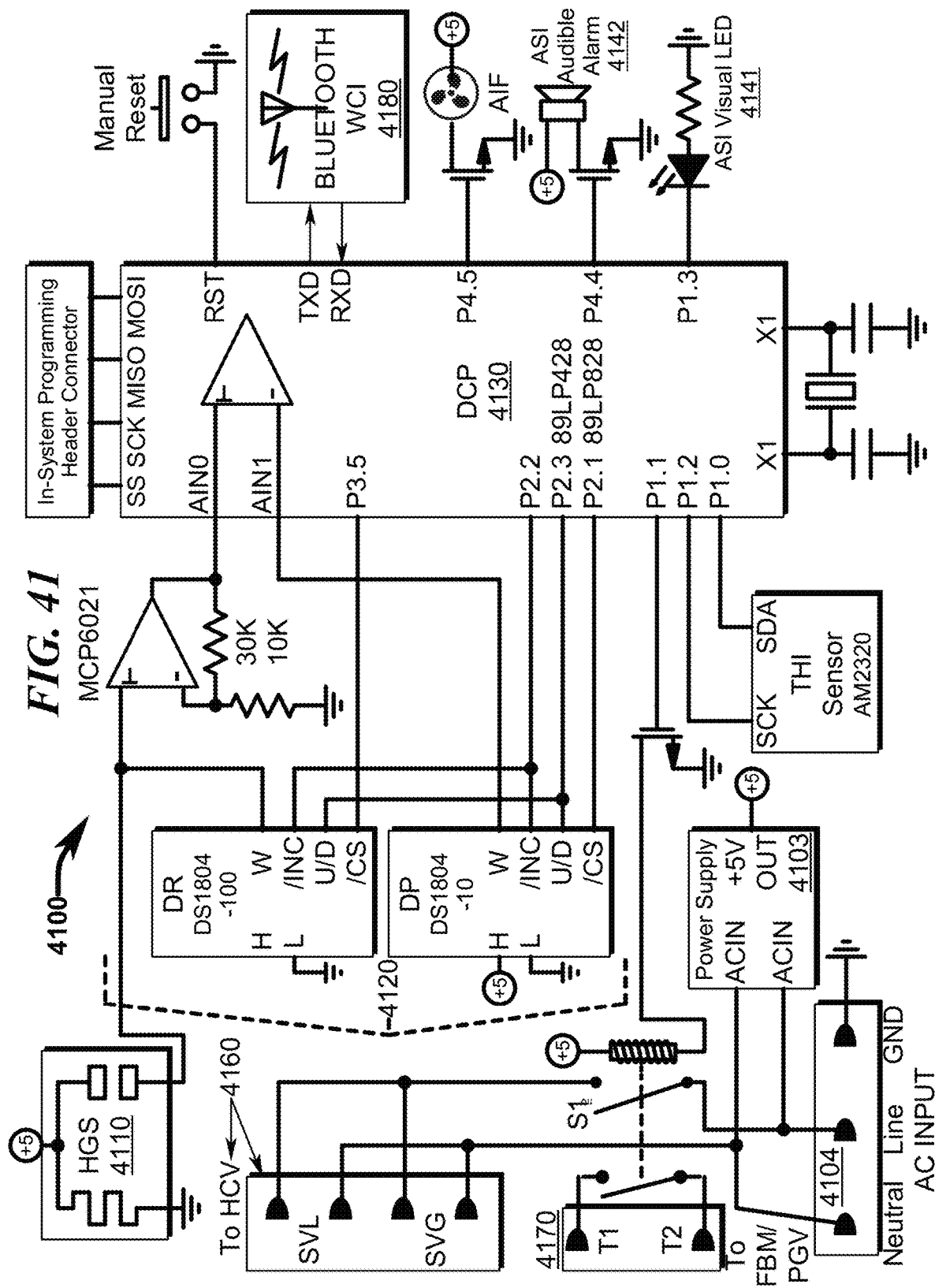
FIG. 41 illustrates an exemplary schematic of a preferred exemplary invention HLM system embodiment.
Figure 48:
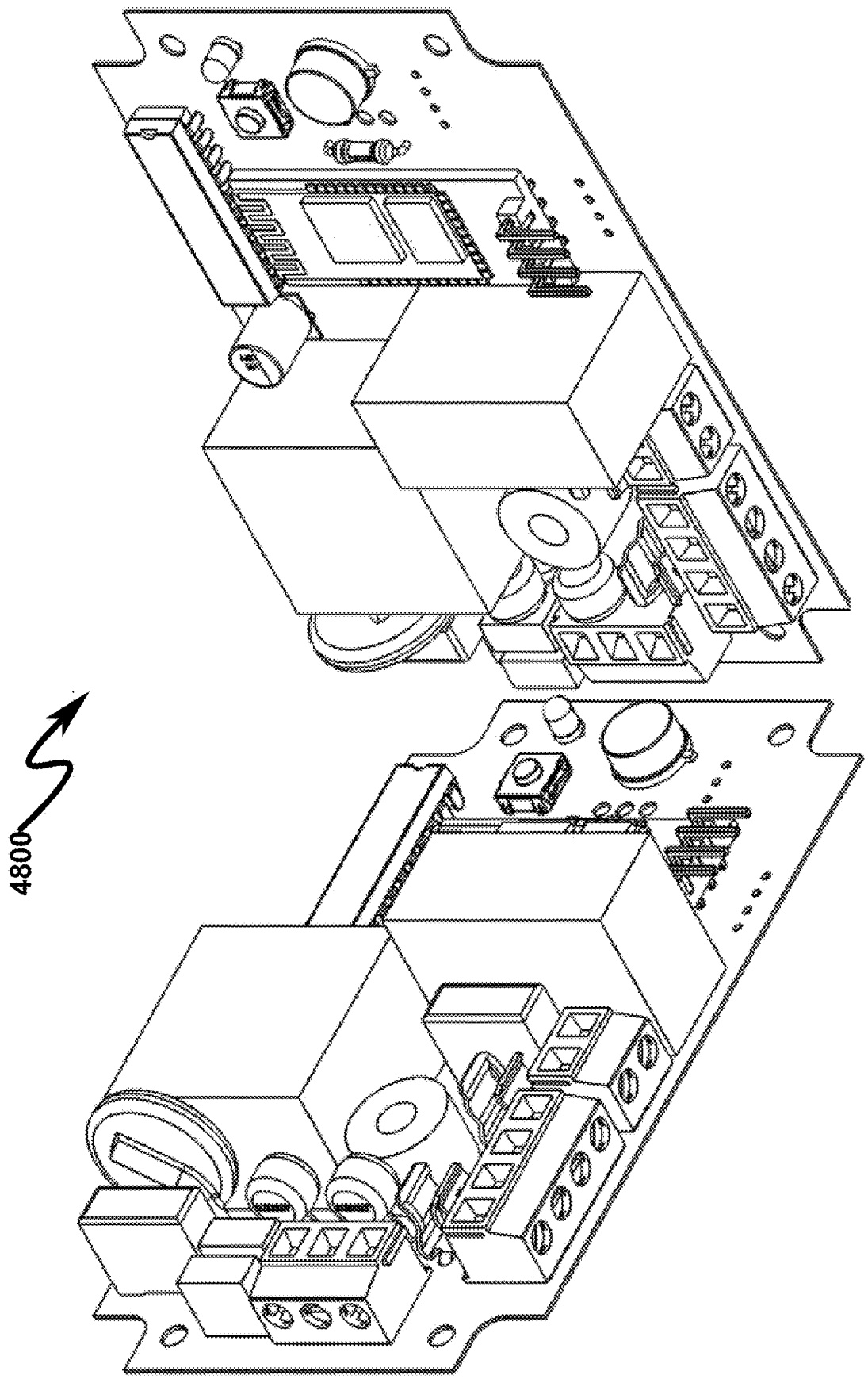
FIG. 48 illustrates bottom left side and bottom right side perspective views of a printed circuit board (PCB) hardware implementation of a preferred exemplary invention HLM system embodiment corresponding to the schematic of FIG. 41.

A preferred exemplary embodiment of a HLD system is generally depicted in FIG. 41 (4100)-FIG. 48 (4800). As generally depicted in the schematic of FIG. 41 (4100) it can be seen that the system may operate to control a variety of HCVs (4160) and T1/T2 HVAC compressor contactors (HCC) (4170) based on detection of a HBG leak by the HGS (4110).

The system as depicted is designed to operate using an AC power supply (4103) with AC power derived from the HVAC system and provides for Line/Neutral/Ground (LNG) (4104) power connections, SVL/SVG contactors (4160) that allow for activation of the HBG control valves (HCVs) in the HVAC HBG flow loop and T1/T2 contacts (4170) that control the HVAC compressor via the HCC.

Figure 42:
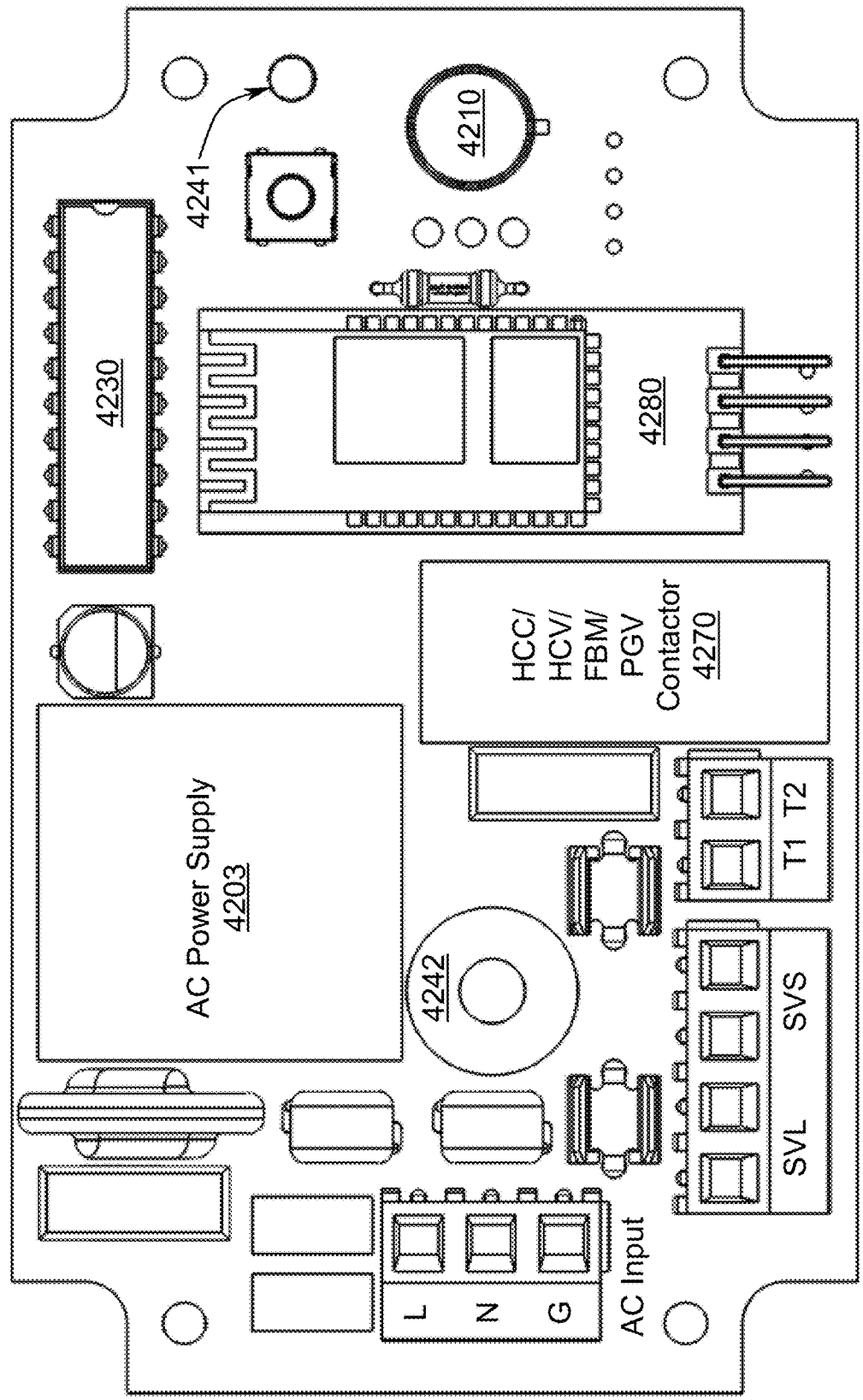
FIG. 42 illustrates a front view of a printed circuit board (PCB) hardware implementation of a preferred exemplary invention HLM system embodiment corresponding to the schematic of FIG. 41.
Figure 43:
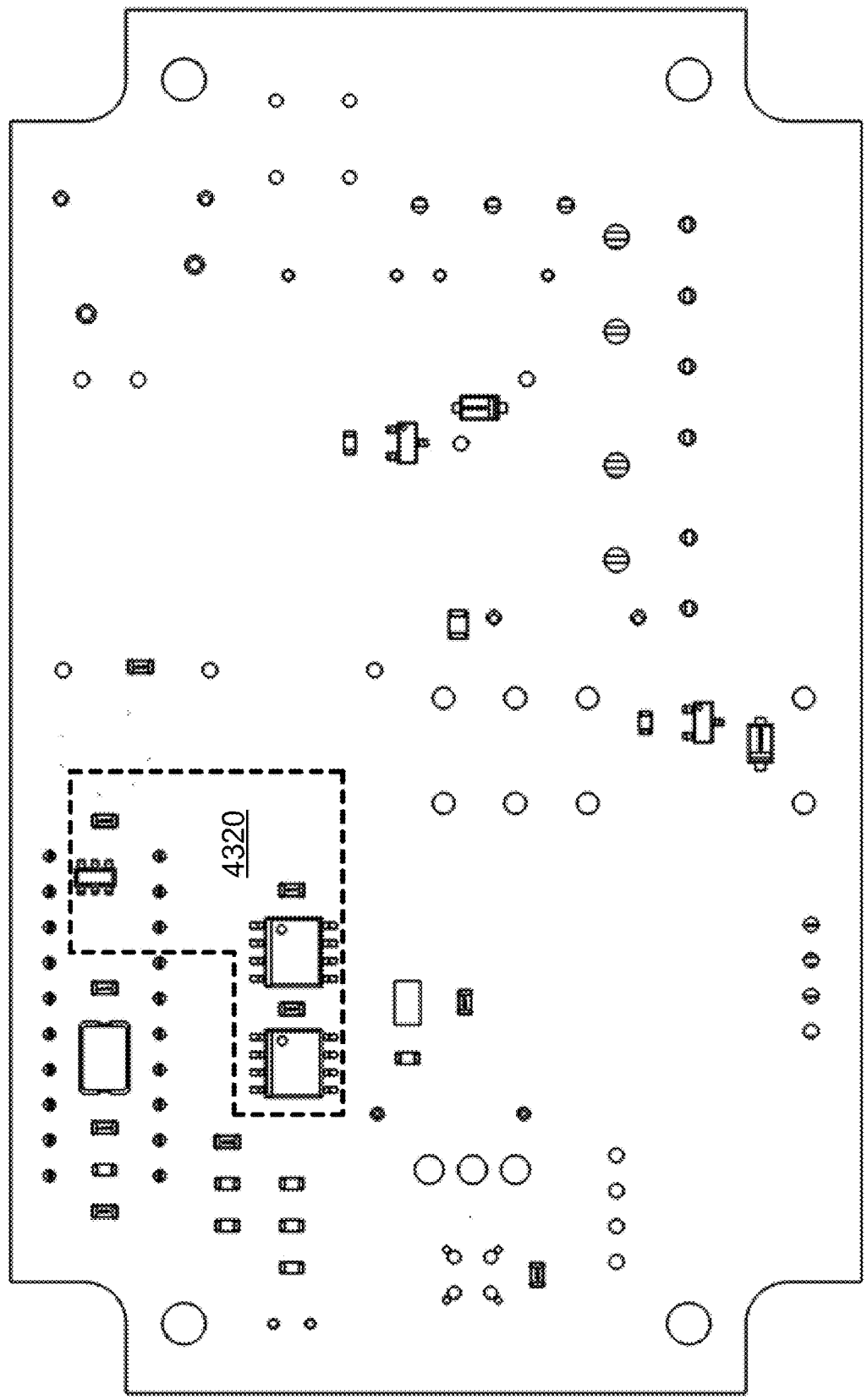
FIG. 43 illustrates a rear view of a printed circuit board (PCB) hardware implementation of a preferred exemplary invention HLM system embodiment corresponding to the schematic of FIG. 41.
Figure 44:
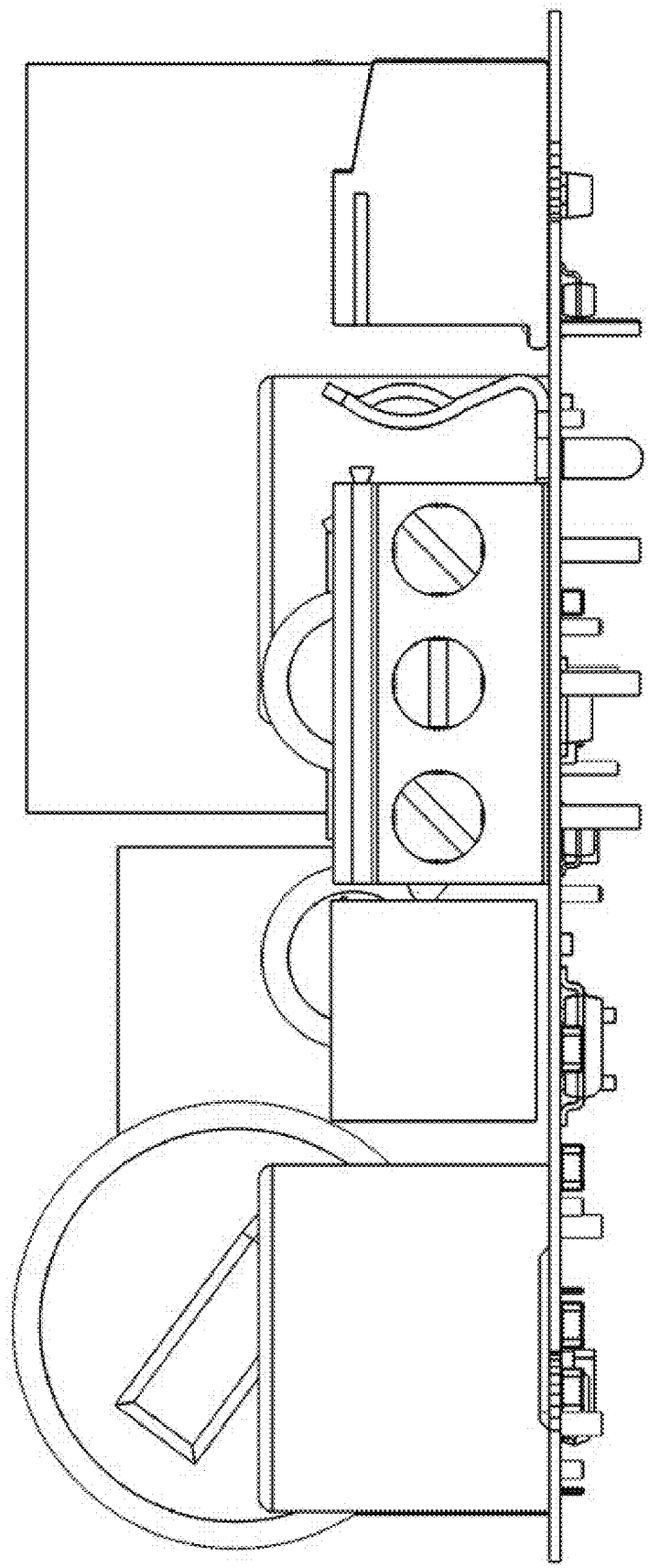
FIG. 44 illustrates a left side view of a printed circuit board (PCB) hardware implementation of a preferred exemplary invention HLM system embodiment corresponding to the schematic of FIG. 41.
Figure 45:
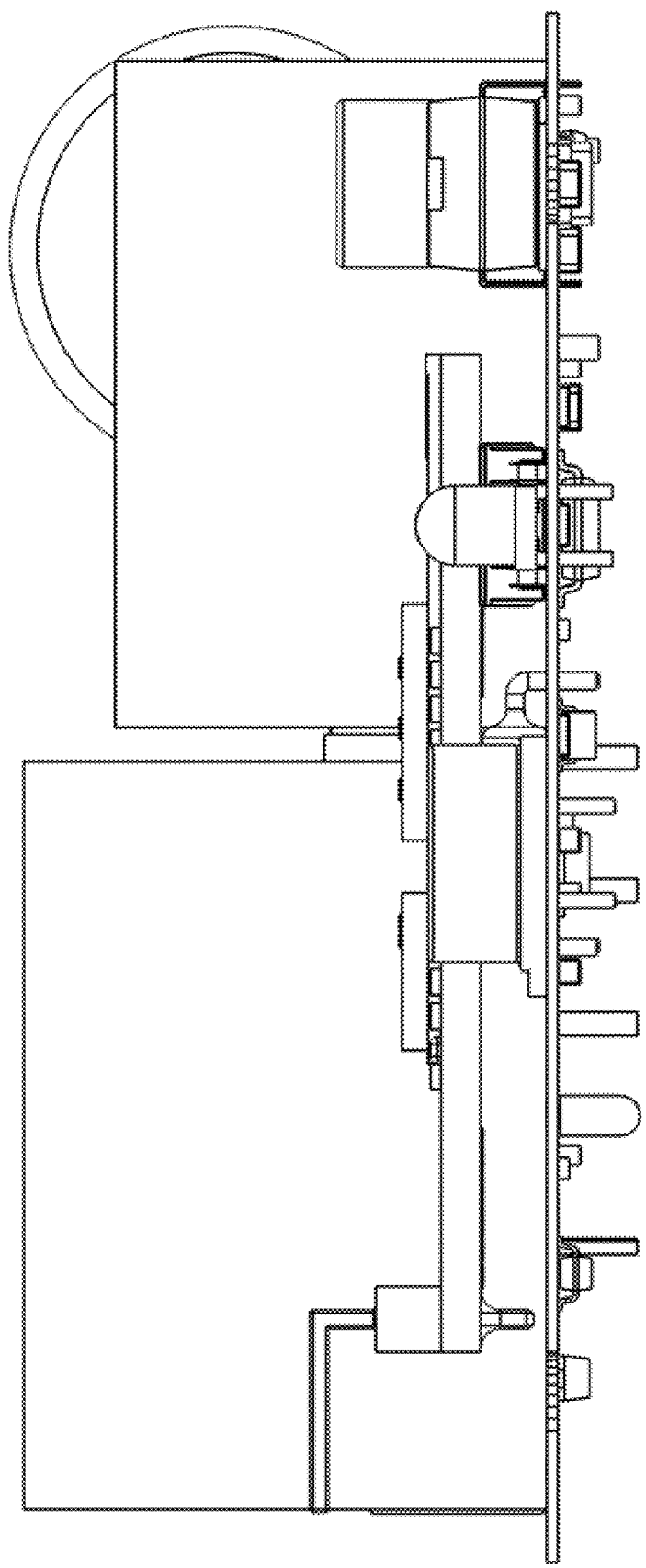
FIG. 45 illustrates a right side view of a printed circuit board (PCB) hardware implementation of a preferred exemplary invention HLM system embodiment corresponding to the schematic of FIG. 41.
Figure 46:
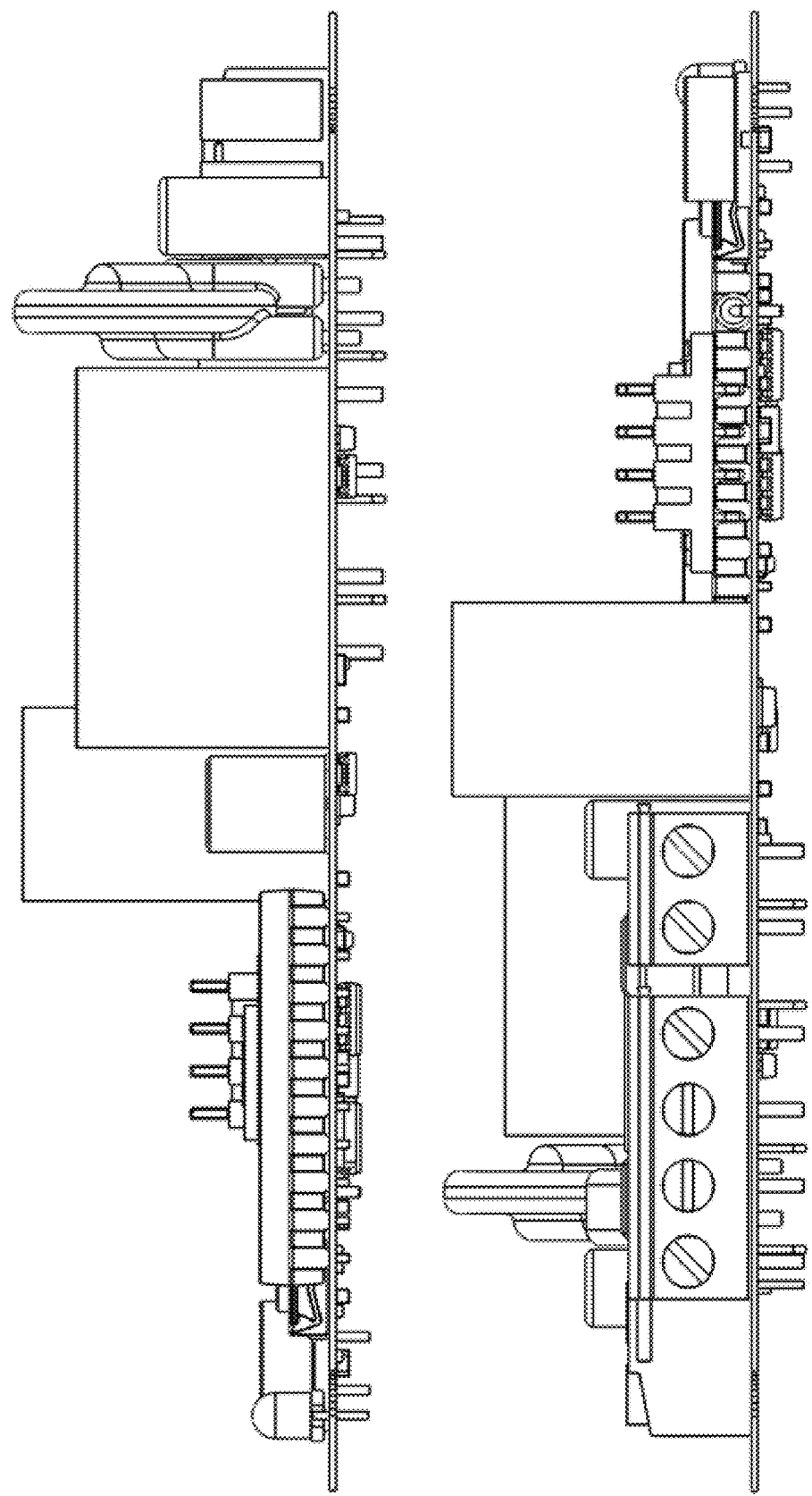
FIG. 46 illustrates top and bottom side views of a printed circuit board (PCB) hardware implementation of a preferred exemplary invention HLM system embodiment corresponding to the schematic of FIG. 41.
Figure 47:
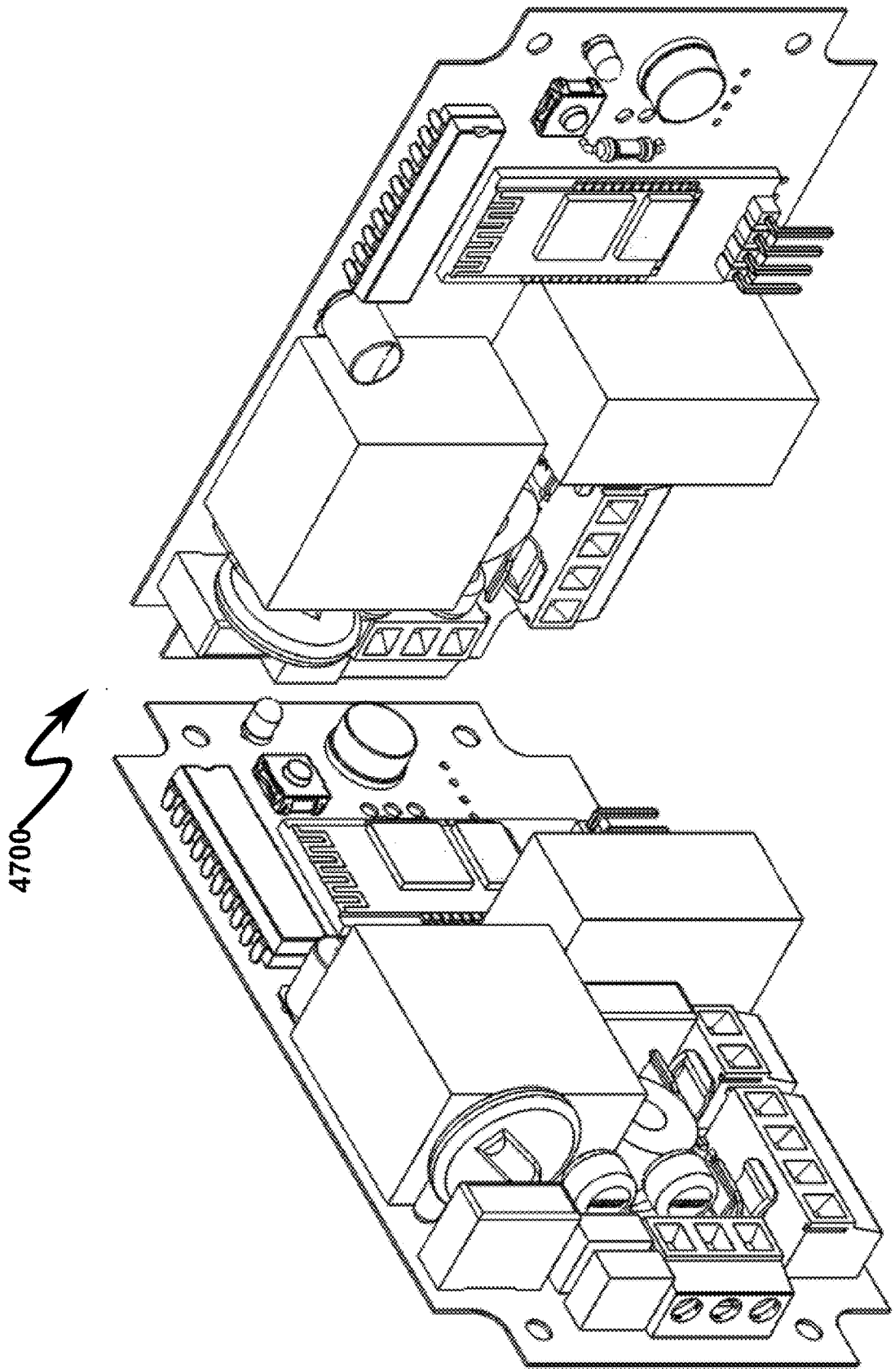
FIG. 47 illustrates top left side and top right side perspective views of a printed circuit board (PCB) hardware implementation of a preferred exemplary invention HLM system embodiment corresponding to the schematic of FIG. 41.

Provisions for the DCP (4130, 4230) is included on the top surface of the PCB depicted in FIG. 42 (4200)-FIG. 48 (4800) while the SSC components (4120, 4320) are provided for on the bottom surface of the PCB (FIG. 43 (4300)). ASI indicators are provided for visual (4141, 4241) and audible (4142, 4242) indicators.

Figure 50:
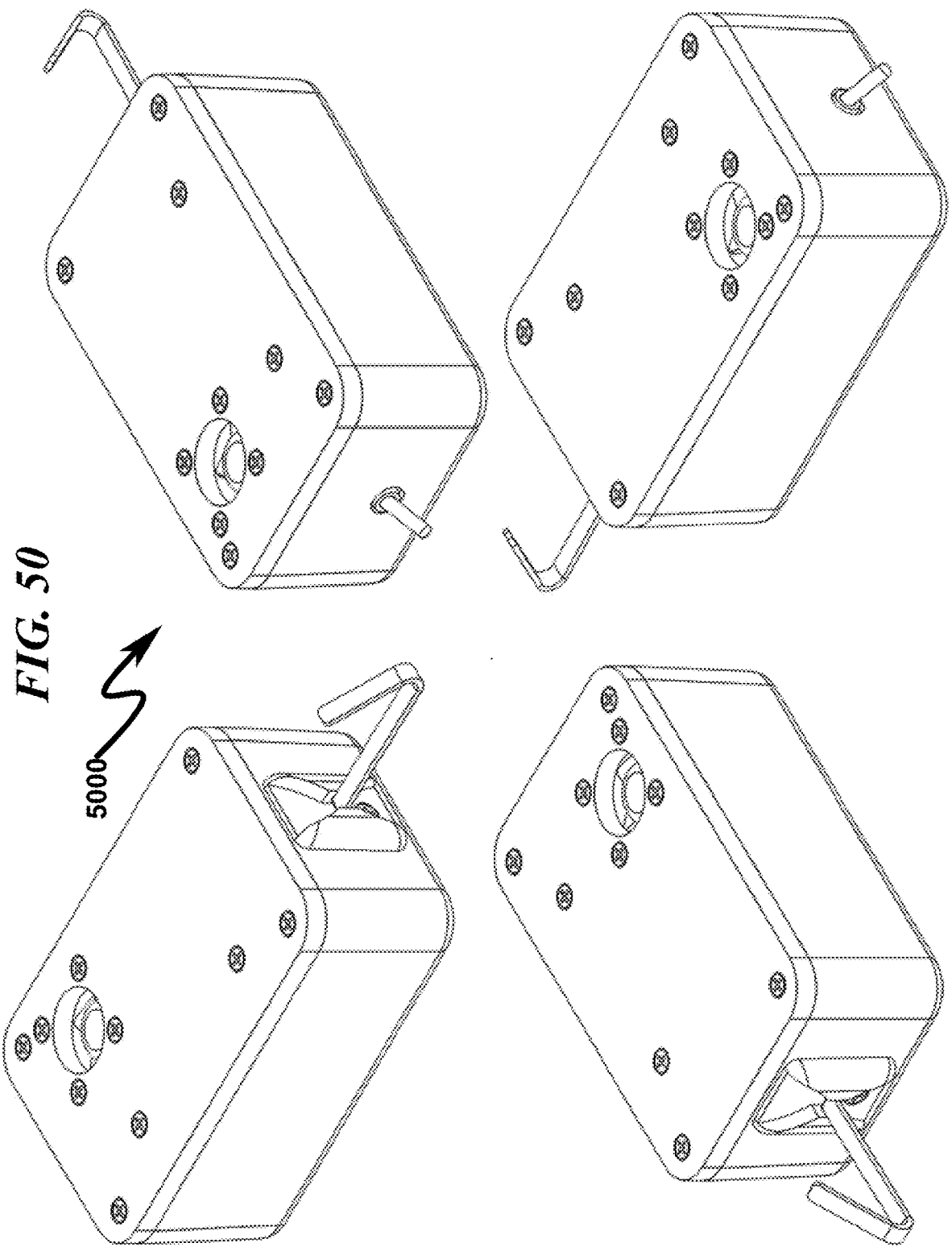
FIG. 50 illustrates various top perspective views of a preferred exemplary HLD system embodiment.
Figure 51:
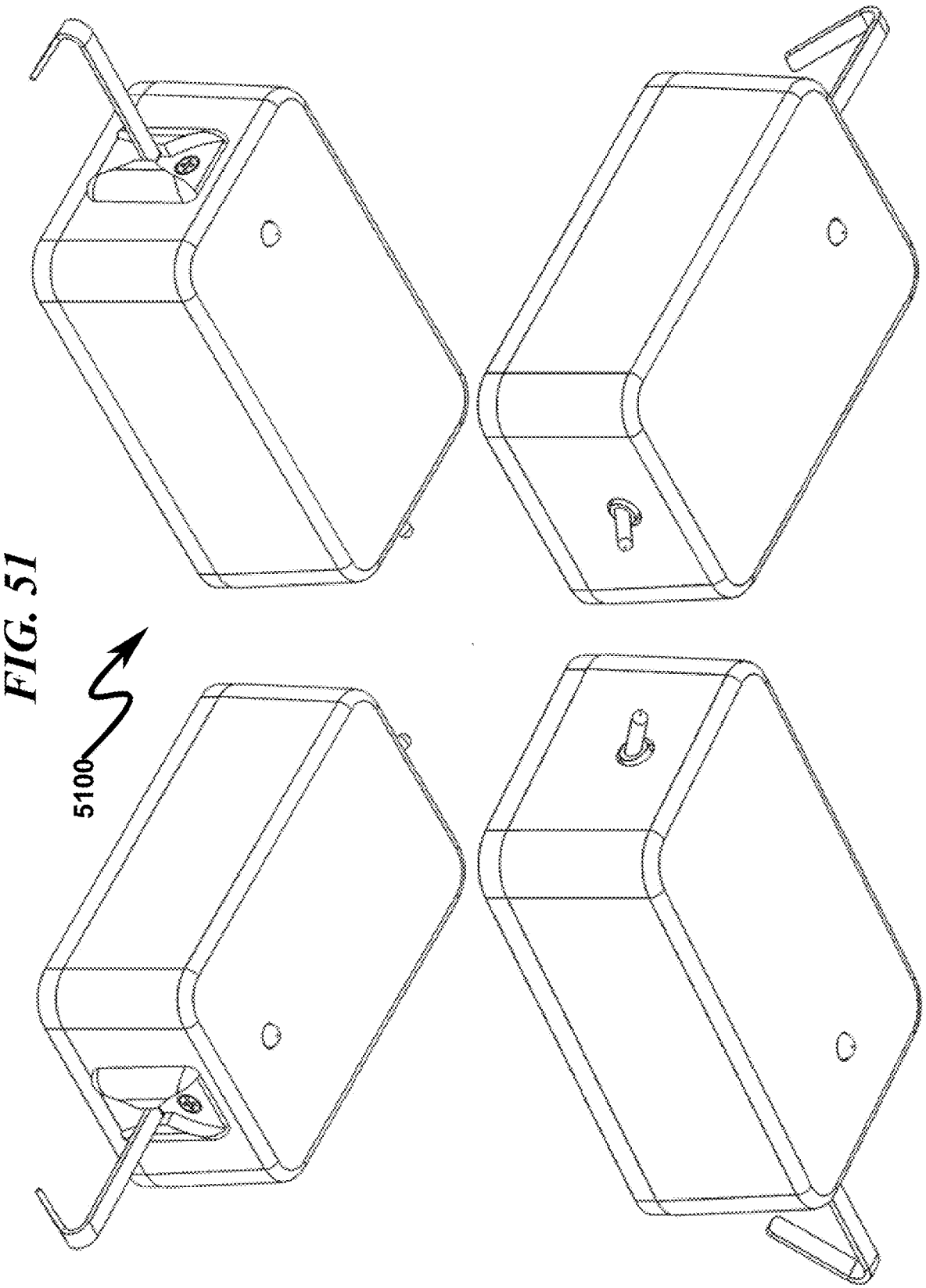
FIG. 51 illustrates various bottom perspective views of a preferred exemplary HLD system embodiment.

Exemplary PCB construction for this preferred exemplary HLM system embodiment is generally depicted in FIG. 42 (4200)-FIG. 48 (4800) but may vary widely based on application context. Note that commonly included miscellaneous components such as resistors, capacitors, surge suppression devices, and other similar components are not show in these figures for clarity and will be well known to those skilled in the art. A typical enclosure for this HLM is generally depicted in FIG. 50 (5000)-FIG. 51 (5100) and may encompass a form factor similar if not identical to that of a battery-powered HLD as described below.

HLD Exemplary System Embodiment (4900)-(5600)

Figure 49:
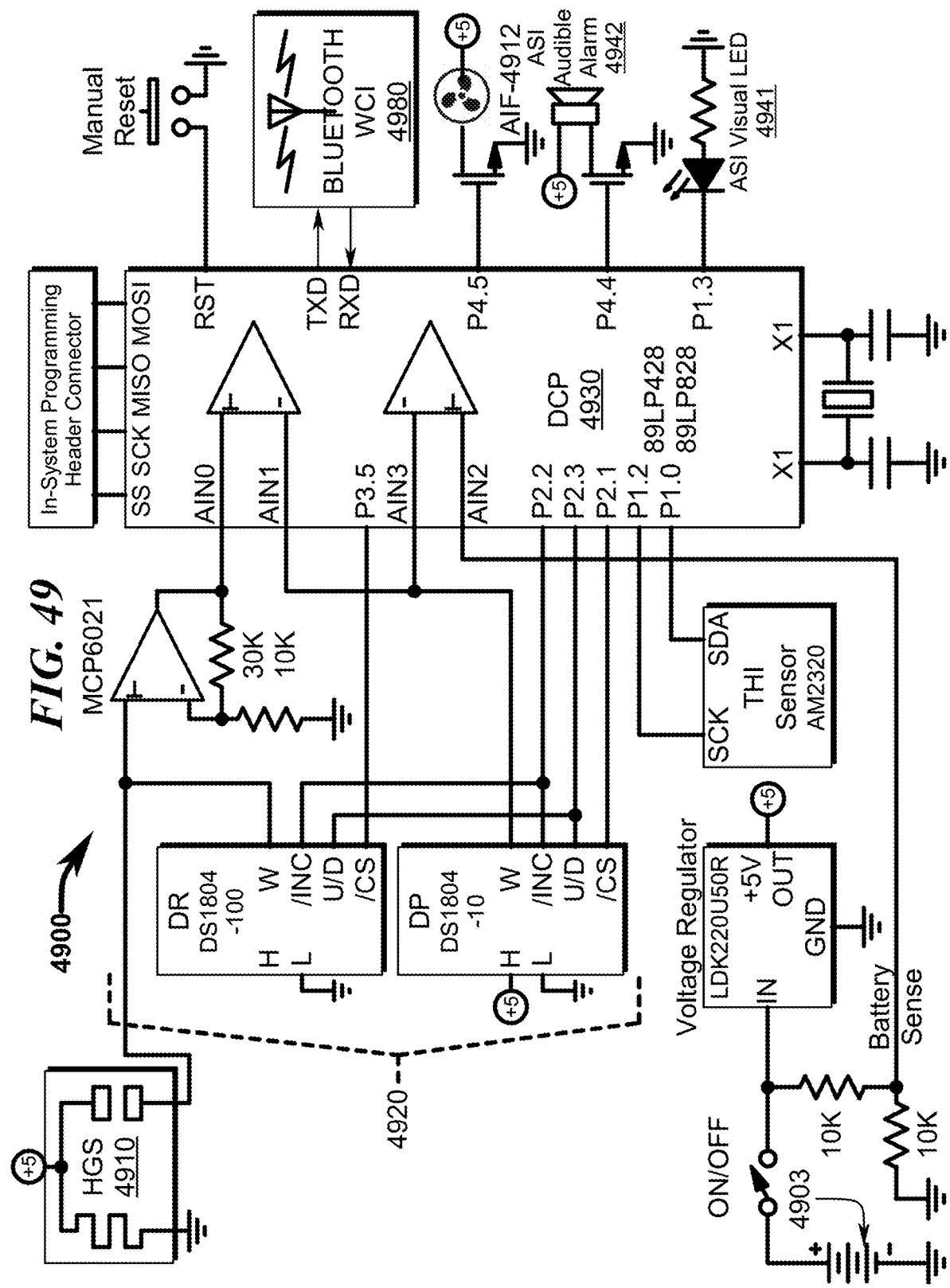
FIG. 49 illustrates a schematic depicting a preferred exemplary HLD system embodiment.
Figure 56:
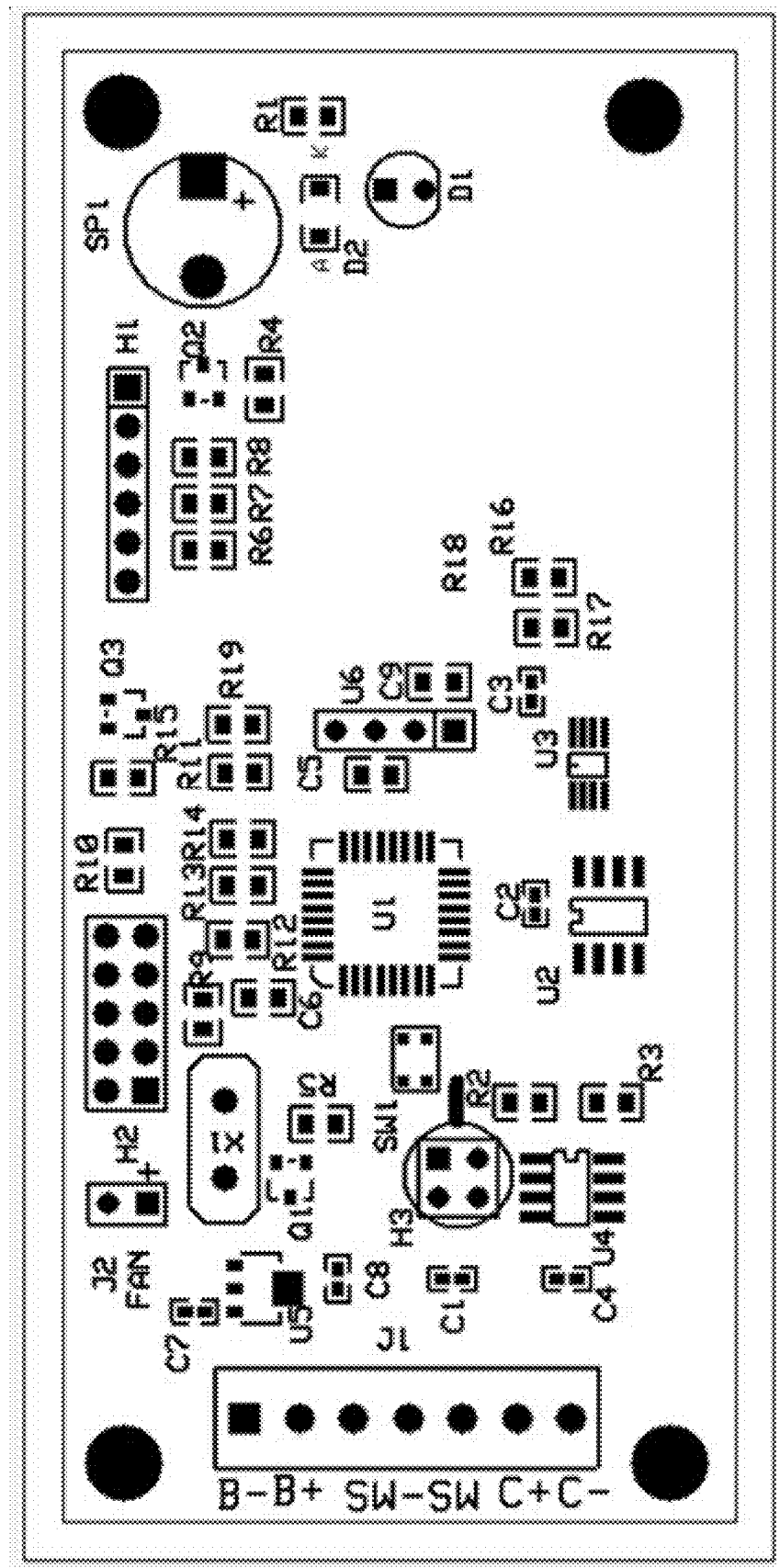
FIG. 56 illustrates a top view of a preferred exemplary PCB layout useful in some preferred exemplary HLD invention embodiments.

A preferred exemplary embodiment of a HLD system is generally depicted in FIG. 49 (4900)-FIG. 56 (5600). As generally depicted in the schematic of FIG. 49 (4900) it can be seen that the system is configured for portable battery (4903, 5203) operation and provides only for ASI visual (4941, 5341) and ASI audible (4942, 5242) alarms. Communication of ASI alarm status may also be transmitted using the indicated BLUETOOTH® WCI network (4980, 5280). This WCI (4980, 5280) may also provide for retrieval of a historical log of leak detection data stored by the DCP (4930, 5230) as well as control of the SSC (4920) and DCP (4930, 5230) operation, including but not limited to inhibition of the ASI audible alarm (4942, 5242). Additional information regarding these control functions is illustrated in FIG. 64 (6400) and accompanying descriptive text herein.

This preferred exemplary embodiment incorporates support for low battery detection as well as activation of an air intake fan (AIF) (4912, 5212) that may be controlled by the DCP (4930, 5230) to allow intake of ambient air to flood the system enclosure with an air flow that may contain indications of a HBG leak.

Figure 52:
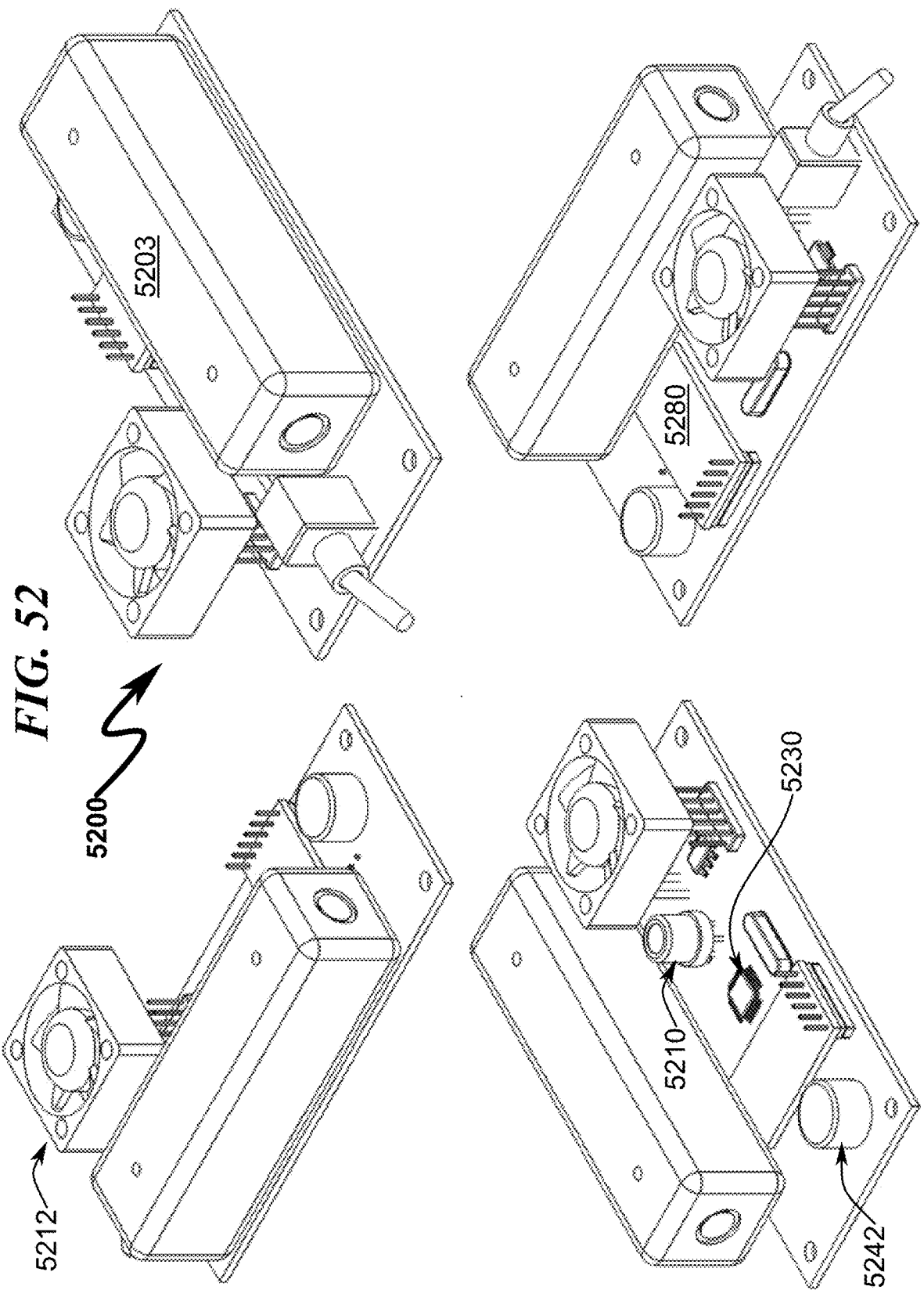
FIG. 52 illustrates various top internal perspective views of a preferred exemplary HLD system embodiment with enclosure, fasteners, and mounting hook omitted for clarity.
Figure 53:
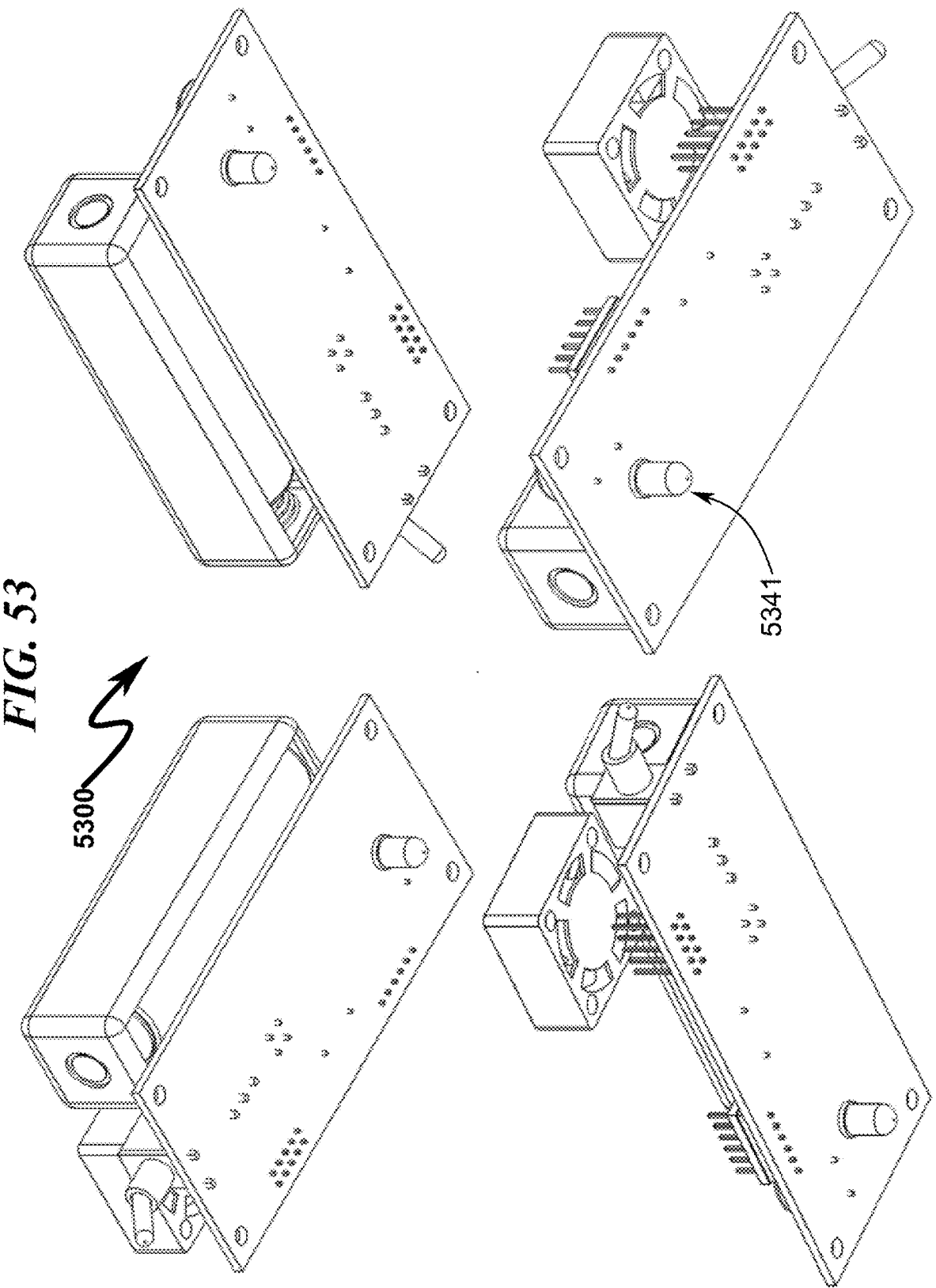
FIG. 53 illustrates various bottom internal perspective views of a preferred exemplary HLD system embodiment with enclosure, fasteners, and mounting hook omitted for clarity.
Figure 54:
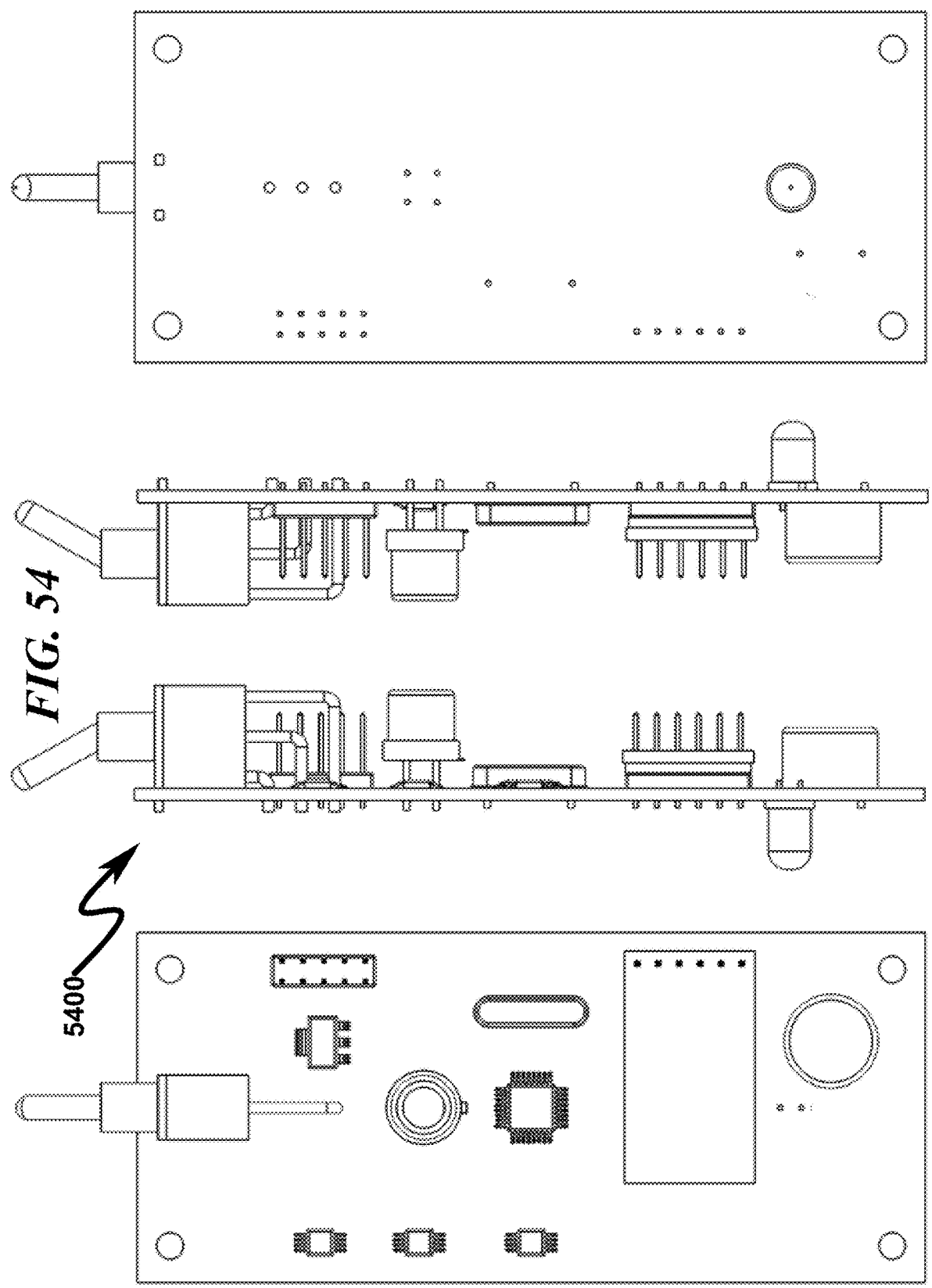
FIG. 54 illustrates top, side, and bottom views of a preferred exemplary HLD system PCB embodiment.
Figure 55:
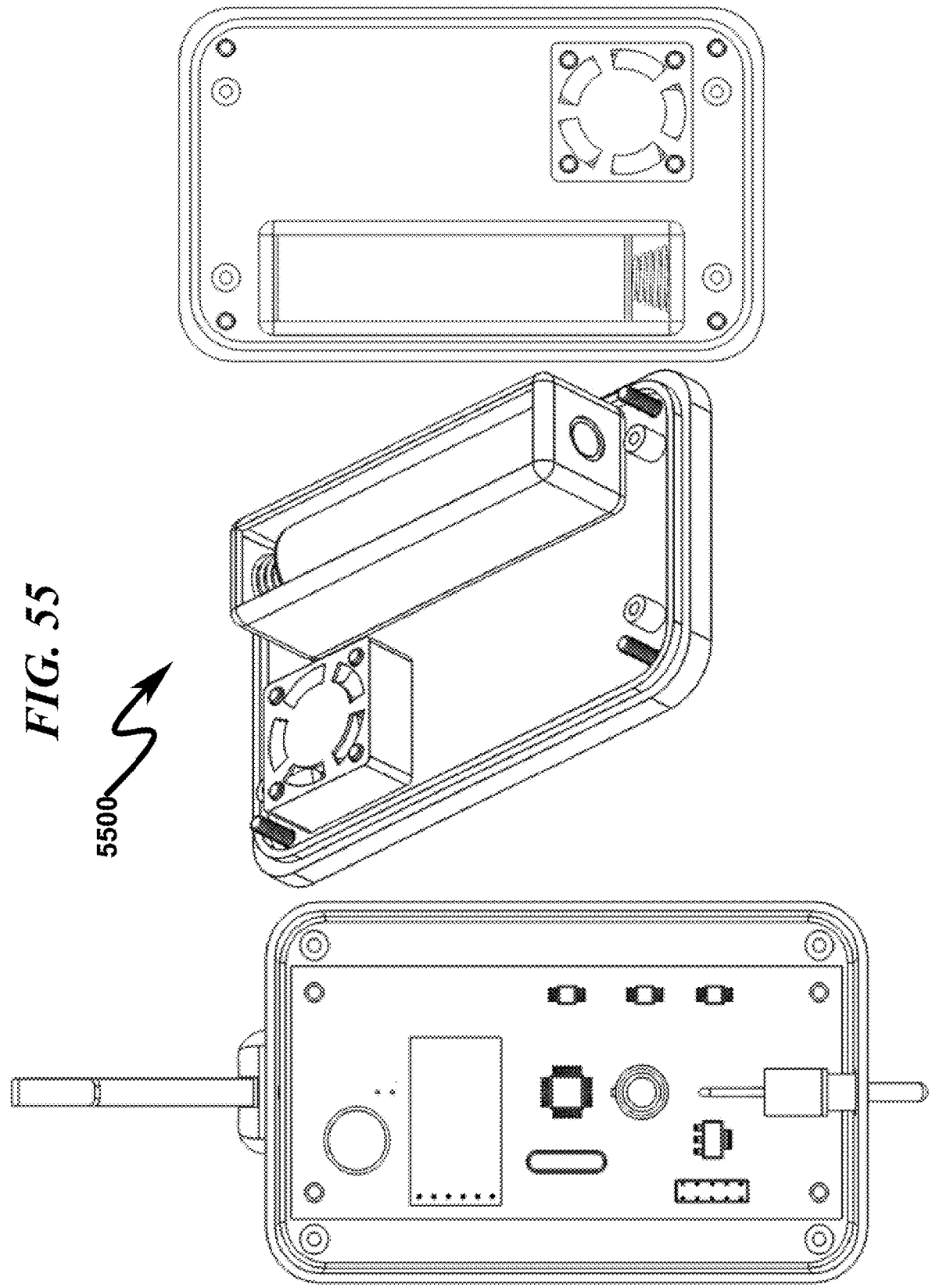
FIG. 55 illustrates top internal views of a preferred exemplary HLD system embodiment showing the base enclosure with PCB and support hanger and various views of the enclosure lid with AIF and battery holder/battery.

Physical construction of this preferred embodiment may vary widely, but one potential example is depicted in FIG. 50 (5000)-FIG. 56 (5600), wherein a box enclosure contains a printed circuit board (PCB) comprising analog and digital components from FIG. 49 (4900), and also serves as an enclosure for the battery, AIF, and HGS. One skilled in the art will recognize that the component placement depicted in FIG. 52 (5200)-FIG. 55 (5500) may vary widely based on a particular application context. While only exemplary, the PCB layout of FIG. 56 (5600) indicates one possible layout of components on the PCB. Within these illustrations cable assemblies have been omitted for clarity in depicting the positioning of components and other assemblies.

Typical Application Context (5700)

Figure 57:
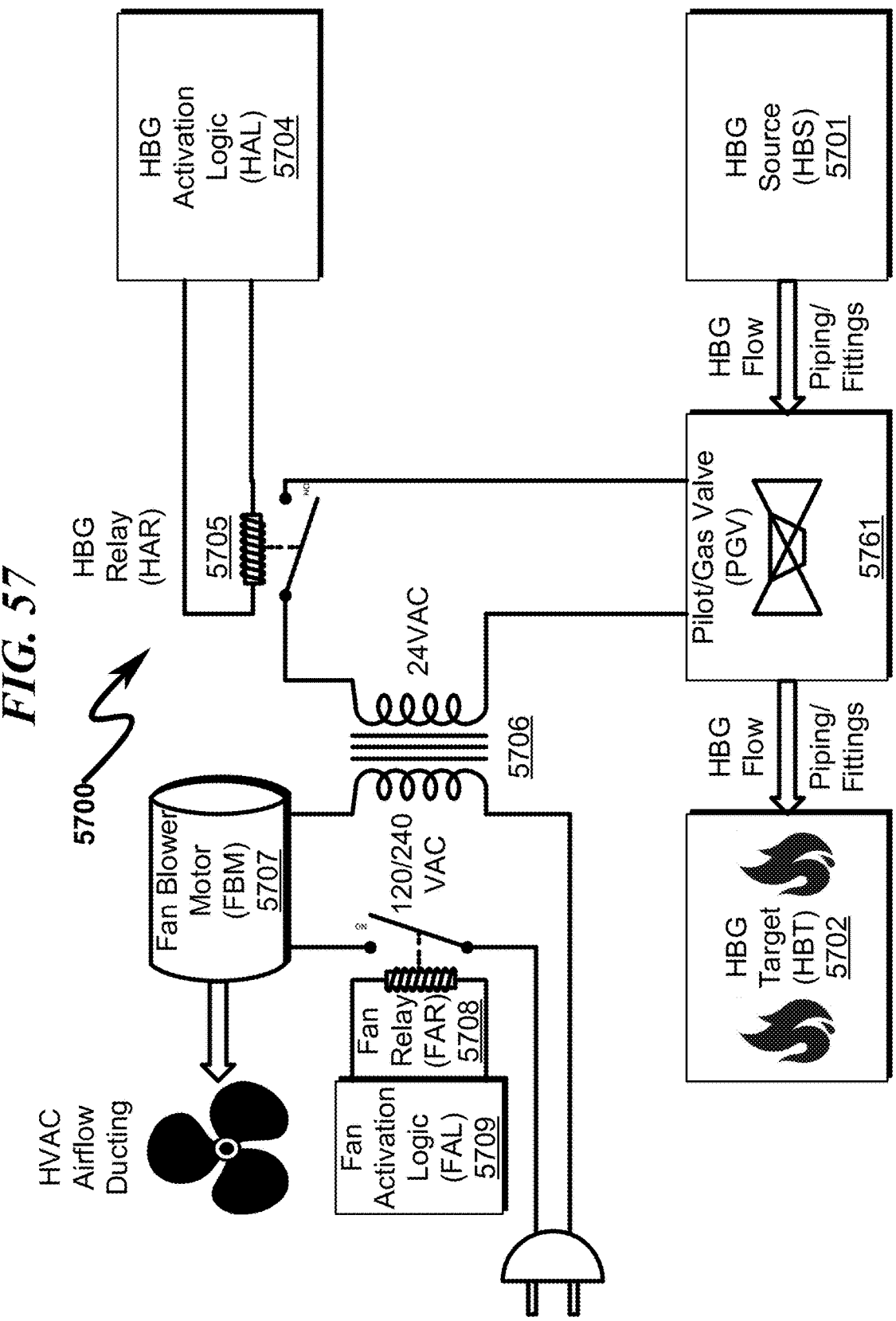
FIG. 57 illustrates a schematic of a prior art HVAC system showing major components and HBG flow.

A typical prior art application context in which the present invention may be employed is depicted in FIG. 57 (5700) wherein a HBG source (HBS) (5701) supplies a HBG target (HBT) (5702) within a typical HVAC application context is generally depicted. The HVAC system controls flow of HBG from the HBS (5701) to the HBT (5702) via the use of an electrically controlled pilot/gas valve (PGV) (5761). HBG activation logic (HAL) (5704) within the HVAC system controls a HBG relay (5705) that switches power from a power transformer (5706) (typically low voltage such as 24 VAC) to the PGV (5761), thus controlling the HBG supplied to the HBT (5702).

Safety factors within this system are as follows. Any failure of the transformer (5706) will prevent the PGV (5761) from activation. Furthermore, the primary of the transformer (5706) is connected in series with a fan blower motor (FBM) (5707) such that any failure of the FBM (5707) windings will deactivate the PGV (5761) such that without an active FBM (5707) no HBG will be supplied to the HBT (5702). This failsafe is to ensure that there is actually an active FBM in any situation where the HBG (5702) is supplied with HBG in order to prevent a hazardous fire condition. Activation of the FBM (5707) is accomplished using a fan activation relay (FAR) (5708) that is controlled by fan activation logic (FAL) (5709) under control of the HVAC system.

As indicated in this diagram, any leak or failure of plumbing in the HBS (5701), PGV (5761), and/or HBT (5702) will not be detected in this prior art configuration. There is no mechanism in this conventional HBG source/valve/target configuration for the detection of a leak in the pipe/fittings nor is there any mechanism to ensure that the PGV properly ignites the HBG within the HBT (5702) to ensure that HBG is not inadvertently spread throughout the HVAC system by the HVAC airflow ducting.

Since HBG can displace air and result in a number of health related injuries to humans, mitigation of HBG loss is a safety issue inherent in all HVAC systems as generally depicted in FIG. 57 (5700). The leakage of HBG may also present a safety issue in other non-HVAC systems such as boilers, water heaters, and the like.

PGV/FBM Shutdown System Summary (5800)

Figure 58:
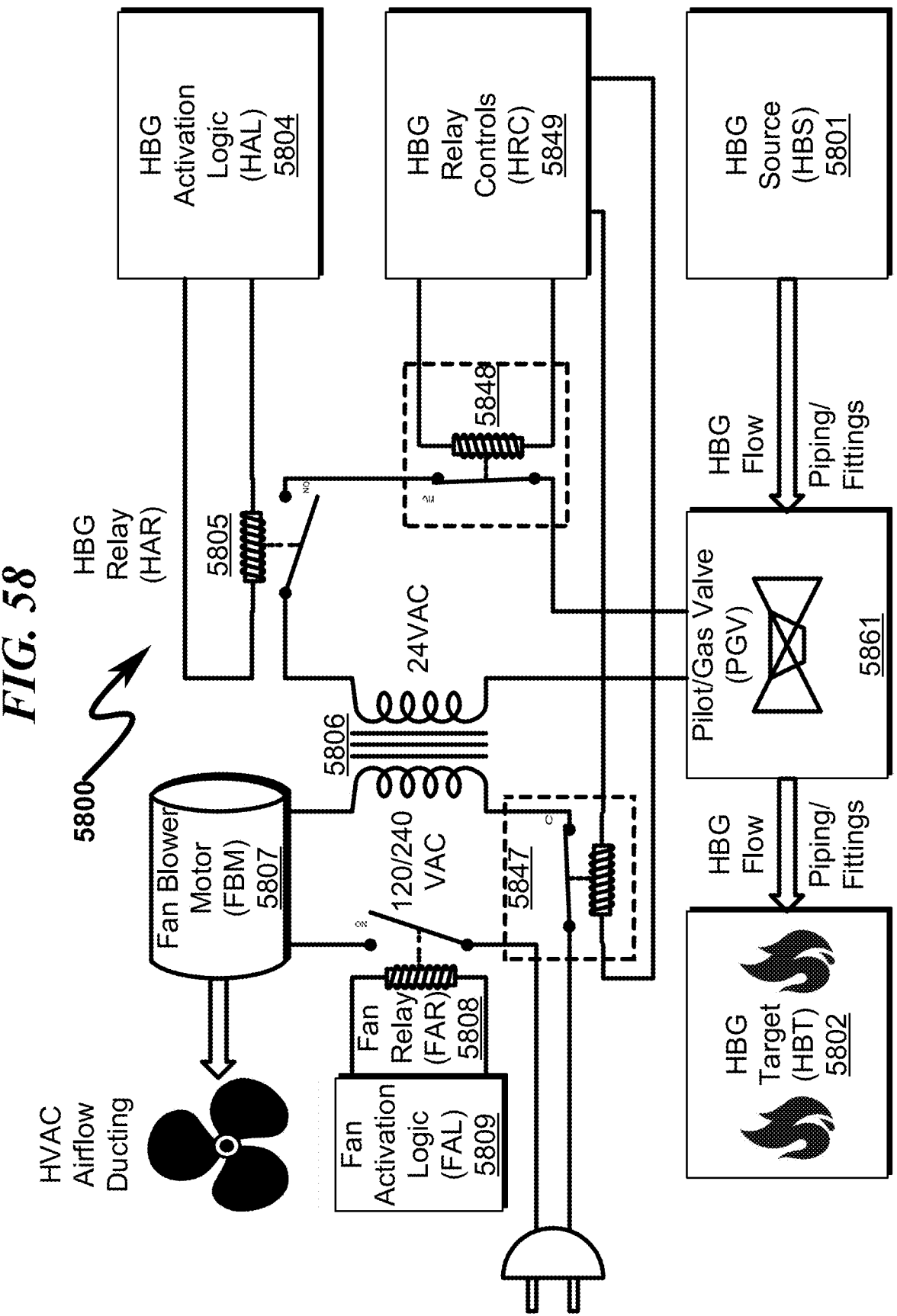
FIG. 58 illustrates a schematic depicting a preferred exemplary embodiment of a present invention hydrocarbon-based gas (HBG) leak containment (HLC)/leak mitigation (HLM) system.

An exemplary preferred invention system embodiment incorporating PGV/FBM shutdown operation applied to the prior art depicted in FIG. 57 (5700) is generally depicted in FIG. 58 (5800) wherein the prior art is augmented with HBG relay controls (HRC) (5849) (activated/deactivated by the DCP based on the detection of HBG leaks) that override operation of the PGV (5861) and the FBM (5807).

Here it can be seen that on detection of a HGL the HRC (5849) activates the PGV cutoff relay (5848) and the FBM cutoff relay (5847). Each of these relays is normally closed and when activated by the HRC (5849) serves to disable both the PGV (5861) and/or the FBM (5807).

As indicated in this diagram, any leak or failure of plumbing in the HBS (5801)/HBT (5802) will result in detection of the HBL by the DCP and triggering of the HRC (5849), thus terminating HBG flow to the HVAC system.

HLC Method Summary (5900)

Figure 59:
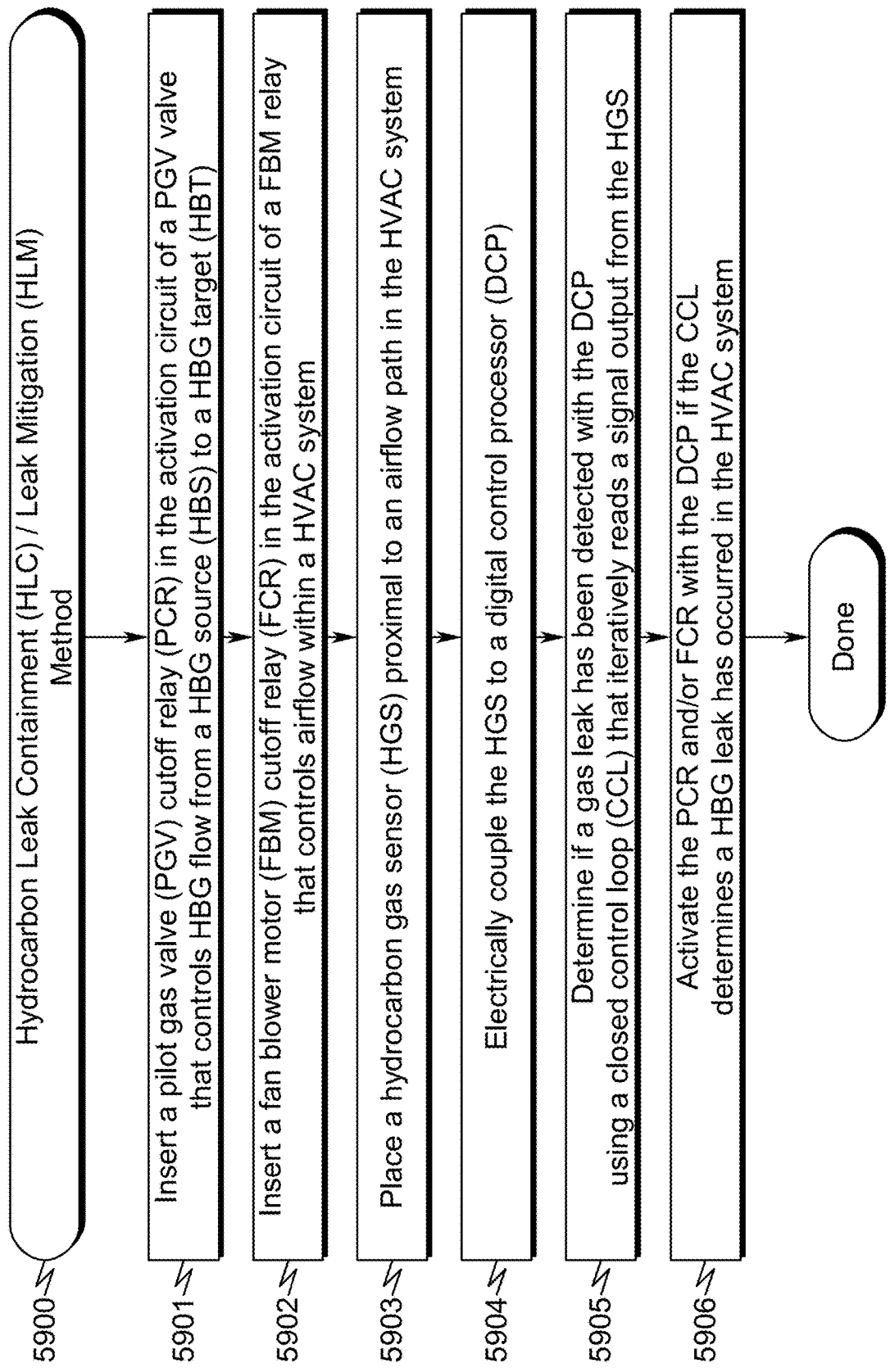
FIG. 59 illustrates a flowchart depicting a preferred exemplary embodiment of a present invention hydrocarbon-based gas (HBG) leak containment (HLC)/leak mitigation (HLM) method.

The system depicted in FIG. 58 (5800) may be associated with a retrofit or OEM HBG leak containment (HLC) method as generally depicted in the flowchart of FIG. 59 (5900) comprising the following steps:
(1) inserting a pilot gas valve (PGV) cutoff relay (PCR) in the activation circuit of a PGV valve that controls HBG flow from a HBG source (HBS) to a HBG target (HBT) (5901);
(2) inserting a fan blower motor (FBM) cutoff relay (FCR) in the activation circuit of a FBM relay that controls airflow within a HVAC system (5902);
(3) placing a hydrocarbon gas sensor (HGS) proximal to an airflow path in the HVAC system (5903);
(4) electrically coupling the HGS to a digital control processor (DCP) (5904);
(5) determining if a gas leak has been detected with the DCP using a closed control loop (CCL) that iteratively reads a signal output from the HGS (5905); and
(6) activating the PCR and/or FCR with the DCP if the CCL determines a HBG leak has occurred in the HVAC system (5906).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

PGV/FBM Failsafe System Summary (6000)

Figure 60:
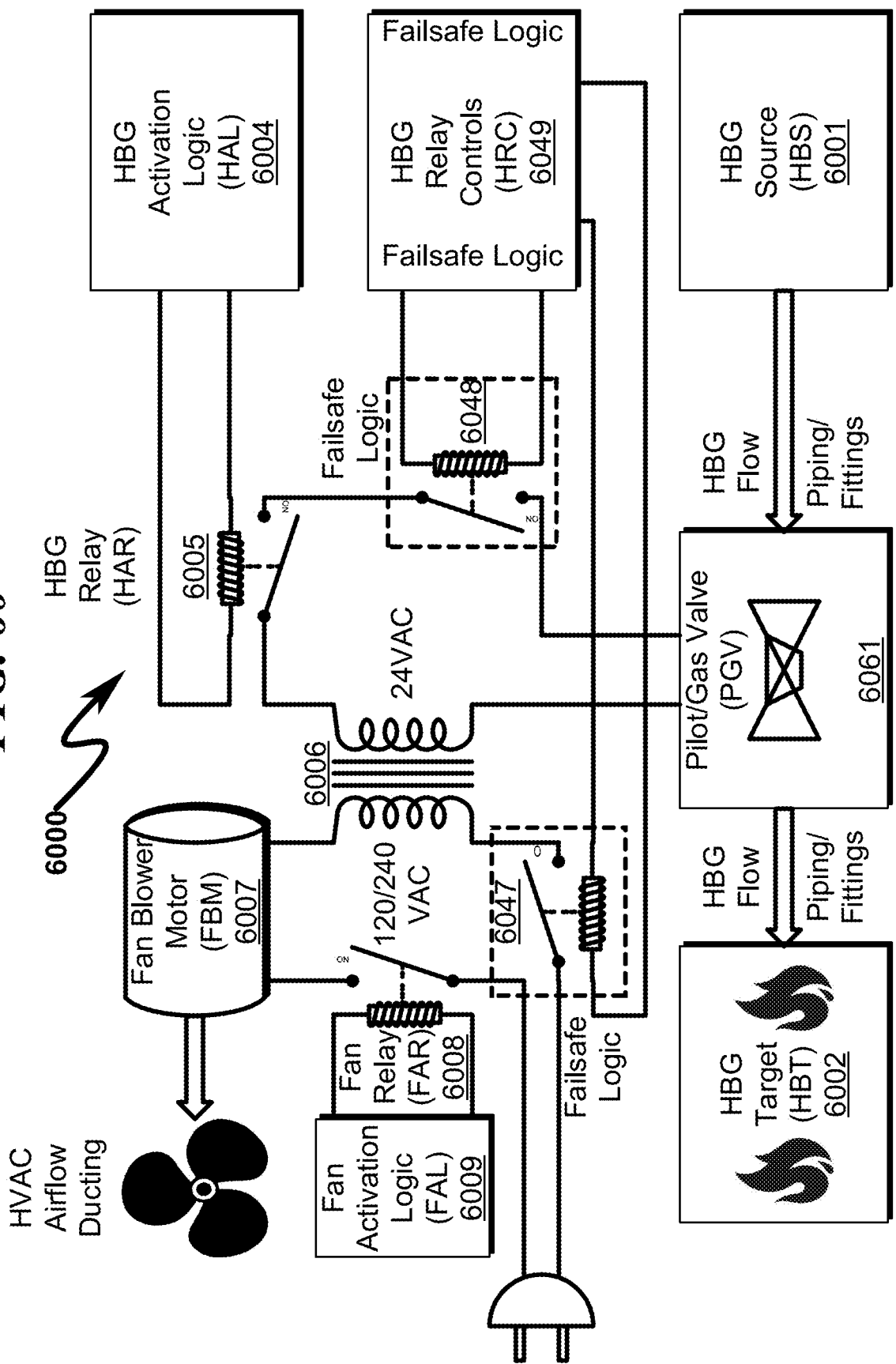
FIG. 60 illustrates a schematic depicting a preferred exemplary embodiment of a present invention hydrocarbon-based gas (HBG) leak containment (HLC)/leak mitigation (HLM) system incorporating failsafe operation.

An exemplary preferred invention system embodiment incorporating PGV/FBM failsafe operation applied to the prior art depicted in FIG. 57 (5700) is generally depicted in FIG. 60 (6000) wherein the prior art is augmented with HBG relay controls (HRC) (6049) (activated/deactivated by the DCP based on the detection of HBG leaks) that override operation of the PGV (6061) and the FBM (6007).

Here it can be seen that on detection of a HGL the HRC (6049) deactivates the PGV cutoff relay (6048) and the FBM cutoff relay (6047). Each of these relays is normally open and when activated by the HRC (6049) serves to enable both the PGV (6061) and the FBM (6007). Under normal circumstances, if the DCP does not detect a HBL, these cutoff relays (6047, 6048) will be activated by the DCP, allowing HBG to flow through the HVAC system. On any failure of the DCP or other HBL detection mechanism, the system will default to a failsafe mode in which HBG is cutoff from the system.

As indicated in this diagram, any leak or failure of plumbing in the HBS (6001)/HBT (6002) will result in detection of the HBL by the DCP and deactivation of the HRC (6049), thus terminating HBG transmission to the HVAC system.

PGV/FBM Failsafe Method Summary (6100)

Figure 61:
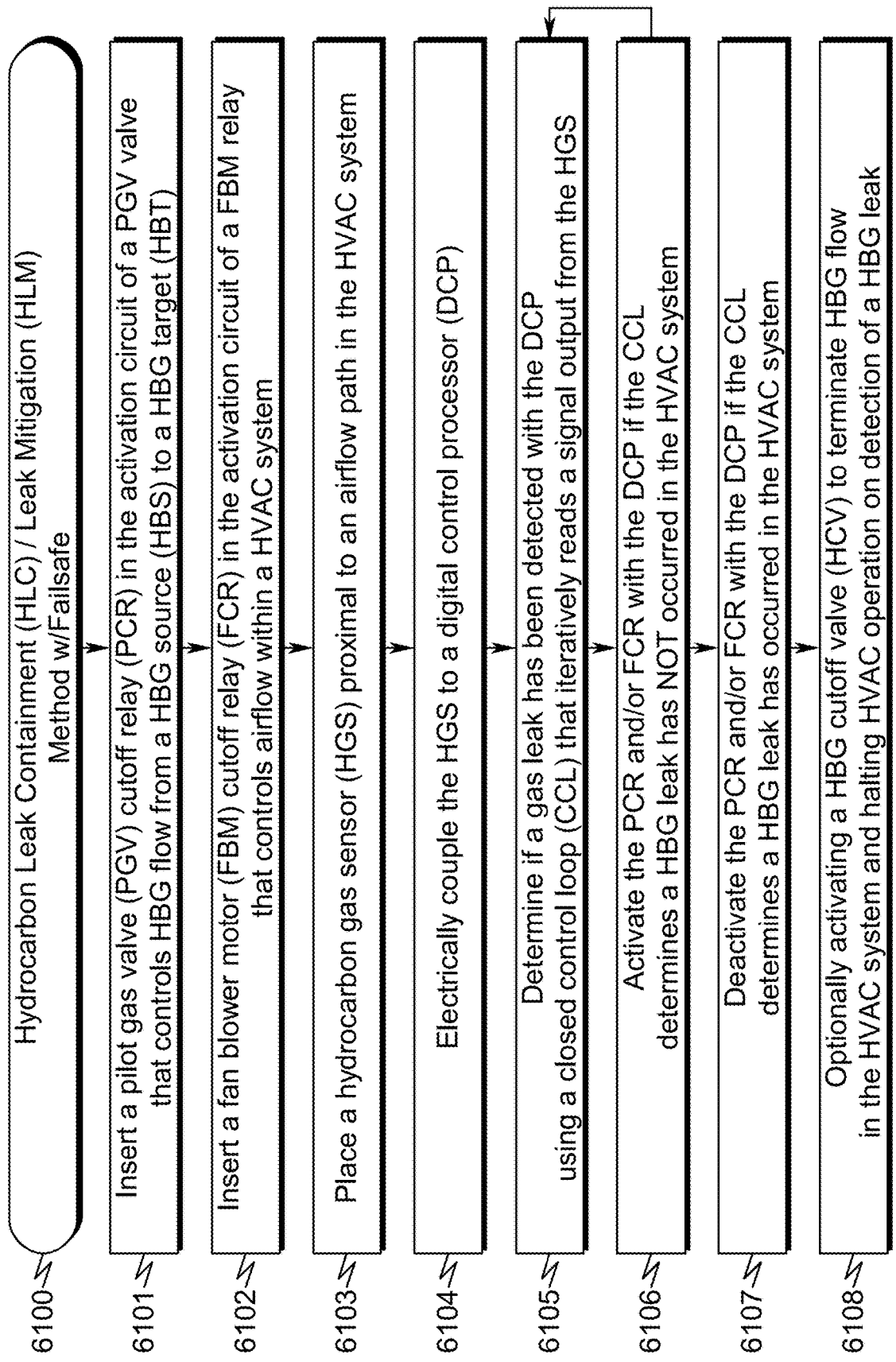
FIG. 61 illustrates a flowchart depicting a preferred exemplary embodiment of a present invention hydrocarbon-based gas (HBG) leak containment (HLC)/leak mitigation (HLM) method incorporating failsafe operation.

The system depicted in FIG. 60 (6000) may be associated with a retrofit or OEM HBG leak containment (HLC) method as generally depicted in the flowchart of FIG. 61 (6100) comprising the following steps:
(1) inserting a pilot gas valve (PGV) cutoff relay (PCR) in the activation circuit of a PGV valve that controls HBG flow from a HBG source (HBS) to a HBG target (HBT) (6101);
(2) inserting a fan blower motor (FBM) cutoff relay (FCR) in the activation circuit of a FBM relay that controls airflow within a HVAC system (6102);
(3) placing a hydrocarbon gas sensor (HGS) proximal to an airflow path in the HVAC system (6103);
(4) electrically coupling the HGS to a digital control processor (DCP) (6104);
(5) determining if a gas leak has been detected with the DCP using a closed control loop (CCL) that iteratively reads a signal output from the HGS (6105);
(6) activating the PCR and/or FCR with the DCP if the CCL determines a HBG leak has NOT occurred in the HVAC system and proceeding to step (5) (6106);

(7) deactivate the PCR and/or FCR with the DCP if the CCL determines a HBG leak has occurred in the HVAC system (6107); and (8) optionally activating a HBG cutoff valve (HCV) (6346) to terminate HBG flow in the HVAC system and halting HVAC operation on detection of a HBG leak (6108).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

PGV/FBM/HBS Failsafe System Summary (6200)

Figure 62:
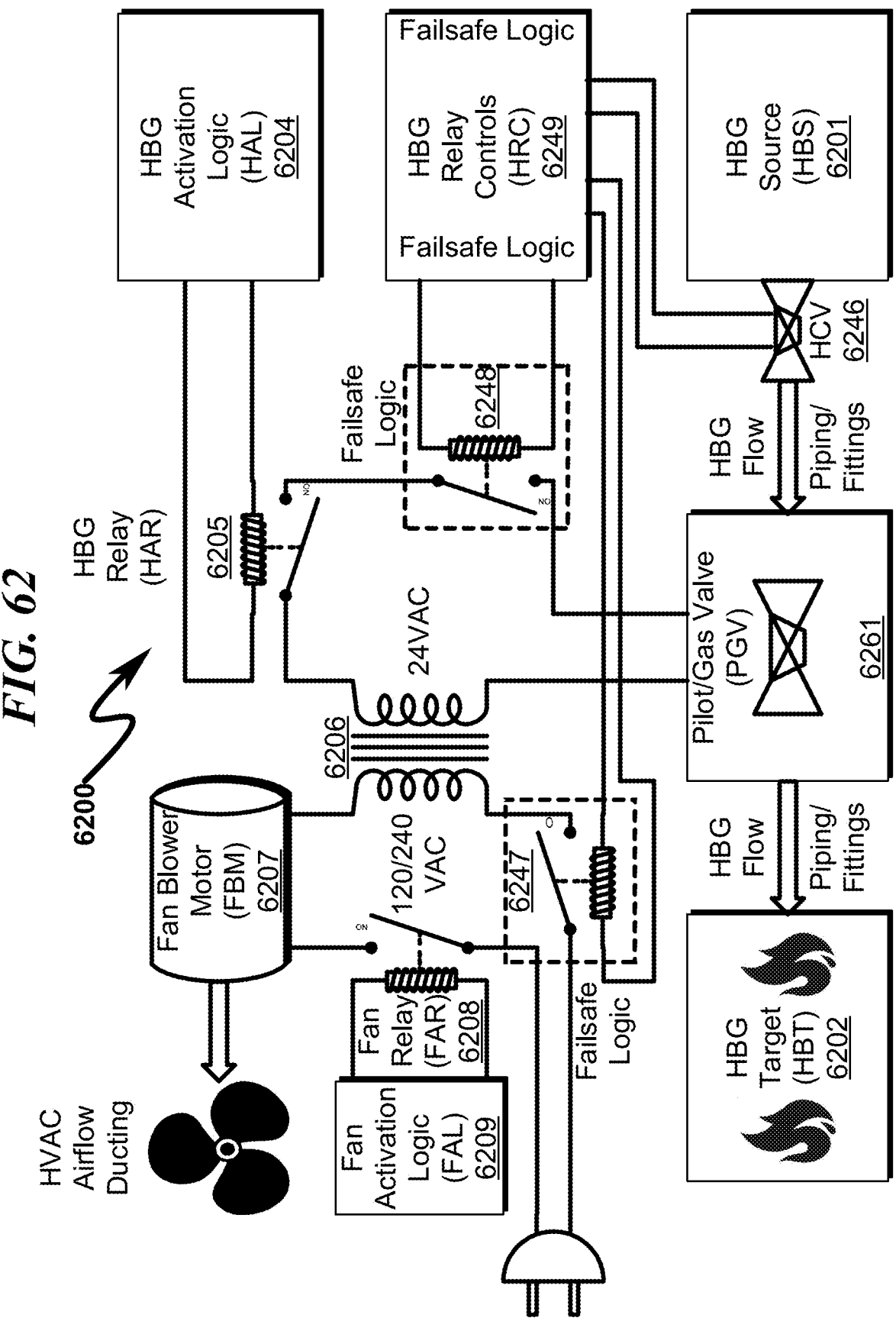
FIG. 62 illustrates a schematic depicting a preferred exemplary embodiment of a present invention hydrocarbon-based gas (HBG) leak containment (HLC)/leak mitigation (HLM) system incorporating HBS cutoff failsafe operation.

An exemplary preferred invention system embodiment incorporating PGV/FBM/HBS failsafe operation applied to the prior art depicted in FIG. 57 (5700) is generally depicted in FIG. 62 (6200) wherein the prior art is augmented with HBG relay controls (HRC) (6249) (activated/deactivated by the DCP based on the detection of HBG leaks) that override operation of the PGV (6261), the FBM (6207), and the HBS (6201). This embodiment is augmented with an additional failsafe HBG cutoff valve (6246) that is normally closed and must be activated by the HRC (6249) in order to allow HBG flow through the HVAC system.

Here it can be seen that on detection of a HGL the HRC (6249) activates the PGV cutoff relay (6248) and the FBM cutoff relay (6247). Each of these relays is normally open and when deactivated by the HRC (6249) serves to enable both the PGV (6261) and the FBM (6207). Under normal circumstances, if the DCP does not detect a HBL, these cutoff relays (6247, 6248) will be activated along with the HGB cutoff valve (HCV) (6246), allowing HBG to flow from the HBS (6201) through the PGV (6261) and to the HBT (6202) within the HVAC system. On any failure of the DCP or other HBL detection mechanism, the system will default to a failsafe mode in which HBG is cutoff from the system and HBG flow is terminated at the HCV (6246).

As indicated in this diagram, any leak or failure of plumbing in the HBS (6201)/HBT (6202) will result in detection of the HBL by the DCP and deactivation of the HRC (6249), thus terminating HBG transmission to the HVAC system.

Computer Controlled Shutoff System Summary (6300)

Figure 63:
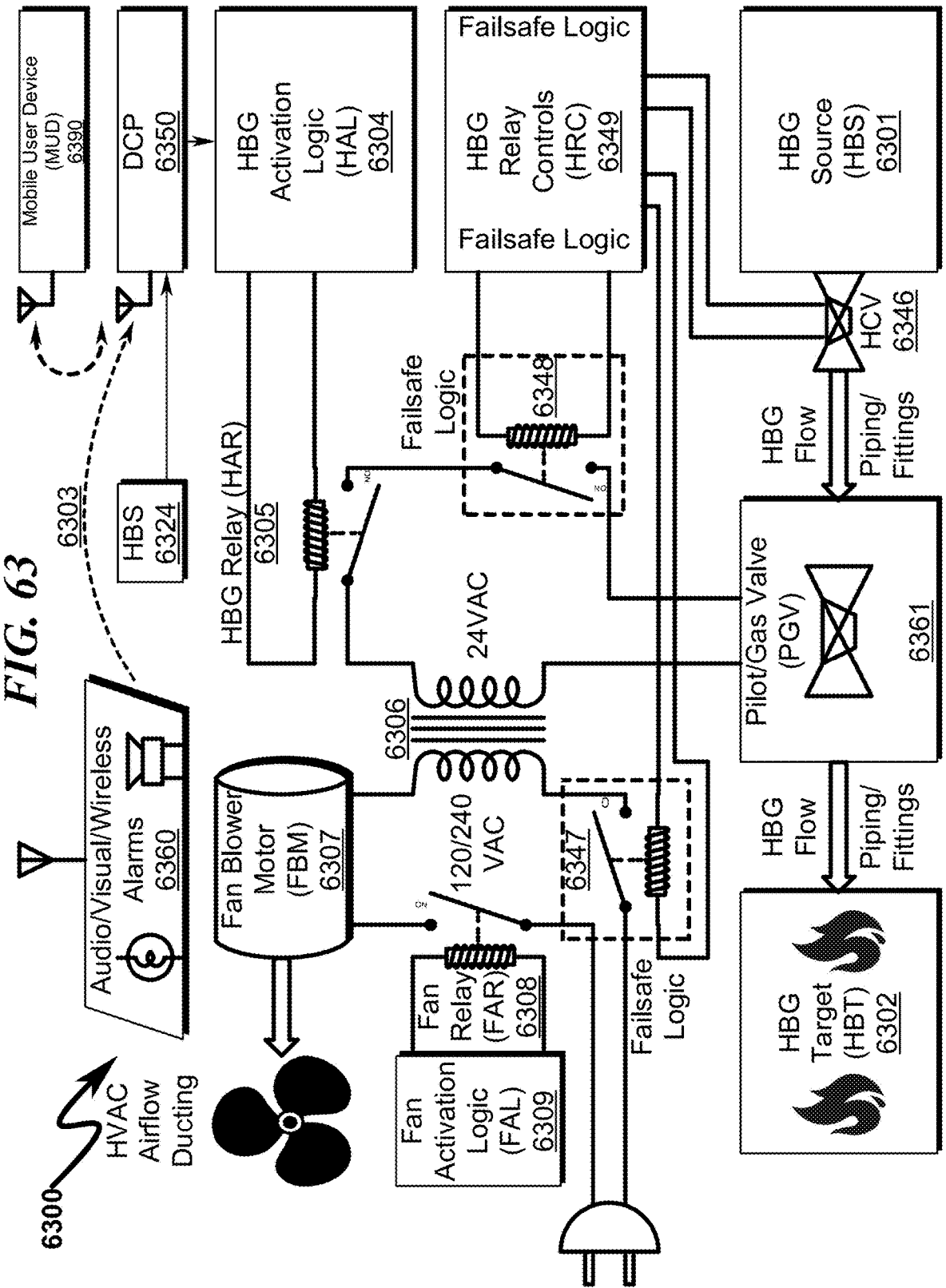
FIG. 63 illustrates a schematic depicting a preferred exemplary embodiment of a present invention hydrocarbon-based gas (HBG) leak containment (HLC)/leak mitigation (HLM) system incorporating HBS cutoff failsafe operation and wireless communication interface (WCI)

The systems and methods as described in FIG. 57 (5700)-FIG. 62 (6200) may be augmented with computerized controls as generally depicted in FIG. 63 (6300). In this exemplary preferred embodiment the digital control processor (DCP) (6350) in response to detected HBG leak by the HGS (6324) will configure the failsafe relay controls (6346, 6347, 6348) to disable HBG flow from the HBS (6301) to the HBT (6302). The DCP (6350) may incorporate an integrated analog-to-digital converter (ADC) to interface with the HGS (6324) in sensing HBG leaks within the HVAC system and may incorporate machine instructions embedded within a computer readable medium to control sequential or simultaneous operation of the failsafe relay controls (6346, 6347, 6348). In addition to activation of the failsafe relay controls (6346, 6347, 6348) the DCP (6350) may activate a number of audio/visual/wireless alarms (6360) to indicate the presence of a HBG leak within the HVAC system. The audio/visual/wireless alarms (6360) may incorporate a wireless communication link (6303) that communicates with various HVAC system components to force a shutdown of the HVAC system if a HBG leak is detected within the HVAC system.

In any of the scenarios discussed above, a mobile user device (MUD) (6390) may provide for a wireless interface and communication/control of the alarms (66360) and/or the failsafe relay controls (6346, 6347, 6348). In this manner the system may be temporarily or permanently installed within a HVAC system and monitored/controlled wirelessly via the MUD (6390).

Exemplary WCI/MUD User Interface (6400)

As discussed previously, the DCP may interface with a WCI to a MUD to allow DCP status information and/or control of the DCP and HVAC components to occur remotely.

While only an exemplary implementation, the display illustrated in FIG. 64 (6400) implements several monitoring and control functions including:

ALARM OFF (6411)—disables audible alarms;
ALARM ON (6421)—enables audible alarms;
FAN OFF (6431)—disables air intake fan (AIF) operation;
FAN ON (6441)—enables air intake fan (AIF) operation;
SEN-N (6412)—sensor drift band in NORMAL mode;
SEN-W (6422)—sensor drift band in WIDE mode;
WM-2M (6432)—sensor warmup 2 minutes;
WM-5M (6442)—sensor warmup 5 minutes;
STEP-10s (6413)—STEP COUNT is completion in 10 seconds while in GAS DETECTION STATE;
STEP-20s (6413)—STEP COUNT is completion in 20 seconds while in GAS DETECTION STATE;
STEP-1M (6413)—STEP COUNT is completion in 1 minute while in GAS DETECTION STATE;
T&H (6413)—interrogate temperature & humidity sensor;
T&H (6413)—interrogate temperature & humidity sensor;
ENT-LOC (6414)—allows entry of the location of the HVAC equipment stored in the DCP such as room number, office number, and room identification such as conference room, training room, etc.;
ENT-MAN (6424)—allows entry or display of the HVAC equipment manufacturer name stored in the DCP;
ENT-MOD (6434)—allows entry or display of the equipment manufacturer HVAC model number stored in the DCP;
ENT-CID (6444)—allows entry or display of the equipment manufacturer HVAC coil model number identification stored in the DCP (this helps the owner of the equipment to identify the coil number so he can contact his HVAC contractor and direct him to order the failing coil and avoid delays in obtaining replacement parts for the failing HVAC system);
HCC-OFF (6415)—disables the HVAC compressor via the HCC contactor;
HCC-ON (6425)—enables the HVAC compressor via the HCC contactor;
HCV-OFF (6435)—disables the HBG control valve (HCV) to isolate the HBS in the HVAC system;
HCV-ON (6445)—enables the HBG control valve (HCV) to allow HBG flow within the HVAC system;
ENT-ID (6416)—allows entry or display of a unique name for the DCP for identification purposes;

OPTION (6426)—displays DCP control settings;
DSP-CNT (6436)—display the current CCL STEP COUNTER;
HCV-AL (6446)—toggles ALARM STATE shutdown of the HBG control valve (HCV) in the event of a detected HBG leak;
CLR-LOG (6417)—clear HBG leak log and return system operation to WARMUP STATE;
RST (6427)—return system operation to WARMUP STATE;
RD-LOG (6437)—display HBG leak log;
MODE (6447)—displays current CCL STATE of operation (WARMUP, GAS DETECTION, CALIBRATION MODE ON/OFF, ALARM MODE ON/OFF, FAN ON/OFF);

One skilled in the art will recognize that the interrogation and control functions generally depicted in FIG. 64 (6400) are only exemplary and not limitive of the scope of the claimed invention.

Sensor Record Memory (SRM) Data Logging

The present invention anticipates that in many configurations it will make use of sensor record memory (SRM) to log detection of HBG leaks (or the absence thereof) in conjunction with the use of a real-time clock (RTC) to note the time of sensor logging. This information can be used to determine if a HVAC system is leaking HBG when stressed or at certain times of the day, indicating an intermittent failure that must be addressed. This logging feature may be interrogated wirelessly with the MUD as discussed above or in some circumstances the SRM data may be transmitted over another network such as the INTERNET or similar WiFI network to a central host computer. In this manner a deployment of a plurality of the HLD and/or HLM units within a commercial HVAC installation will be able to comply with the leak detection monitoring and logging requirements of the EPA as mandated by recent federal regulations on air quality.

Exemplary Use of MUD WCI

While there are many application contexts in which the HLD/HLM may be operated using a WCI connected MUD, one anticipated preferred scenario occurs when a HBG leak is to be isolated in a HVAC system incorporating multiple refrigerant coils in a commercial environment such as a hotel or other large building. In this scenario, the isolation of a HBG leak is important because failure of one HVAC system can cause a multiple number of rooms to be offline and unavailable for use due to the failure of a single fitting in the HVAC HBG loop.

One possible HBG leak scenario might include the following steps using the HLD via a WCI connected MUD:

(1) Connect to HLD WCI application through a computer tablet or other smartphone device.
(2) Turn on HLD and wait for warm-up mode. LEDs will flash fast. HGS sensor is calibrating at this time.
(3) Hit "terminal" icon click on "devices."
(4) Click on scan and inspect the HLD listed for the unit to interrogate.
(5) Select HLM and number for inspection on the MUD interface.
(6) Check "mode of operation." After warming mode the HLD will go into monitor mode, LEDs will flash slow in monitor mode (warmup mode can be selected as two minutes, five minutes, or one hour).
(7) Click on option button to display options, different options can be selected.
(8) Click on read log and verify log is empty if not, click on "clear log." Log must be clear, so that all previous data does not confuse the technician as to the possibility of a HBG leak.
(9) Activate the HLD in areas that are free of refrigerant so that the sensor does not calibrate to the refrigerant. Do not Power on the HLD on the floor, as refrigerant is heavier than air and will collect in this area. Hallways, lobbies, and stairways are a good place to turn on and apply power to the HLD.
(10) After HLD has calibrated and is in monitor mode take the HLD(s) and place them on the supply grills next to the air handler to check for HBG leaks.
(11) LED should flash slowly indicating that the HLD is in monitor mode.
(12) If refrigerant is detected HLD will beep every time it makes a step for increased refrigerant detection, LED will be on solid at this point every time a step is completed, and after 21 steps it will go into an alarm mode.
(13) When HLD hits the maximum step count it is permissible to turn off the alarm by hitting the button on the MUD labeled alarm off, or it is possible to cycle the power, or hit the HLD reset button, as this will cause the HLD to go back through calibration. Do not cycle power and turn the HLD back on and let it go through calibration on a leaking coil, as the HGS sensor will calibrate to the leak and the leak will not be detected at that stage, and the HLD will only detect the leak if it increases in discharge.
(14) The HLD has a fan function that performs two functions: it pulls refrigerant in the ambient air across the sensor and/or the HLD can be removed from an area that has HBG leakage in the ambient air, and the fan used to help push fresh air across the sensor. This will give the HLD a faster response time so the HLD can be used in a different area to detect leaks.
(15) Once the HLDs are set on indoor supply grills after five minutes if they stay in monitor mode they can be moved to the next available air handlers to be checked. This saves a tremendous amount of time and money for the technician.
(16) This process is continued until all suspect air handlers are checked for HBG leaks. This process takes approximately one hour to check 20 air handlers with five (5) HLDs. In the past it would take days or even months to find a HBG leak using conventional methods. As an example of economic loss associated with the prior art methods, 20 indoor air handlers being down for eight weeks at $150 a night per hotel room would result in an economic loss of USD$168,000.
(17) Once the HLD leak evaluation is complete the HLD logs are cleared so that the HLDs are ready for the next leak detection job.
(18) There are other functions that can be applied in these situations, including but not limited to use for EPA evaluation or audits, selection of manufacturer, model, serial number, or coil number.

One skilled in the art will recognize that this example troubleshooting scenario is just one possibility when using the HLD with a WCI connected MUD.

HLD System Summary

The present invention system may be broadly generalized as a HBG leak detection (HLD) system comprising:
- (a) hydrocarbon gas sensor (HGS);
- (b) sensor signal conditioner (SSC);
- (c) digital control processor (DCP); and
- (d) alarm status indicator (ASI);

wherein:
- the HGS detects ambient hydrocarbon gas (AHG);
- the HGS indicates the AHG detection as a hydrocarbon sensor voltage (HSV);
- the HSV is electrically coupled to the SSC;
- the SSC is electrically coupled to the DCP;
- the SSC and the DCP form a closed control loop (CCL);
- the CCL operates such that the DCP dynamically adjusts electrical characteristics of the SSC based on the value of the HSV;
- the CCL comprises a WARMUP STATE in which the HGS is heated until it stabilizes to a nominal fresh air resistance (FAR) value;
- the CCL comprises a MONITOR STATE in which the SSC is adjusted such that the HSV is maintained within a lower threshold voltage (LTV) and an upper threshold voltage (UTV);
- the CCL comprises a GAS DETECTION STATE in which a STEP COUNTER (SCT) is iteratively decremented if the HSV falls below the LTV and iteratively incremented if the HSV exceeds the UTV;
- the GAS DETECTION STATE is iteratively executed with a variable sample time between readings of the HSV from the HGS;
- the CCL comprises an ALARM STATE that triggers a HBG leak alarm (HLA) if the SCT exceeds a selected threshold detection count (TDC); and
- the DCP is configured to log alarms to the ASI if the HLA is triggered by the ALARM STATE.

This general system summary may be augmented by the various elements described herein to produce a wide variety of invention embodiments consistent with this overall design description.

HLM System Summary

The present invention system may be broadly generalized as a HBG leak mitigation (HLM) system comprising:
- (a) hydrocarbon gas sensor (HGS);
- (b) sensor signal conditioner (SSC);
- (c) digital control processor (DCP);
- (d) alarm status indicator (ASI); and
- (e) HBG relay controls (HRC);

wherein:
- the HGS detects ambient hydrocarbon gas (AHG);
- the HGS indicates the AHG detection as a hydrocarbon sensor voltage (HSV);
- the HSV is electrically coupled to the SSC;
- the SSC is electrically coupled to the DCP;
- the SSC and the DCP form a closed control loop (CCL);
- the CCL operates such that the DCP dynamically adjusts electrical characteristics of the SSC based on the value of the HSV;
- the CCL comprises a WARMUP STATE in which the HGS is heated until it stabilizes to a nominal fresh air resistance (FAR) value;
- the CCL comprises a MONITOR STATE in which the SSC is adjusted such that the HSV is maintained within a lower threshold voltage (LTV) and an upper threshold voltage (UTV);
- the CCL comprises a GAS DETECTION STATE in which a STEP COUNTER (SCT) is decremented if the HSV falls below the LTV and incremented if the HSV exceeds the UTV;
- the GAS DETECTION STATE is iteratively executed with a variable sample time between readings of the HSV from the HGS;
- the CCL comprises an ALARM STATE that triggers a hydrocarbon-based gas (HBG) leak alarm (HLA) if the SCT exceeds a selected threshold detection count (TDC);
- the DCP is configured to log alarms to the ASI if the HLA is triggered by the ALARM STATE;
- the HBC is electrically coupled to the DCP; and
- the DCP is configured to individually activate and/or deactivate the state of the HBC when the HLA is triggered by the ALARM STATE.

This general system summary may be augmented by the various elements described herein to produce a wide variety of invention embodiments consistent with this overall design description.

HLC System Summary

The present invention system in some embodiments may be broadly generalized as a HBG leak containment (HLC) system comprising:
- (a) refrigerant source valve (HSV);
- (b) refrigerant return valve (RRV);
- (c) hydrocarbon gas sensor (HGS); and
- (d) valve electrical solenoid (VES);

wherein:
- the HSV is mechanically coupled between and controls refrigerant flow from a refrigerant source output (RSO) on a condenser heat exchanger (CEX) within an outside heat exchanger (OHE) and an evaporator expansion valve (EEV) within an inside heat exchanger (IHE);
- the RRV is mechanically coupled between and controls refrigerant flow from a refrigerant return output (RRO) on an evaporator heat exchanger (EEX) within the IHE and a refrigerant return input (RRI) on a condenser refrigerant compressor (CRC) within the OHE;
- the HGS is positioned proximal to the EEX;
- the HGS is electrically coupled to the VES;
- the VES is activated upon detection of the presence of refrigerant by the HGS; and
- the VES is mechanically coupled to the RRV and the HSV such that activation of the VES closes the RRV and the HSV.

This general system summary may be augmented by the various elements described herein to produce a wide variety of invention embodiments consistent with this overall design description.

HLD Method Summary

A present invention HBG leak detection (HLD) method may be broadly generalized as a method comprising:
- (1) with a digital control processor (DCP) and a sensor signal conditioner (SSC), calibrating a hydrocarbon gas sensor (HGS) (0902);
- (2) with the DCP and the SSC, initializing a Vref sensor threshold voltage (STV) for the HGS (0903);

(3) with the DCP, initializing a LEVEL COUNTER to 0 (0904);
(4) with the DCP and the SSC, monitoring a hydrocarbon sensor voltage (HSV) from the HGS (0905);
(5) with the DCP and the SSC, determining if the HGS HSV is less than the Vref STV, and if so, proceeding to step (1) (0906);
(6) with the DCP and the SSC, determining if the HGS HSV is greater than the Vref STV, and if not, proceeding to step (1) (0907);
(7) with the DCP and the SSC, increasing the Vref STV (1008);
(8) with the DCP, increasing the LEVEL COUNTER (1009);
(9) with the DCP, determining if the LEVEL COUNTER is greater than an ALARM TRIP value, and if so, proceeding to step (14) (1010);
(10) with the DCP and the SSC, determining if the HGS HSV is less than the Vref STV, and if not, proceeding to step (7) (1011);
(11) with the DCP and the SSC, reducing the Vref STV (1012);
(12) with the DCP, decrementing the LEVEL COUNTER (1013);
(13) with the DCP, determining if the LEVEL COUNTER is 0, and if not, proceeding to step (11), otherwise proceeding to step (1) (1014);
(14) with the DCP, activating audible/visual alarms and proceeding to step (14) (1016).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

HLM Method Summary

A present invention HBG leak mitigation (HLM) method may be broadly generalized as a method comprising:
(1) with a digital control processor (DCP), enabling refrigerant flow and compressor operation in a HVAC system (0901);
(2) with the DCP and a sensor signal conditioner (SSC), calibrating a hydrocarbon gas sensor (HGS) (0902);
(3) with the DCP and the SSC, initializing a Vref sensor threshold voltage (STV) for the HGS (0903);
(4) with the DCP, initializing a LEVEL COUNTER to 0 (0904);
(5) with the DCP and the SSC, monitoring a hydrocarbon sensor voltage (HSV) from the HGS (0905);
(6) with the DCP and the SSC, determining if the HGS HSV is less than the Vref STV, and if so, proceeding to step (2) (0906);
(7) with the DCP and the SSC, determining if the HGS HSV is greater than the Vref STV, and if not, proceeding to step (2) (0907);
(8) with the DCP and the SSC, increasing the Vref STV (1008);
(9) with the DCP, increasing the LEVEL COUNTER (1009);
(10) with the DCP, determining if the LEVEL COUNTER is greater than an ALARM TRIP value, and if so, proceeding to step (15) (1010);
(11) with the DCP and the SSC, determining if the HGS HSV is less than the Vref STV, and if not, proceeding to step (8) (1011);
(12) with the DCP and the SSC, reducing the Vref STV (1012);
(13) with the DCP, decrementing the LEVEL COUNTER (1013);
(14) with the DCP, determining if the LEVEL COUNTER is 0, and if not, proceeding to step (11), otherwise proceeding to step (1) (1014);
(15) with the DCP, disabling refrigerant flow and/or compressor operation in the HVAC system (1015);
(16) with the DCP, activating audible/visual alarms and proceeding to step (15) (1016).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

HLC Method Summary

The present invention method in some embodiments may be broadly generalized as a HBG leak containment (HLC) method comprising:
(1) inserting and mechanically coupling a refrigerant source valve (HSV) between a refrigerant source output (RSO) on a condenser heat exchanger (CEX) within an outside heat exchanger (OHE) and an evaporator expansion valve (EEV) within an inside heat exchanger (IHE);
(2) inserting and mechanically coupling a refrigerant return valve (RRV) between a refrigerant return output (RRO) on an evaporator heat exchanger (EEX) within the IHE and a refrigerant return input (RRI) on a condenser refrigerant compressor (CRC) within the OHE;
(3) placing a hydrocarbon gas sensor (HGS) proximal to the EEX;
(4) electrically coupling the HGS to a valve electrical solenoid (VES);
(5) mechanically coupling the VES to the RRV and the HSV such that activation of the VES closes the RRV and the HSV; and
(6) activating the VES upon detection of the presence of refrigerant by the HGS.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system, method, and product-by-process may be augmented with a variety of ancillary embodiments, including but not limited to:

An embodiment wherein the SSC comprises a sensor digital potentiometer (SDP), a sensor digital rheostat (SDR), and a sensor analog amplifier (SAA).

An embodiment wherein the DCP comprises an internal analog comparator (IAC) having a negative input electrically coupled to a wiper of the SDP and a positive input electrically coupled to an output of the SAA.

An embodiment wherein the ASI comprises a light emitting diode (LED) that is activated with a duty cycle or frequency based on an operational state of the CCL.

An embodiment wherein the ASI comprises an audible alarm that is activated with a duty cycle or audible frequency based on an operational state of the CCL.

An embodiment wherein the ASI comprises an alarm indicator selected from a group consisting of: visual alarm indicator; digital SCT display; and audible alarm indicator.

An embodiment further comprising an air intake fan (AIF) positioned to force ambient air toward the HGS.

An embodiment wherein the DCP controls an air intake fan (AIF) that is positioned to force ambient air toward the HGS.

An embodiment wherein the CCL incorporates time delays to account for dynamic response characteristics in the HGS.

An embodiment further comprising a temperature/humidity sensor (THS) electrically coupled to the DCP.

An embodiment further comprising a temperature sensor (THS) electrically coupled to the DCP, the THS configured to measure a HVAC refrigerant liquid line temperature, HVAC refrigerant suction line temperature, HVAC return air temperature, and/or or HVAC outdoor compressor discharge temperature.

An embodiment wherein the DCP is configured to activate the ASI if the HVAC refrigerant liquid line temperature, HVAC refrigerant suction line temperature, HVAC return air temperature, and/or or HVAC outdoor compressor discharge temperature increases beyond a predetermined limit.

An embodiment wherein the DCP further comprises a sensor record memory (SRM) that logs the time and SCT associated with the HLA.

An embodiment wherein the DCP is configured to transmit an indication of the HLA via a wireless communication interface (WCI) to a mobile user device (MUD).

An embodiment wherein the DCP is configured to deactivate an electrical component within the HVAC system when the HLA is triggered by the ALARM STATE, the electrical component selected from a group consisting of: a contactor; a solenoid; a fan blower motor (FBM); a pilot gas valve (PGV); a HBG control valve (HCV); and an air exhaust fan (AEF).

An embodiment wherein the DCP is configured to activate an electrical component within the HVAC system when the HLA is triggered by the ALARM STATE, the electrical component selected from a group consisting of: a contactor; a solenoid; a fan blower motor (FBM); a pilot gas valve (PGV); a HBG control valve (HCV); and an air exhaust fan (AEF).

An embodiment wherein the DCP is configured to change the state of an electrical component within the HVAC system when the HLA is triggered by the ALARM STATE, the electrical component selected from a group consisting of: a contactor; a solenoid; a fan blower motor (FBM); a pilot gas valve (PGV); a HBG control valve (HCV); and an air exhaust fan (AEF).

An embodiment wherein the DCP is configured to change the state of an electrical component within the HVAC system when a command is received from a mobile user device (MUD) via a wireless communication interface (WCI), the electrical component selected from a group consisting of: a contactor; a solenoid; a fan blower motor (FBM); a pilot gas valve (PGV); a HBG control valve (HCV); and an air exhaust fan (AEF).

An embodiment wherein the activation of the VES simultaneously illuminates a visual light source indicator.

An embodiment wherein the activation of the VES simultaneously displays a mechanical fault indicator.

An embodiment wherein the activation of the VES simultaneously activates an audible alarm.

An embodiment wherein the activation of the VES simultaneously transmits a wireless communication indicating a HBG leak fault.

One skilled in the art will recognize that other embodiments are possible based on combinations of elements taught within the above invention description.

CONCLUSION

A failsafe hydrocarbon-based gas (HBG) leak detection (HLD) and mitigation (HLM) system/method for use in heating, ventilation, and air conditioning (HVAC) systems that incorporates a hydrocarbon gas sensor (HGS), sensor signal conditioner (SSC), alarm status indicator (ASI), and digital control processor (DCP) has been disclosed. The HGS detects ambient hydrocarbon gas (AHG) and presents a hydrocarbon sensor voltage (HSV) to the SSC. The DCP and SSC form a closed control loop (CCL) in which the SSC electrical characteristics are adjusted by the DCP such that the HSV is continuously and dynamically recalibrated to account for background HBG levels, changes in ambient air conditions, HGS manufacturing tolerances, and other field-specific operational conditions that impact the HGS detection capabilities. The DCP is configured to log alarms to the ASI if a HGS HBG leak is detected and optionally shutdown gas flow to one or more HBG target (HBT) system components.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. § 112(f) and such claim shall be construed to cover the corresponding structure, material, or acts described in the specification and equivalents thereof.

The phrase "MEANS FOR" specifically invokes the means-plus-function claims limitation recited in 35 U.S.C.

§ 112(f) and such claim shall be construed to cover the corresponding structure, material, or acts described in the specification and equivalents thereof.

The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. A hydrocarbon gas (HCG) leak detection (HLD) system comprising:
   (a) hydrocarbon gas sensor (HGS);
   (b) sensor signal conditioner (SSC);
   (c) digital control processor (DCP); and
   (d) alarm status indicator (ASI);
   wherein:
   said HGS detects ambient hydrocarbon gas (AHG);
   said HGS indicates said AHG detection as a hydrocarbon sensor voltage (HSV);
   said HSV is electrically coupled to said SSC;
   said SSC is electrically coupled to said DCP;
   said SSC and said DCP form a closed control loop (CCL);
   said CCL operates such that said DCP dynamically adjusts electrical characteristics of said SSC based on the value of said HSV;
   said CCL comprises a WARMUP STATE in which said HGS is heated until it stabilizes to a nominal fresh air resistance (FAR) value;
   said CCL comprises a MONITOR STATE in which said SSC is adjusted such that said HSV is maintained within a lower threshold voltage (LTV) and an upper threshold voltage (UTV);
   said CCL comprises a GAS DETECTION STATE in which a STEP COUNTER (SCT) is iteratively decremented if said HSV falls below said LTV and iteratively incremented if said HSV exceeds said UTV;
   said GAS DETECTION STATE is iteratively executed with a variable sample time between readings of said HSV from said HGS;
   said CCL comprises an ALARM STATE that triggers a HCG leak alarm (HLA) if said SCT exceeds a selected threshold detection count (TDC); and
   said DCP is configured to log alarms to said ASI if said HLA is triggered by said ALARM STATE.

2. The hydrocarbon gas (HCG) leak detection (HLD) system of claim 1 wherein said SSC comprises a sensor digital potentiometer (SDP), a sensor digital rheostat (SDR), and a sensor analog amplifier (SAA).

3. The hydrocarbon gas (HCG) leak detection (HLD) system of claim 2 wherein said DCP comprises an internal analog comparator (IAC) having a negative input electrically coupled to a wiper of said SDP and a positive input electrically coupled to an output of said SAA.

4. The hydrocarbon gas (HCG) leak detection (HLD) system of claim 1 wherein said ASI comprises a light emitting diode (LED) that is activated with a duty cycle or frequency based on an operational state of said CCL.

5. The hydrocarbon gas (HCG) leak detection (HLD) system of claim 1 wherein said ASI comprises an audible alarm that is activated with a duty cycle or audible frequency based on an operational state of said CCL.

6. The hydrocarbon gas (HCG) leak detection (HLD) system of claim 1 wherein said ASI comprises an alarm indicator selected from a group consisting of: visual alarm indicator; digital SCT display; and audible alarm indicator.

7. The hydrocarbon gas (HCG) leak detection (HLD) system of claim 1 further comprising an air intake fan (AIF) positioned to force ambient air toward said HGS.

8. The hydrocarbon gas (HCG) leak detection (HLD) system of claim 1 wherein said DCP controls an air intake fan (AIF) that is positioned to force ambient air toward said HGS.

9. The hydrocarbon gas (HCG) leak detection (HLD) system of claim 1 wherein said CCL incorporates time delays to account for dynamic response characteristics in said HGS.

10. The hydrocarbon gas (HCG) leak detection (HLD) system of claim 1 further comprising a temperature and/or humidity sensor (THS) electrically coupled to said DCP.

11. The hydrocarbon gas (HCG) leak detection (HLD) system of claim 1 further comprising a temperature sensor (THS) electrically coupled to said DCP, said THS configured to measure a HVAC refrigerant liquid line temperature, HVAC refrigerant suction line temperature, HVAC return air temperature, and/or or HVAC outdoor compressor discharge temperature.

12. The hydrocarbon gas (HCG) leak detection (HLD) system of claim 11 wherein said DCP is configured to activate said ASI if said HVAC refrigerant liquid line temperature, HVAC refrigerant suction line temperature, HVAC return air temperature, and/or or HVAC outdoor compressor discharge temperature increases beyond a predetermined limit.

13. The hydrocarbon gas (HCG) leak detection (HLD) system of claim 1 wherein said DCP further comprises a sensor record memory (SRM) that logs the time and SCT associated with said HLA.

14. The hydrocarbon gas (HCG) leak detection (HLD) system of claim 1 wherein said DCP is configured to transmit an indication of said HLA via a wireless communication interface (WCI) to a mobile user device (MUD).

15. The hydrocarbon gas (HCG) leak detection (HLD) system of claim 1 wherein said DCP is configured to activate an air exhaust fan (AEF) if said HLA is triggered by said ALARM STATE.

16. A hydrocarbon gas (HCG) leak mitigation (HLM) system comprising:
(a) hydrocarbon gas sensor (HGS);
(b) sensor signal conditioner (SSC);
(c) digital control processor (DCP);
(d) alarm status indicator (ASI); and
(e) HCG relay controls (HRC);
wherein:
said HGS detects ambient hydrocarbon gas (AHG);
said HGS indicates said AHG detection as a hydrocarbon sensor voltage (HSV);
said HSV is electrically coupled to said SSC;
said SSC is electrically coupled to said DCP;
said SSC and said DCP form a closed control loop (CCL);
said CCL operates such that said DCP dynamically adjusts electrical characteristics of said SSC based on the value of said HSV;
said CCL comprises a WARMUP STATE in which said HGS is heated until it stabilizes to a nominal fresh air resistance (FAR) value;
said CCL comprises a MONITOR STATE in which said SSC is adjusted such that said HSV is maintained within a lower threshold voltage (LTV) and an upper threshold voltage (UTV);
said CCL comprises a GAS DETECTION STATE in which a STEP COUNTER (SCT) is decremented if said HSV falls below said LTV and incremented if said HSV exceeds said UTV;
said GAS DETECTION STATE is iteratively executed with a variable sample time between readings of said HSV from said HGS;
said CCL comprises an ALARM STATE that triggers a hydrocarbon gas (HCG) leak alarm (HLA) if said SCT exceeds a selected threshold detection count (TDC);
said DCP is configured to log alarms to said ASI if said HLA is triggered by said ALARM STATE;
said HRC is electrically coupled to said DCP; and
said DCP is configured to individually activate and/or deactivate the state of said HRC when said HLA is triggered by said ALARM STATE.

17. The hydrocarbon gas (HCG) leak mitigation (HLM) system of claim 16 wherein said SSC comprises a sensor digital potentiometer (SDP), a sensor digital rheostat (SDR), and a sensor analog amplifier (SAA).

18. The hydrocarbon gas (HCG) leak mitigation (HLM) system of claim 17 wherein said DCP comprises an internal analog comparator (IAC) having a negative input electrically coupled to a wiper of said SDP and a positive input electrically coupled to an output of said SAA.

19. The hydrocarbon gas (HCG) leak mitigation (HLM) system of claim 16 wherein said ASI comprises a light emitting diode (LED) that is activated with a duty cycle or frequency based on an operational state of said CCL.

20. The hydrocarbon gas (HCG) leak mitigation (HLM) system of claim 16 wherein said ASI comprises an audible alarm that is activated with a duty cycle or audible frequency based on an operational state of said CCL.

21. The hydrocarbon gas (HCG) leak mitigation (HLM) system of claim 16 wherein said ASI comprises an alarm indicator selected from a group consisting of: visual alarm indicator; digital SCT display; and audible alarm indicator.

22. The hydrocarbon gas (HCG) leak mitigation (HLM) system of claim 16 further comprising an air intake fan (AIF) positioned to force ambient air toward said HGS.

23. The hydrocarbon gas (HCG) leak mitigation (HLM) system of claim 16 wherein said DCP controls an air intake fan (AIF) that is positioned to force ambient air toward said HGS.

24. The hydrocarbon gas (HCG) leak mitigation (HLM) system of claim 16 wherein said CCL incorporates time delays to account for dynamic response characteristics in said HGS.

25. The hydrocarbon gas (HCG) leak mitigation (HLM) system of claim 16 further comprising a temperature and/or humidity sensor (THS) electrically coupled to said DCP.

26. The hydrocarbon gas (HCG) leak detection (HLD) system of claim 16 further comprising a temperature sensor (THS) electrically coupled to said DCP, said THS configured to measure a HVAC refrigerant liquid line temperature, HVAC refrigerant suction line temperature, HVAC return air temperature, and/or or HVAC outdoor compressor discharge temperature.

27. The hydrocarbon gas (HCG) leak detection (HLD) system of claim 26 wherein said DCP is configured to activate said ASI if said HVAC refrigerant liquid line temperature, HVAC refrigerant suction line temperature, HVAC return air temperature, and/or or HVAC outdoor compressor discharge temperature increases beyond a predetermined limit.

28. The hydrocarbon gas (HCG) leak mitigation (HLM) system of claim 16 wherein said DCP further comprises a sensor record memory (SRM) that logs the time and SCT associated with said HLA.

29. The hydrocarbon gas (HCG) leak mitigation (HLM) system of claim 16 wherein said DCP is configured to transmit an indication of said HLA via a wireless communication interface (WCI) to a mobile user device (MUD).

30. The hydrocarbon gas (HCG) leak mitigation (HLM) system of claim 16 wherein said DCP is configured to deactivate an electrical component within said HVAC system when said HLA is triggered by said ALARM STATE, said electrical component selected from a group consisting of: a contactor; a solenoid; a fan blower motor (FBM); a pilot gas valve (PGV); a HCG control valve (HCV); and an air exhaust fan (AEF).

31. The hydrocarbon gas (HCG) leak mitigation (HLM) system of claim 16 wherein said DCP is configured to activate an electrical component within said HVAC system when said HLA is triggered by said ALARM STATE, said electrical component selected from a group consisting of: a contactor; a solenoid; a fan blower motor (FBM); a pilot gas valve (PGV); a HCG control valve (HCV); and an air exhaust fan (AEF).

32. The hydrocarbon gas (HCG) leak mitigation (HLM) system of claim 16 wherein said DCP is configured to change the state of an electrical component within said HVAC system when said HLA is triggered by said ALARM STATE, said electrical component selected from a group consisting of: a contactor; a solenoid; a fan blower motor (FBM); a pilot gas valve (PGV); a HCG control valve (HCV); and an air exhaust fan (AEF).

33. The hydrocarbon gas (HCG) leak mitigation (HLM) system of claim 16 wherein said DCP is configured to change the state of an electrical component within said HVAC system when a command is received from a mobile user device (MUD) via a wireless communication interface (WCI), said electrical component selected from a group consisting of: a contactor; a solenoid; a fan blower motor (FBM); a pilot gas valve (PGV); a HCG control valve (HCV); and an air exhaust fan (AEF).

34. A hydrocarbon gas (HCG) leak detection (HLD) method comprising:
- (1) with a digital control processor (DCP) and a sensor signal conditioner (SSC), calibrating a hydrocarbon gas sensor (HGS) (0902);
- (2) with said DCP and said SSC, initializing a sensor threshold voltage (STV) for said HGS (0903);
- (3) with said DCP, initializing a LEVEL COUNTER to 0 (0904);
- (4) with said DCP and said SSC, monitoring a hydrocarbon sensor voltage (HSV) from said HGS (0905);
- (5) with said DCP and said SSC, determining if said HSV from said HGS is less than said STV, and if so, proceeding to step (1) (0906);
- (6) with said DCP and said SSC, determining if said HSV from said HGS is greater than said STV, and if not, proceeding to step (1) (0907);
- (7) with said DCP and said SSC, increasing said STV (1008);
- (8) with said DCP, increasing said LEVEL COUNTER (1009);
- (9) with said DCP, determining if said LEVEL COUNTER is greater than an ALARM TRIP value, and if so, proceeding to step (14) (1010);
- (10) with said DCP and said SSC, determining if said HSV from said HGS is less than said STV, and if not, proceeding to step (7) (1011);
- (11) with said DCP and said SSC, reducing said STV (1012);
- (12) with said DCP, decrementing said LEVEL COUNTER (1013);
- (13) with said DCP, determining if said LEVEL COUNTER is 0, and if not, proceeding to step (11), otherwise proceeding to step (1) (1014);
- (14) with said DCP, activating audible and/or visual alarms and proceeding to step (14) (1016).

35. A hydrocarbon gas (HCG) leak mitigation (HLM) method comprising:
- (1) with a digital control processor (DCP), enabling HCG flow and/or compressor and/or fan operation in a HVAC system (0901);
- (2) with said DCP and a sensor signal conditioner (SSC), calibrating a hydrocarbon gas sensor (HGS) (0902);
- (3) with said DCP and said SSC, initializing a sensor threshold voltage (STV) for said HGS (0903);
- (4) with said DCP, initializing a LEVEL COUNTER to 0 (0904);
- (5) with said DCP and said SSC, monitoring a hydrocarbon sensor voltage (HSV) from said HGS (0905);
- (6) with said DCP and said SSC, determining if said HSV from said HGS is less than said STV, and if so, proceeding to step (2) (0906);
- (7) with said DCP and said SSC, determining if said HSV from said HGS is greater than said STV, and if not, proceeding to step (2) (0907);
- (8) with said DCP and said SSC, increasing said STV (1008);
- (9) with said DCP, increasing said LEVEL COUNTER (1009);
- (10) with said DCP, determining if said LEVEL COUNTER is greater than an ALARM TRIP value, and if so, proceeding to step (15) (1010);
- (11) with said DCP and said SSC, determining if said HSV from said HGS is less than said STV, and if not, proceeding to step (8) (1011);
- (12) with said DCP and said SSC, reducing said STV (1012);
- (13) with said DCP, decrementing said LEVEL COUNTER (1013);
- (14) with said DCP, determining if said LEVEL COUNTER is 0, and if not, proceeding to step (11), otherwise proceeding to step (1) (1014);
- (15) with said DCP, disabling HCG flow and/or compressor and/or fan operation in said HVAC system (1015);
- (16) with said DCP, activating audible and/or visual alarms and proceeding to step (15) (1016).

* * * * *